United States Patent
Pan

(10) Patent No.: US 12,294,903 B2
(45) Date of Patent: May 6, 2025

(54) METHOD AND APPARATUS FOR SUPPORTING INTER-GNB DIRECT-TO-INDIRECT PATH SWITCHING FOR UE-TO-NW RELAY COMMUNICATION IN A WIRELESS COMMUNICATION SYSTEM

(71) Applicant: ASUS Technology Licensing Inc., Taipei (TW)

(72) Inventor: Li-Te Pan, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/208,988

(22) Filed: Jun. 13, 2023

(65) Prior Publication Data

US 2024/0015619 A1 Jan. 11, 2024

Related U.S. Application Data

(60) Provisional application No. 63/357,419, filed on Jun. 30, 2022, provisional application No. 63/357,447, filed on Jun. 30, 2022.

(51) Int. Cl.
*H04W 36/00* (2009.01)
*H04W 84/04* (2009.01)

(52) U.S. Cl.
CPC ........ *H04W 36/033* (2023.05); *H04W 84/042* (2013.01)

(58) Field of Classification Search
CPC . H04W 36/03; H04W 36/033; H04W 36/035; H04W 36/037; H04W 40/00; H04W 40/02; H04W 40/22; H04W 40/24; H04W 52/46; H04W 88/00; H04W 88/02; H04W 88/04
See application file for complete search history.

(56) References Cited

U.S. PATENT DOCUMENTS

| | | | |
|---|---|---|---|
| 2018/0035398 A1* | 2/2018 | Lee | H04L 5/003 |
| 2018/0160287 A1* | 6/2018 | Wu | H04B 7/15507 |
| 2018/0213577 A1* | 7/2018 | Burbidge | H04W 76/10 |
| 2022/0272602 A1* | 8/2022 | Huang | H04B 17/40 |

FOREIGN PATENT DOCUMENTS

WO    WO-2022086282 A1 *   4/2022   ............ H04W 76/10

* cited by examiner

*Primary Examiner* — Matthew W Genack
(74) *Attorney, Agent, or Firm* — Skaar Ulbrich Macari, P.A.

(57) ABSTRACT

A method and device are disclosed for a first network node. In one embodiment, the method includes the first network node receiving a first information of candidate relay User Equipments (UEs) from a remote UE. The method further includes the first network node sending the first information of candidate relay UEs or a second information of candidate relay UEs to a second network node for the second network node to select a target relay UE, wherein the second information of candidate relay UEs is derived from the first information of candidate relay UEs.

16 Claims, 25 Drawing Sheets

| IEI | Information Element | Type/Reference | Presence | Format | Length |
|---|---|---|---|---|---|
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |
| | MIC | MIC 11.2.4 | M | V | 4 |
| | Announcer info | User info ID 11.2.7 | M | V | 6 |
| | Relay service code (NOTE 2) | Relay service code 11.2.8 | M | V | 3 |
| | Status indicator | Status indicator 11.2.9 | M | V | 1 |
| 52 | NCGI | NCGI 11.2.12 | O | TV | 9 |
| 63 | RRC container | RRC container 11.2.14 | O | TLV | 3-257 |

1. NOTE 1: The discovery type is set to "Restricted discovery", the content type is set to "UE-to-network relay discovery announcement/UE-to-network relay discovery response" and the discovery model is set to "Model A".
2. NOTE 2: If the announcing UE works as a 5G ProSe Layer-3 UE-to-network relay UE, the S-NSSAI associated with the relay service code belongs to the allowed NSSAI of the UE.

FIG. 7 (PRIOR ART)

The length of RRC container contents field contains the binary coded representation of the length of the RRC container contents field.

RRC container contents (octet 3 to m)
The RRC container contents field is coded as SL-AccessInfo-L2U2N in clause 9.4 of 3GPP TS 38.331 [13].

FIG. 9 (PRIOR ART)

METHOD AND APPARATUS FOR SUPPORTING INTER-GNB DIRECT-TO-INDIRECT PATH SWITCHING FOR UE-TO-NW RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. Nos. 63/357,419 and 63/357,447 filed on Jun. 30, 2022, the entire disclosures of which are incorporated herein in their entirety by reference.

FIELD

This disclosure generally relates to wireless communication networks, and more particularly, to a method and apparatus for supporting inter-GNB direct-to-indirect path switching for UE-to-NW relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for a first network node. In one embodiment, the method includes the first network node receiving a first information of candidate relay User Equipments (UEs) from a remote UE. The method further includes the first network node sending the first information of candidate relay UEs or a second information of candidate relay UEs to a second network node for the second network node to select a target relay UE, wherein the second information of candidate relay UEs is derived from the first information of candidate relay UEs.

BRIEF DESCRIPTION OF THE DRAWINGS

FIG. 7 is a reproduction of Table 10.2.1.8 of 3GPP TS 24.554 V17.1.0.

FIG. 9 is a reproduction of Table 11.2.14.1 of 3GPP TS 24.554 V17.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V17.2.1, "Proximity based Services (ProSe) in the 5G System (5GS) (Release 17)"; TS 24.554 V17.1.0, "Proximity-services (ProSe) in 5G System (5GS) protocol aspects; Stage 3 (Release 17)"; TR 38.836, V17.0.0, "Study on NR sidelink relay; (Release 17)"; TS 38.331 V17.0.0, "Radio Resource Control (RRC) protocol specification (Release 17)"; R2-2206823, CR for TS 38.331, "Miscellaneous corrections for NR SL Relay", Huawei, HiSilicon; TS 38.300 V17.0.0, "NR and NG-RAN Overall Description; Stage 2 (Release 17)"; R2-2206232, CR for TS 38.300, "Correction on stage 2 for sidelink relay", MediaTek Inc.; TS 38.351 v17.0.0, "Sidelink Relay Adaptation Protocol (SRAP) Specification (Release 17)"; TR 23.700-33 v0.3.0, "Study on system enhancement for Proximity based Services (ProSe) in the 5G System (5GS); Phase 2 (Release 18)"; and RP-221262, "Revised WID on NR sidelink relay enhancements", LG Electronics. The standards and documents listed above are hereby expressly incorporated by reference in their entirety.

Figure 1:
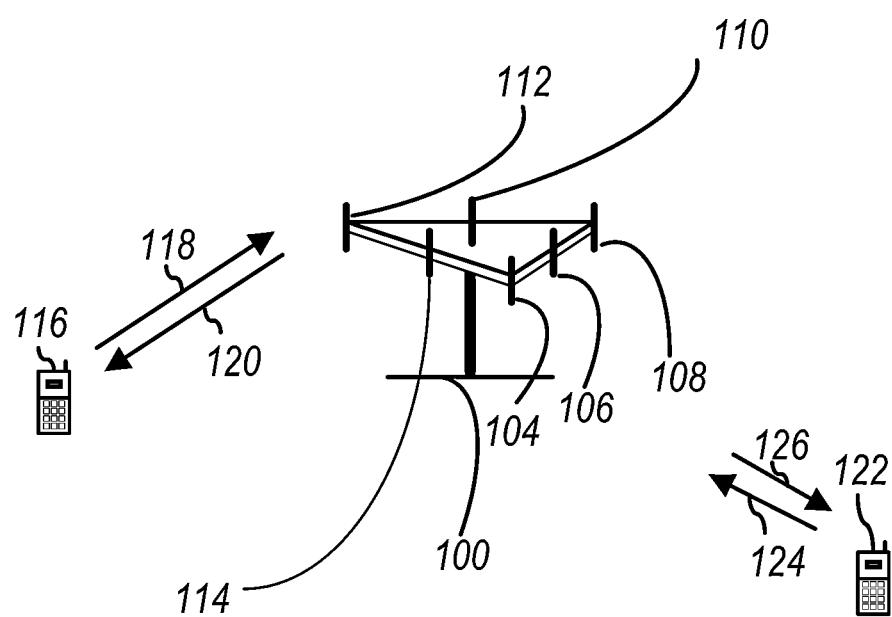
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
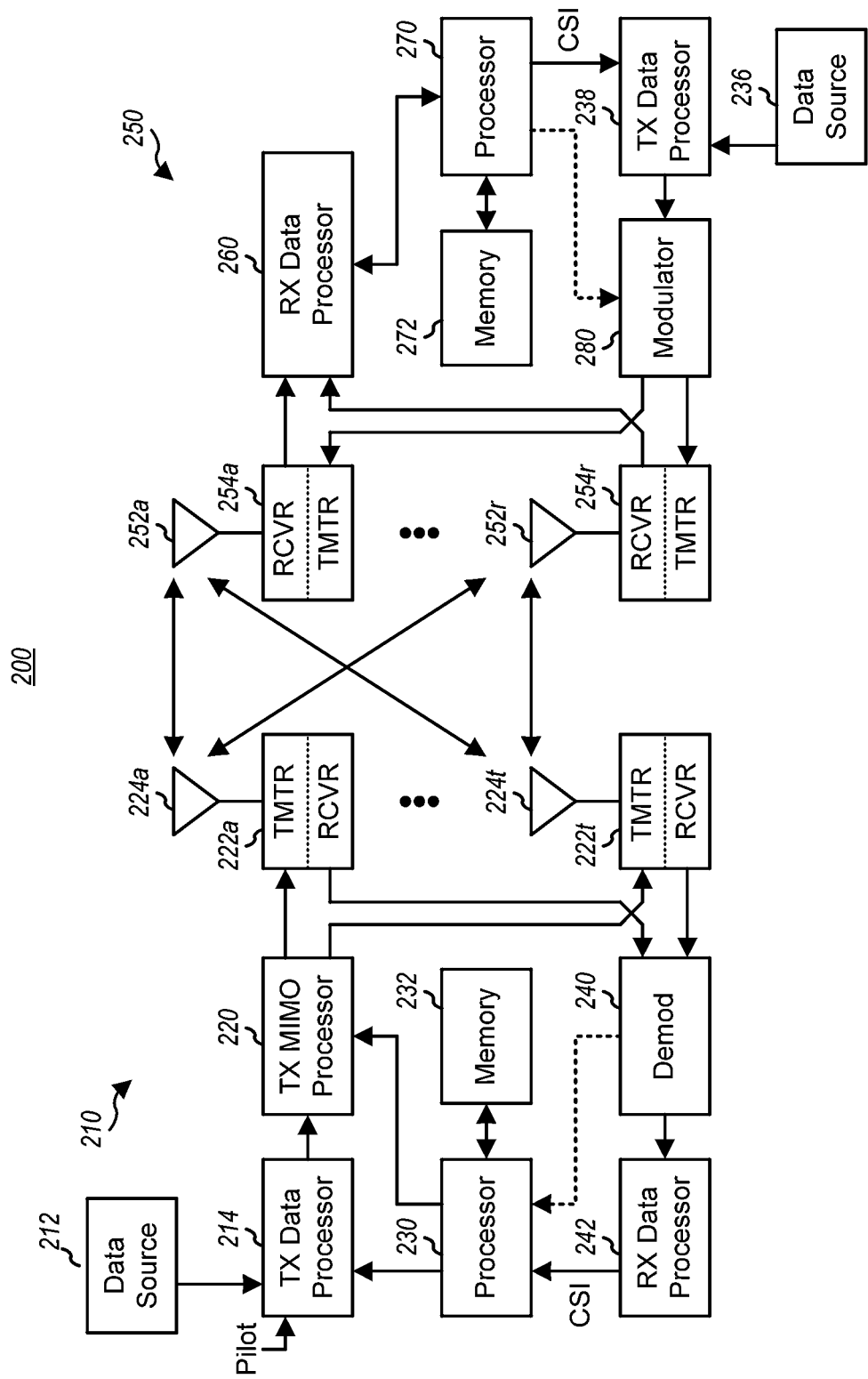
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
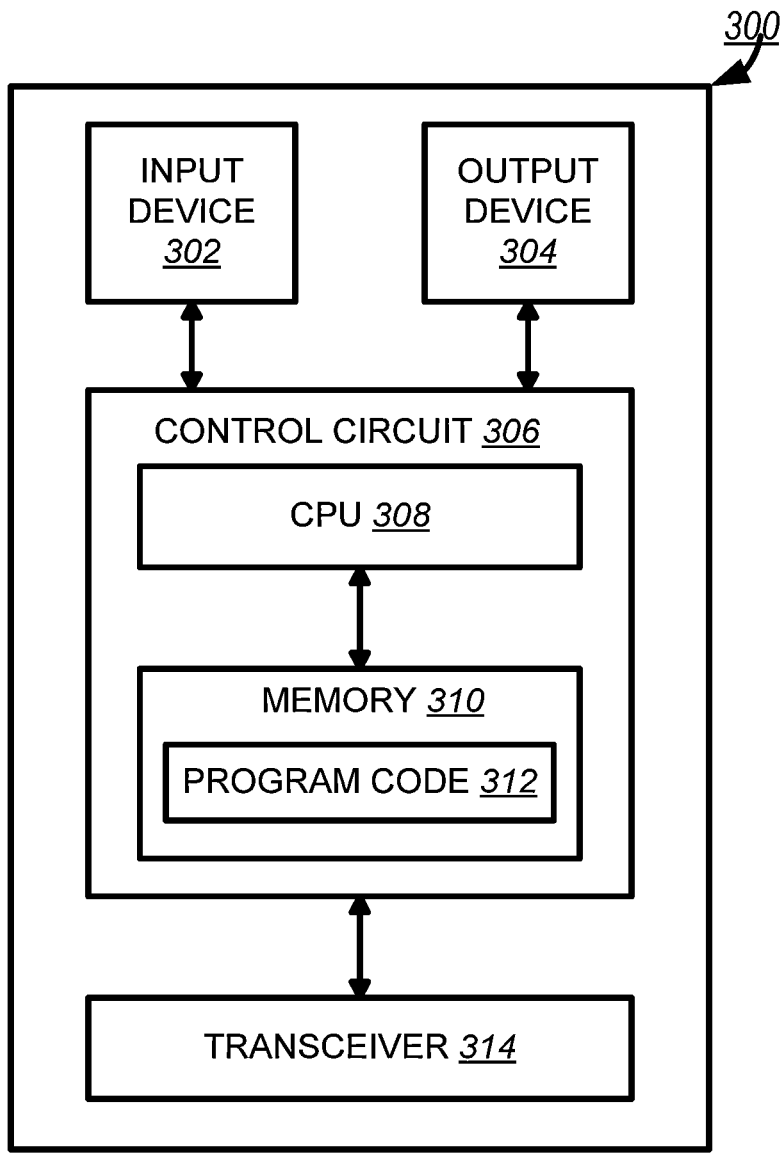
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
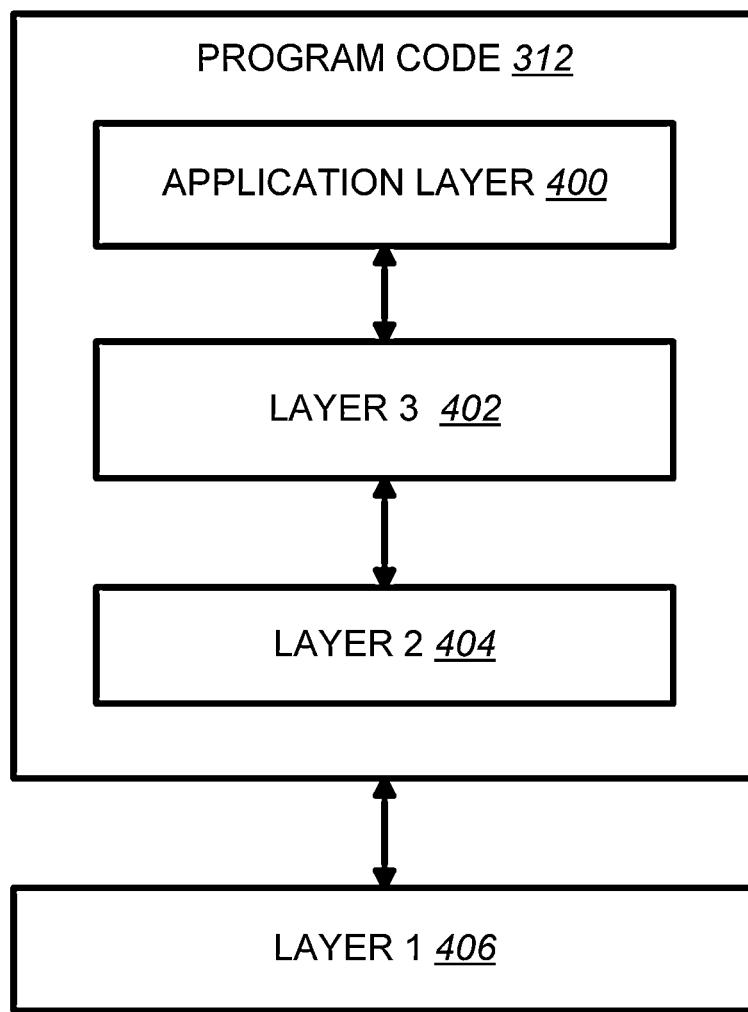
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 introduced some procedures related to unicast link communication as follows:

5.8.2 Identifiers for 5G ProSe Direct Communication
5.8.2.1 General
Each UE has one or more Layer-2 IDs for 5G ProSe direct communication over PC5 reference point, consisting of:
 Source Layer-2 ID(s); and
 Destination Layer-2 ID(s).
Source and Destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames. The selection of the Source and Destination Layer-2 ID(s) by a UE depends on the communication mode of 5G ProSe direct communication over PC5 reference point for this layer-2 link, as described in clauses 5.8.2.2, 5.8.2.3, and 5.8.2.4. The Source Layer-2 IDs may differ between different communication modes.
[ . . . ]
5.8.2.4 Identifiers for Unicast Mode 5G ProSe Direct Communication
For unicast mode of 5G ProSe direct communication over PC5 reference point, the Destination Layer-2 ID used depends on the communication peer. The Layer-2 ID of the communication peer, identified by the peer's Application Layer ID, may be discovered during the establishment of the PC5 unicast link, or known to the UE via prior ProSe direct communications, e.g. existing or prior unicast link to the same Application Layer ID, or obtained from 5G ProSe direct discovery process. The initial signalling for the establishment of the PC5 unicast link may use the known Layer-2 ID of the communication peer, or a default destination Layer-2 ID associated with the ProSe service (i.e. ProSe identifier) configured for PC5 unicast link establishment, as specified in clause 5.1.3.1. During the PC5 unicast link establishment procedure, Layer-2 IDs are exchanged, and should be used for future communication between the two UEs, as specified in clause 6.4.3.

The UE maintains a mapping between the Application Layer IDs and the source Layer-2 IDs used for the PC5 unicast links, as the ProSe application layer does not use the Layer-2 IDs. This allows the change of source Layer-2 ID without interrupting the ProSe applications.

When Application Layer IDs change, the source Layer-2 ID(s) of the PC5 unicast link(s) shall be changed if the link(s) was used for 5G ProSe communication with the changed Application Layer IDs.

Based on privacy configuration as specified in clause 5.1.3.1, the update of the new identifiers of a source UE to the peer UE for the established unicast link may cause the peer UE to change its Layer-2 ID and optionally IP address/prefix if IP communication is used as defined in clause 6.4.3.2.
[ . . . ]
6.1.1.2.2 PC5 Signalling Protocol
The PC5 Signalling Protocol stack specified in clause 6.1.2 of TS 23.287 [2] is used. The protocol used for the control plane signalling over the PC5 reference point for the secure layer-2 link is specified in clauses 6.4.3, 6.5.1 and 6.5.2.
[ . . . ]
6.3.2.3 5G ProSe UE-to-Network Relay Discovery
6.3.2.3.1 General
5G ProSe UE-to-Network Relay Discovery is applicable to both 5G ProSe Layer-3 and Layer-2 UE-to-Network relay discovery for public safety use and commercial services. To perform 5G ProSe UE-to-Network Relay Discovery, the 5G ProSe Remote UE and the 5G ProSe UE-to-Network Relay are pre-configured or provisioned with the related information as described in clause 5.1. In 5G ProSe UE-to-Network Relay Discovery, the UEs use pre-configured or provisioned information for the relay discovery procedures as defined in clause 5.1.4.1.

The Relay Service Code (RSC) is used in the 5G ProSe UE-to-Network Relay discovery, to indicate the connectivity service the 5G ProSe UE-to-Network Relay provides to the 5G ProSe Remote UE. The RSCs are configured on the 5G ProSe UE-to-Network Relay and the 5G ProSe Remote UE as defined in clause 5.1.4. The 5G ProSe UE-to-Network Relay and the 5G ProSe Remote UE are aware of whether a RSC is offering 5G ProSe Layer-2 or Layer-3 UE-to-Network Relay service based the policy as specified in clause 5.1.4. A 5G ProSe UE-to-Network Relay supporting multiple RSCs can advertise the RSCs using multiple discovery messages, with one RSC per discovery message. Additional information not directly used for discovery can also be advertised using the PC5-D protocol stack in single or separate discovery messages of type "Relay Discovery Additional Information" as defined in clause 5.8.3.1.
6.3.2.3.2 Procedure for 5G ProSe UE-to-Network Relay Discovery with Model A
Depicted in FIG. 6.3.2.3.2-1 is the procedure for 5G ProSe UE-to-Network Discovery with Model A.

Figure 5:
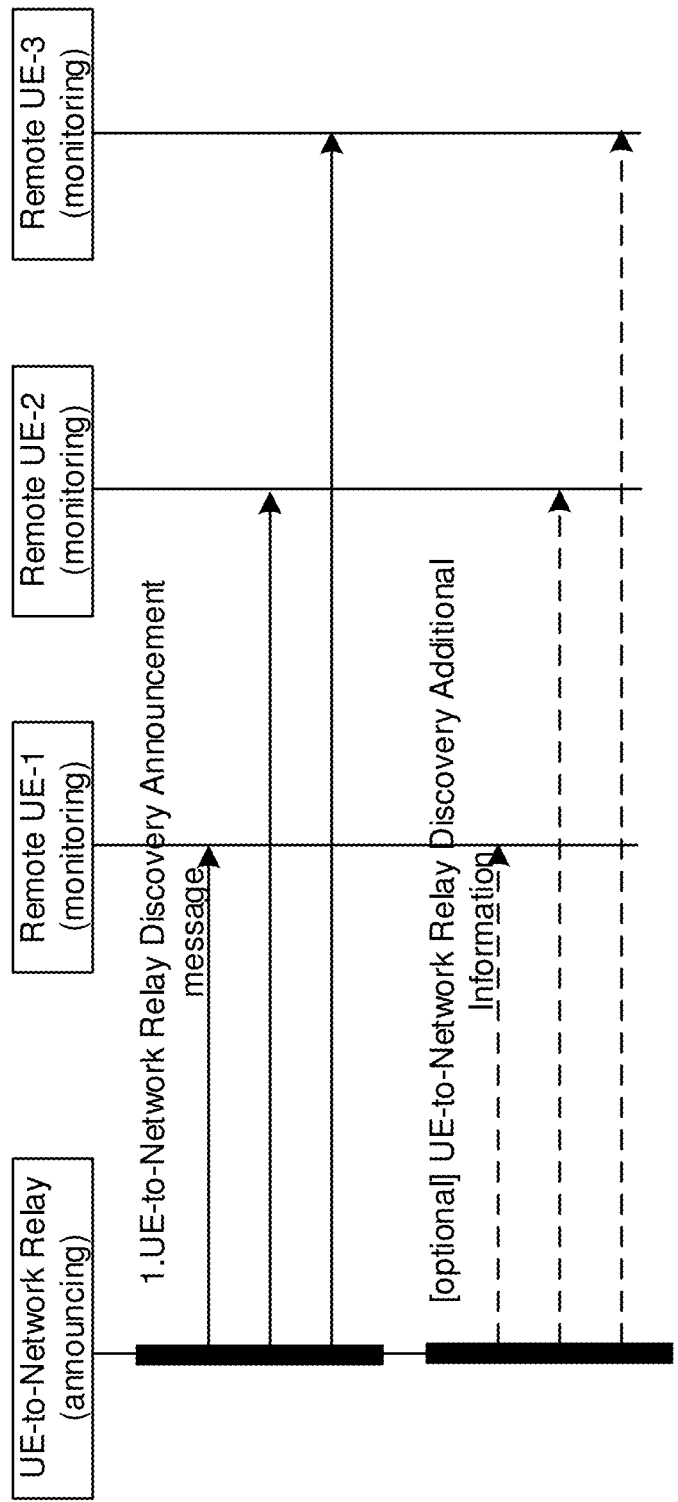
FIG. 5 is a reproduction of FIG. 6.3.2.3.2-1 of 3GPP TS 23.304 V17.2.1.
Figure 6:
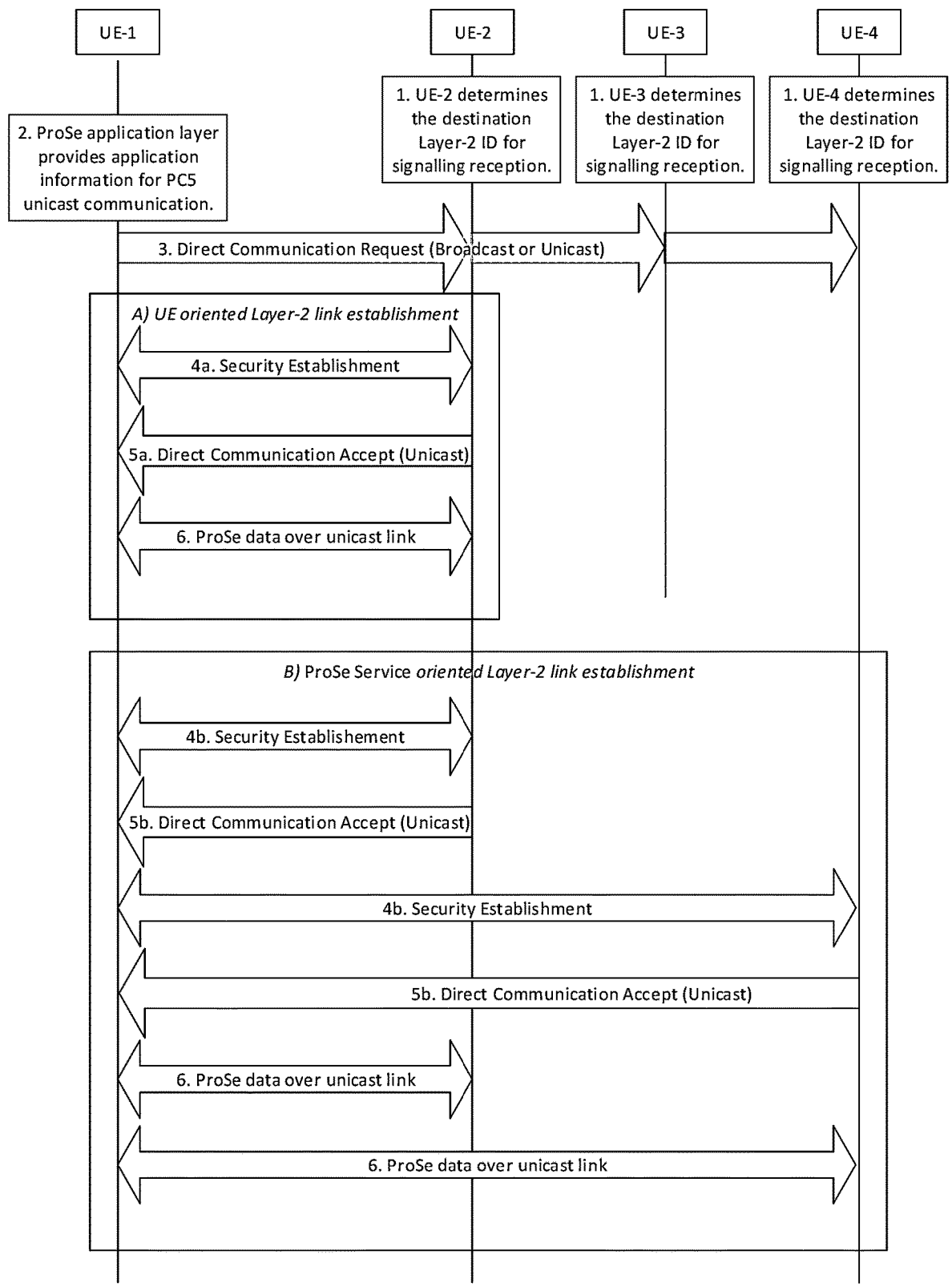
FIG. 6 is a reproduction of FIG. 6.4.3.1-1 of 3GPP TS 23.304 V17.2.1.

[FIG. 6.3.2.3.2-1 of 3GPP TS 23.304 V17.2.1, entitled "5G ProSe UE-to-Network Relay Discovery with Model A", is reproduced as FIG. 5]

1. The 5G ProSe UE-to-Network Relay sends a UE-to-Network Relay Discovery Announcement message. The UE-to-Network Relay Discovery Announcement message contains the Type of Discovery Message, Announcer Info and RSC, and is sent using the Source Layer-2 ID and Destination Layer-2 ID as described in clause 5.8.3.

For 5G ProSe Layer-3 UE-to-Network Relay, the 5G ProSe Layer-3 UE-to-Network Relay shall only include a RSC in the UE-to-Network Relay Discovery Announcement when the S-NSSAI associated with that RSC belongs to the Allowed NSSAI of the UE-to-Network Relay. The 5G ProSe Remote UE (1 to 3) determines the Destination Layer-2 ID for signalling reception. The Destination Layer-2 ID is configured with the UE(s) as specified in clause 5.1.4.1.

5G ProSe Remote UE (1 to 3) monitors announcement messages with the 5G ProSe UE-to-Network RSC corresponding to the desired services.

Optionally, the 5G ProSe UE-to-Network Relay may also send Relay Discovery Additional Information messages as defined in clause 6.5.1.3. The parameters contained in this message and the Source Layer-2 ID and Destination Layer-2 ID used for sending and receiving the message are described in clause 5.8.3.

The 5G ProSe Remote UE selects the 5G ProSe UE-to-Network Relay based on the information received in step 1.

NOTE: Access Stratum layer information used for 5G ProSe UE-to-Network Relay selection is specified in RAN specifications.

[ . . . ]

6.4.3 Unicast Mode 5G ProSe Direct Communication 6.4.3.1 Layer-2 Link Establishment Over PC5 Reference Point To perform unicast mode of ProSe Direct communication over PC5 reference point, the UE is configured with the related information as described in clause 5.1.3.

FIG. 6.4.3.1-1 shows the layer-2 link establishment procedure for the unicast mode of ProSe Direct communication over PC5 reference point.

[FIG. 6.4.3.1-1 of 3GPP TS 23.304 V17.2.1, Entitled "Layer-2 Link Establishment Procedure", is Reproduced as FIG. 6]

1. The UE(s) determine the destination Layer-2 ID for signalling reception for PC5 unicast link establishment as specified in clause 5.8.2.4.

2. The ProSe application layer in UE-1 provides application information for PC5 unicast communication. The application information includes the ProSe Service Info, UE's Application Layer ID. The target UE's Application Layer ID may be included in the application information.

The ProSe application layer in UE-1 may provide ProSe Application Requirements for this unicast communication. UE-1 determines the PC5 QoS parameters and PFI as specified in clause 5.6.1.

If UE-1 decides to reuse the existing PC5 unicast link as specified in clause 5.3.4, the UE triggers the Layer-2 link modification procedure as specified in clause 6.4.3.4.

3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the ProSe application layer provided the target UE's Application Layer ID in step 2, the following information is included:

Target User Info: the target UE's Application Layer ID (i.e. UE-2's Application Layer ID).

ProSe Service Info: the information about the ProSe identifier(s) requesting Layer-2 link establishment.

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"DHCPv4 server" if only IPv4 address allocation mechanism is supported by the initiating UE, i.e., acting as a DHCPv4 server; or "IPv6 Router" if only IPv6 address allocation mechanism is supported by the initiating UE, i.e., acting as an IPv6 Router; or "DHCPv4 server & IPv6 Router" if both IPv4 and IPv6 address allocation mechanism are supported by the initiating UE; or "address allocation not supported" if neither IPv4 nor IPv6 address allocation mechanism is supported by the initiating UE.

Link-Local IPv6 Address: a link-local IPv6 address formed locally based on RFC 4862 if UE-1 does not support the IPv6 IP address allocation mechanism, i.e. the IP Address Configuration indicates "address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).

Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.4.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.) and optionally the associated ProSe identifiers(s).

Optional PC5 QoS Rule(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPv6 Router; or "DHCPv4 server & IPv6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. ProSe data is transmitted over the established unicast link as below:

The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-Vs Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

[ . . . ]

6.4.3.6 Layer-2 Link Management Over PC5 Reference Point for 5G ProSe UE-to-Network Relay The Layer-2 link procedures over PC5 reference point for unicast mode 5G ProSe Direct Communication as depicted from clause 6.4.3.1 to clause 6.4.3.5 can be used for the PC5 reference point between 5G ProSe Remote UE and 5G ProSe UE-to-Network Relay, with the following differences and clarifications:

The Layer-2 link modification procedure is applicable to ProSe Communication via 5G ProSe Layer-3 UE-to-Network Relay, other procedures are applicable to both ProSe Communication via 5G ProSe Layer-2 UE-to-Network Relay and ProSe Communication via 5G ProSe Layer-3 UE-to-Network Relay.

The UE oriented Layer-2 link establishment is used with UE-1 representing the 5G ProSe Remote UE and UE-2 representing the 5G ProSe UE-to-Network Relay. For other procedures either UE-1 represents the 5G ProSe Remote UE and UE-2 represents the 5G ProSe UE-to-Network Relay, or UE-1 represents the 5G ProSe UE-to-Network Relay and UE-2 represents the 5G ProSe Remote UE. I.e. the Layer-2 link establishment is initiated by the 5G ProSe Remote UE, while other procedures may be initiated either by the 5G ProSe Remote UE or by the 5G ProSe UE-to-Network Relay.

For the UE oriented Layer-2 link establishment as described in the clause 6.4.3.1, In step 1, the 5G ProSe Remote UE determines the destination Layer-2 ID for PC5 unicast link establishment based on the unicast source Layer-2 ID of the selected 5G ProSe UE-to-Network Relay (as specified in clause 5.8.3) during UE-to-Network Relay discovery as specified in clause 6.3.2.3.

In step 2, 5G ProSe Remote UE (UE-1) determines the Relay Service Code to be used. The Relay Service Code to be used is selected from the received Relay Service Code(s) during UE-to-Network Relay discovery as specified in clause 6.3.2.3.

In step 3, 5G ProSe Remote UE (UE-1) sends a unicast Direct Communication Request message to the selected 5G ProSe UE-to-Network Relay. The destination Layer-2 ID used to send the Direct Communication Request message shall be unicast Layer-2 ID as determined in step 1. The Direct Communication Request message includes:

Source User Info: the identity of the Remote UE requesting relay operation (i.e. User Info ID).

NOTE 1: The details of which additional identity/identities of the Remote UE to be included during Layer-2 link establishment will be decided by SA WG3.

Target User Info: the identity of the UE-to-Network Relay provided to the 5G ProSe Remote UE during UE-to-Network Relay Discovery procedure (i.e. User Info ID).

Relay Service Code: indicates the connectivity service provided by the 5G ProSe UE-to-Network Relay as requested by the 5G ProSe Remote UE.

Security Information: the information for the establishment of security.

In step 4 and step 5, step 4a and step 5a are performed if the 5G ProSe UE-to-Network Relay's identity matches the Target User Info and the Relay Service Code is one of the Relay Service Codes included during UE-to-Network Relay discovery as specified in clause 6.3.2.3. The Source User Info in the Direct Communication Accept message is the identity of the UE-to-Network Relay (i.e. User Info ID). In the case of 5G ProSe Layer-2 UE-to-Network Relay, the Remote UE does not send the IP Address Configuration, Link-Local IPv6 Address and QoS Info to the 5G ProSe Layer-2 UE-to-Network Relay, and the Direct Communication Accept message does not include IP Address Configuration, Link-Local IPv6 Address and QoS Info. In the case of 5G ProSe Layer-3 UE-to-Network Relay, the Direct Communication Accept message does not include the IP Address Configuration indicating the value "address allocation not supported".

In the case of 5G ProSe Layer-2 UE-to-Network Relay, step 6 is not performed.

For the link identifier update as described in the clause 6.4.3.2,

Application Layer ID is replaced by User Info ID.

In the case of 5G ProSe Layer-2 UE-to-Network Relay, the changed identifiers do not include IP address/prefix.

For the Layer-2 link release as described in the clause 6.4.3.3,

In step1, if the Layer-2 link release procedure is initiated by the 5G ProSe UE-to-Network Relay, the Disconnect Request message may indicate the 5G ProSe UE-to-Network Relay is temporarily not available as described in clause 5.12.

NOTE 2: The form of the temporarily not available indication will be determined by stage 3.

If the service authorization for acting as a 5G ProSe Remote UE or as a 5G ProSe UE-to-Network Relay is revoked, the 5G ProSe Remote UE or the 5G ProSe UE-to-Network Relay should initiate the release of the layer-2 link that the revoked authorization affects.

A 5G ProSe Layer-2 Remote UE or a 5G ProSe Layer-2 UE-to-Network Relay initiates the release of the layer-2 link upon receiving the indication from its AS layer that PC5-RRC connection has been released as specified in TS 38.300 [12].

NOTE 3: The timing to initiates layer-2 link release is up to UE implementation.

A 5G ProSe Remote UE and a 5G ProSe UE-to-Network Relay shall set up a separate PC5 unicast links if an existing unicast link(s) was established with a different Relay Service Code or without a Relay Service Code.

Each PC5 unicast link for 5G ProSe UE-to-Network Relay is associated with a Unicast Link Profile, which includes:

User Info ID and Layer-2 ID of 5G ProSe Remote UE; and

User Info ID and Layer-2 ID of 5G ProSe UE-to-Network Relay; and

Relay Service Code; and

In the case of 5G ProSe Layer-3 UE-to-Network Relay, the network layer protocol and the information about PC5 QoS Flow(s).

The Unicast Link Profile shall be updated accordingly after a Layer-2 link modification or Layer-2 link identifier update.

3GPP TS 24.554 introduced following:

7.2.2 5G ProSe Direct Link Establishment Procedure 7.2.2.1 General

Depending on the type of the 5G ProSe direct link establishment procedure (i.e., UE oriented layer-2 link establishment or ProSe service oriented layer-2 link establishment in 3GPP TS 23.304 [2]), the 5G ProSe direct link establishment procedure is used to establish a 5G ProSe direct link between two UEs or to establish multiple 5G ProSe direct links. The UE sending the request message is called the "initiating UE" and the other UE is called the "target UE". If the request message does not indicate the specific target UE (i.e., target user info is not included in the request message) and multiple target UEs are interested in the ProSe application(s) indicated in the request message, then the initiating UE shall handle corresponding response messages received from those target UEs. The maximum number of 5G ProSe direct links established in a UE at a time shall not exceed an implementation-specific maximum number of established 5G ProSe direct links.

NOTE: The recommended maximum number of established 5G ProSe direct link is 8.

[ . . . ]

7.2.2.5 5G ProSe Direct Link Establishment Procedure not Accepted by the Target UE If the PROSE DIRECT LINK ESTABLISHMENT REQUEST message cannot be accepted, the target UE shall send a PROSE DIRECT LINK ESTABLISHMENT REJECT message. The PROSE DIRECT LINK ESTABLISHMENT REJECT message contains a PC5 signalling protocol cause IE set to one of the following cause values:

1 direct communication to the target UE not allowed;

3 conflict of layer-2 ID for unicast communication is detected;

5 lack of resources for 5G ProSe direct link;

13 congestion situation;

14 security procedure failure of 5G ProSe UE-to-network relay; or

111 protocol error, unspecified.

Figure 8:
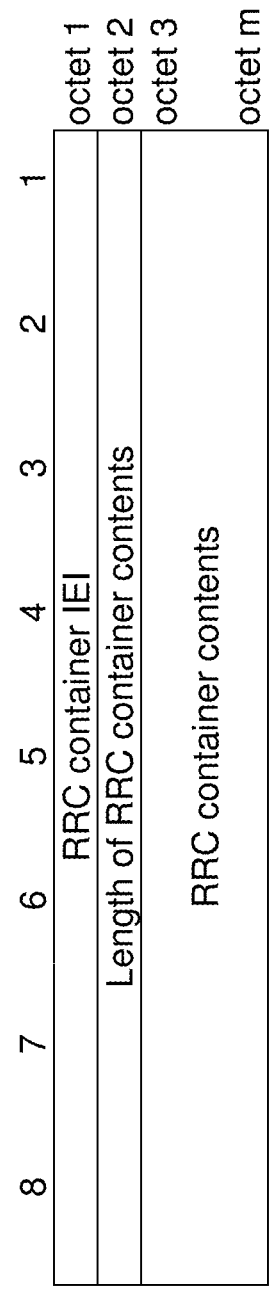
FIG. 8 is a reproduction of FIG. 11.2.14.1 of 3GPP TS 24.554 V17.1.0.
Figure 10:
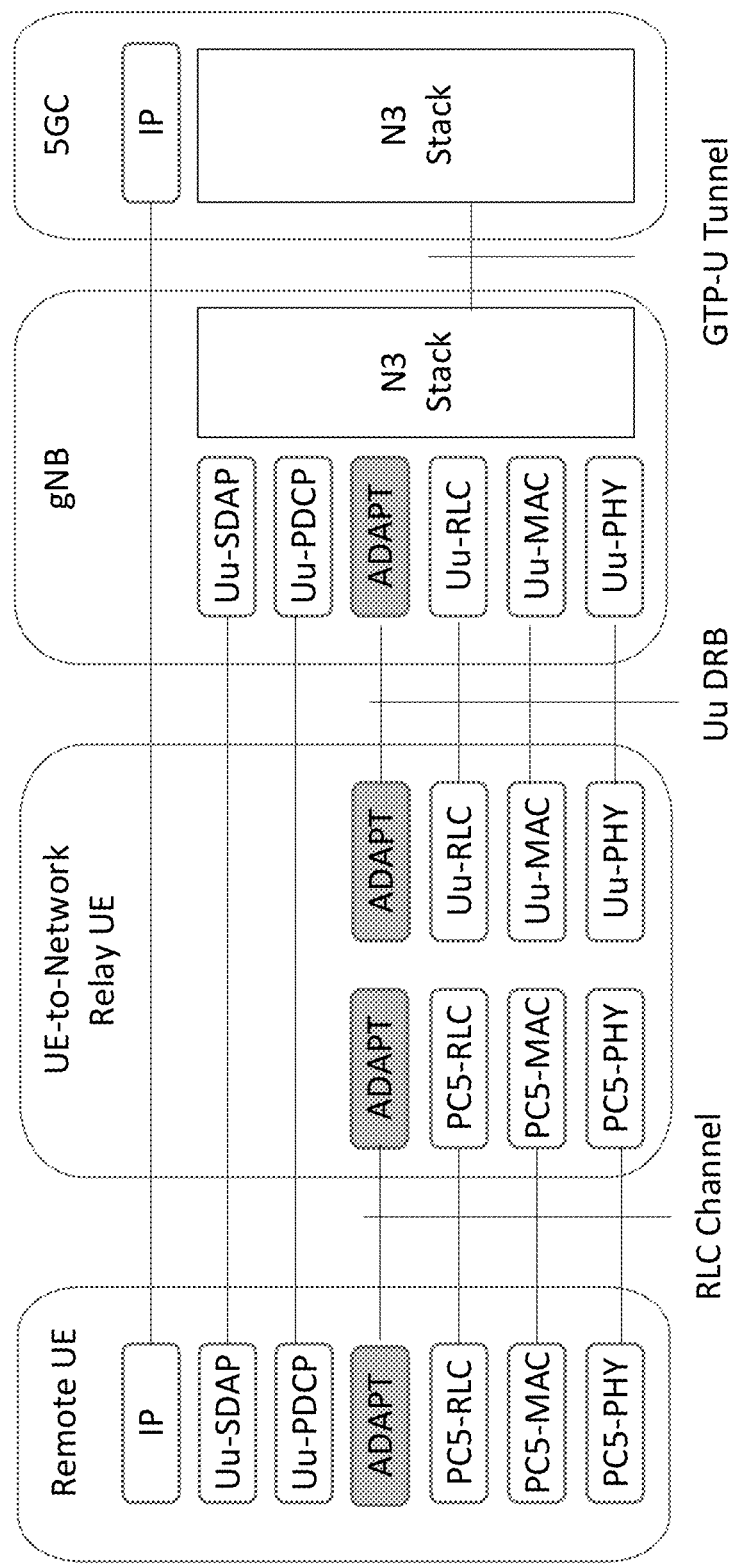
FIG. 10 is a reproduction of FIG. 4.5.1.1-3 of 3GPP TS 38.836 V17.0.0.
Figure 11:
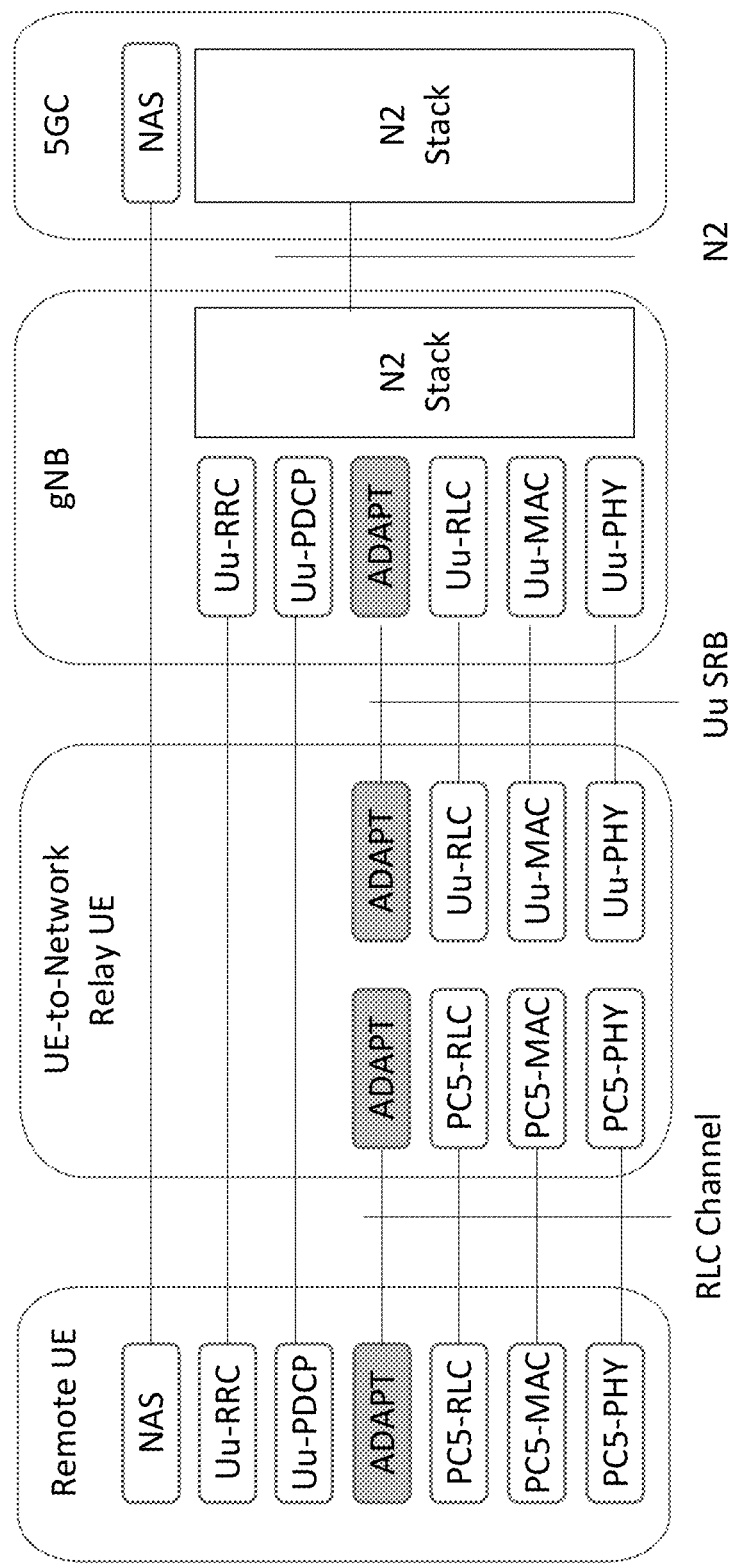
FIG. 11 is a reproduction of FIG. 4.5.1.1-4 of 3GPP TS 38.836 V17.0.0.
Figure 12:
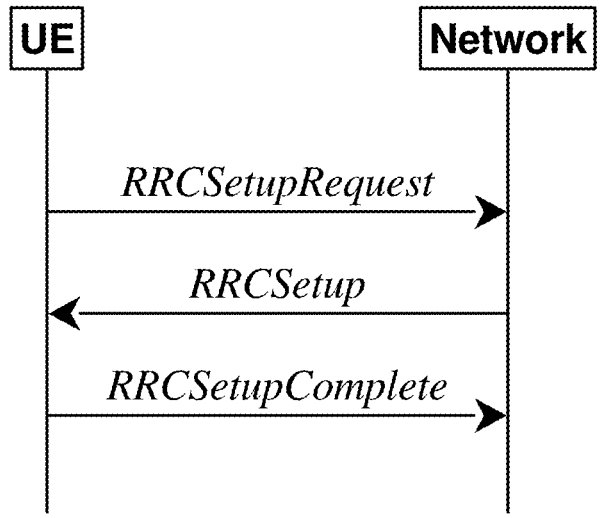
FIG. 12 is a reproduction of FIG. 5.3.3.1-1 of 3GPP TS 38.331 V17.0.0.

[ . . . ]
If the 5G ProSe direct link establishment fails due to the implementation-specific maximum number of established 5G ProSe direct links has been reached, or other temporary lower layer problems causing resource constraints, the target UE shall send a PROSE DIRECT LINK ESTABLISHMENT REJECT message containing PC5 signalling protocol cause value #5 "lack of resources for 5G ProSe direct link".
[ . . . ]
[Table 10.2.1.8 of 3GPP TS 24.554 V17.1.0, Entitled "PROSE PC5 DISCOVERY Message for UE-to-Network Relay Discovery Announcement", is Reproduced as FIG. 7]
[ . . . ]
11.2.14 RRC Container
The RRC container information element is used to indicate the RRC container information received from the lower layers.
The RRC container is a type 4 information element.
The RRC container information element is coded as shown in FIG. 11.2.14.1 and table 11.2.14.1.
[FIG. 11.2.14.1 of 3GPP TS 24.554 V17.1.0, Entitled "RRC Container Information Element", is Reproduced as FIG. 8]
[Table 11.2.14.1 of 3GPP TS 24.554 V17.1.0, entitled "RRC container information element", is reproduced as FIG. 9]
3GPP TR 38.836 introduced architecture and protocol stack for UE-to-Network Relay as follows:
4.5 Layer-2 Relay
4.5.1 Architecture and Protocol Stack
4.5.1.1 Protocol Stack
The protocol stacks for the user plane and control plane of L2 UE-to-Network Relay architecture are described in FIG. 4.5.1.1-1 and FIG. 4.5.1.1-2 for the case where adaptation layer is not supported at the PC5 interface, and FIG. 4.5.1.1-3 and FIG. 4.5.1.1-4 for the case where adaptation layer is supported at the PC5 interface.
For L2 UE-to-Network Relay, the adaptation layer is placed over RLC sublayer for both CP and UP at the Uu interface between Relay UE and gNB. The Uu SDAP/PDCP and RRC are terminated between Remote UE and gNB, while RLC, MAC and PHY are terminated in each link (i.e. the link between Remote UE and UE-to-Network Relay UE and the link between UE-to-Network Relay UE and the gNB). Whether the adaptation layer is also supported at the PC5 interface between Remote UE and Relay UE is left to WI phase (assuming down-selection first before studying too much on the detailed PC5 adaptation layer functionalities).
[ . . . ]
[FIG. 4.5.1.1-3 of 3GPP TS 38.836 V17.0.0, Entitled "User Plane Protocol Stack for L2 UE-to-Network Relay (Adaptation Layer is Supported at the PC5 Interface)", is Reproduced as FIG. 10]
[FIG. 4.5.1.1-4 of 3GPP TS 38.836 V17.0.0, entitled "Control plane protocol stack for L2 UE-to-Network Relay (adaptation layer is supported at the PC5 interface)", is reproduced as FIG. 11]
4.5.1.2 Adaptation Layer Functionality
For L2 UE-to-Network Relay, for uplink:
  The Uu adaptation layer at Relay UE supports UL bearer mapping between ingress PC5 RLC channels for relaying and egress Uu RLC channels over the Relay UE Uu path. For uplink relaying traffic, the different end-to-end RBs (SRB, DRB) of the same Remote UE and/or different Remote UEs can be subject to N:1 mapping and data multiplexing over one Uu RLC channel.
  The Uu adaptation layer is used to support Remote UE identification for the UL traffic (multiplexing the data coming from multiple Remote UE). The identity information of Remote UE Uu Radio Bearer and Remote UE is included in the Uu adaptation layer at UL in order for gNB to correlate the received data packets for the specific PDCP entity associated with the right Remote UE Uu Radio Bearer of a Remote UE.
For L2 UE-to-Network Relay, for downlink:
  The Uu adaptation layer can be used to support DL bearer mapping at gNB to map end-to-end Radio Bearer (SRB, DRB) of Remote UE into Uu RLC channel over Relay UE Uu path. The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu path.
  The Uu adaptation layer needs to support Remote UE identification for Downlink traffic. The identity information of Remote UE Uu Radio Bearer and the identity information of Remote UE needs be put into the Uu adaptation layer by gNB at DL in order for Relay UE to map the received data packets from Remote UE Uu Radio Bearer to its associated PC5 RLC channel.
3GPP TS 38.331 introduces the following:
5.3.3 RRC connection establishment
5.3.3.1 General
[FIG. 5.3.3.1-1 of 3GPP TS 38.331 V17.0.0, Entitled "RRC Connection Establishment, Successful", is Reproduced as FIG. 12]
[ . . . ]
The purpose of this procedure is to establish an RRC connection. RRC connection establishment involves SRB1 establishment. The procedure is also used to transfer the initial NAS dedicated information/message from the UE to the network.
[ . . . ]
5.3.5.5.2 Reconfiguration with Sync
The UE shall perform the following actions to execute a reconfiguration with sync.
  1> if the AS security is not activated, perform the actions upon going to RRC_IDLE as specified in 5.3.11 with the release cause 'other' upon which the procedure ends;
  1> if no DAPS bearer is configured:
    2> stop timer T310 for the corresponding SpCell, if running;
  1> if this procedure is executed for the MCG:
    2> if timer T316 is running;
      3> stop timer T316;
      3> clear the information included in VarRLF-Report, if any;
    2> resume MCG transmission, if suspended.
  1> stop timer T312 for the corresponding SpCell, if running;
  1> if sl-PathSwitchConfig is included:
    2> consider the target L2 U2N Relay UE to be the one indicated by the targetRelayUEIdentity in the sl-PothSwitchConfig;
    2> start timer T420 for the corresponding target L2 U2N Relay UE with the timer value set to T420, as included in the sl-PothSwitchConfig;
    2> apply the value of the newUE-Identity as the C-RNTI;
    2> perform the PC5-RRC connection establishment with the target L2 U2N Relay UE indicated by the targetRelayUEIdentity, if needed;
    2> apply the default configuration of SL-RLC1 as defined in 9.2.4 for SRB1;

1> else (sl-PothswitchConfig is not included):
  2> if this procedure is executed for the MCG or if this procedure is executed for an SCG not indicated as deactivated in the E-UTRA or NR RRC message in which the RRCReconfiguration message is embedded:
    3> start timer T304 for the corresponding SpCell with the timer value set to t304, as included in the reconfigurationWithSync;
  2> if the frequencyInfoDL is included:
    3> consider the target SpCell to be one on the SSB frequency indicated by the frequencyInfoDL with a physical cell identity indicated by the physCellId;
  2> else:
    3> consider the target SpCell to be one on the SSB frequency of the source SpCell with a physical cell identity indicated by the physCellId;
  2> start synchronising to the DL of the target SpCell;
  2> apply the specified BCCH configuration defined in 9.1.1.1 for the target SpCell;
  2> acquire the MIB of the target SpCell, which is scheduled as specified in TS 38.213 [13];
NOTE 1: The UE should perform the reconfiguration with sync as soon as possible following the reception of the RRC message triggering the reconfiguration with sync, which could be before confirming successful reception (HARQ and ARQ) of this message.
NOTE 2: The UE may omit reading the MIB if the UE already has the required timing information, or the timing information is not needed for random access.
NOTE 2a: A UE with DAPS bearer does not monitor for system information updates in the source PCell.
  2> If any DAPS bearer is configured:
    3> create a MAC entity for the target cell group with the same configuration as the MAC entity for the source cell group;
    3> for each DAPS bearer:
      4> establish an RLC entity or entities for the target cell group, with the same configurations as for the source cell group;
      4> establish the logical channel for the target cell group, with the same configurations as for the source cell group;
NOTE 2b: In order to understand if a DAPS bearer is configured, the UE needs to check the presence of the field daps-Config within the RadioBearerConfig IE received in radioBearerConfig or radioBearerConfig2.
    3> for each SRB:
      4> establish an RLC entity for the target cell group, with the same configurations as for the source cell group;
      4> establish the logical channel for the target cell group, with the same configurations as for the source cell group;
    3> suspend SRBs for the source cell group;
NOTE 3: Void
    3> apply the value of the newUE-Identity as the C-RNTI in the target cell group;
    3> configure lower layers for the target SpCell in accordance with the received spCellConfigCommon;
    3> configure lower layers for the target SpCell in accordance with any additional fields, not covered in the previous, if included in the received reconfigurationWithSync.
  2> else:
    3> reset the MAC entity of this cell group;
    3> consider the SCell(s) of this cell group, if configured, that are not included in the SCellToAddModList in the RRCReconfiguration message, to be in deactivated state;
    3> apply the value of the newUE-Identity as the C-RNTI for this cell group;
    3> configure lower layers in accordance with the received spCellConfigCommon;
    3> configure lower layers in accordance with any additional fields, not covered in the previous, if included in the received reconfigurationWithSync.
  2> if the UE is connected with a L2 U2N Relay UE (i.e. the UE is a L2 U2N Remote UE at the source side):
    3> perform the PC5-RRC connection release as specified in 5.8.9.5.

[ . . . ]

5.3.7 RRC Connection Re-Establishment 5.3.7.1 General

Figure 13:
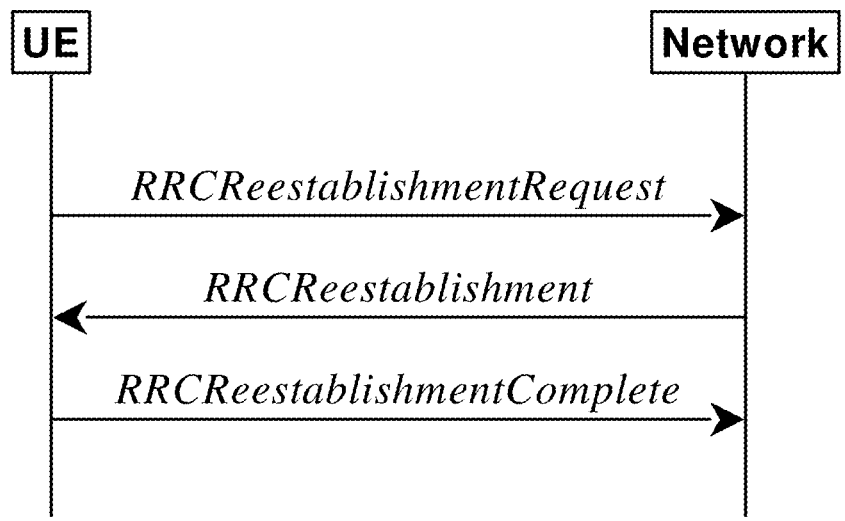
FIG. 13 is a reproduction of FIG. 5.3.7.1-1 of 3GPP TS 38.331 V17.0.0.

[FIG. 5.3.7.1-1 of 3GPP TS 38.331 V17.0.0, Entitled "RRC Connection Re-Establishment, Successful", is Reproduced as FIG. 13]

[ . . . ]

The purpose of this procedure is to re-establish the RRC connection. A UE in RRC_CONNECTED, for which AS security has been activated with SRB2 and at least one DRB/multicast MRB setup or, for IAB, SRB2, may initiate the procedure in order to continue the RRC connection. The connection re-establishment succeeds if the network is able to find and verify a valid UE context or, if the UE context cannot be retrieved, and the network responds with an RRCSetup according to clause 5.3.3.4.

[ . . . ]

5.3.7.2 Initiation

The UE initiates the procedure when one of the following conditions is met:
  1> upon detecting radio link failure of the MCG and t316 is not configured, in accordance with 5.3.10; or
  1> upon detecting radio link failure of the MCG while SCG transmission is suspended, in accordance with 5.3.10; or
  1> upon detecting radio link failure of the MCG while PSCell change or PSCell addition is ongoing, in accordance with 5.3.10; or
  1> upon re-configuration with sync failure of the MCG, in accordance with clause 5.3.5.8.3; or
  1> upon mobility from NR failure, in accordance with clause 5.4.3.5; or
  1> upon integrity check failure indication from lower layers concerning SRB1 or SRB2, except if the integrity check failure is detected on the RRCReestablishment message; or
  1> upon an RRC connection reconfiguration failure, in accordance with clause 5.3.5.8.2; or
  1> upon detecting radio link failure for the SCG while MCG transmission is suspended, in accordance with clause 5.3.10.3 in NR-DC or in accordance with TS 36.331 clause 5.3.11.3 in NE-DC; or
  1> upon reconfiguration with sync failure of the SCG while MCG transmission is suspended in accordance with clause 5.3.5.8.3; or
  1> upon SCG change failure while MCG transmission is suspended in accordance with TS 36.331 clause 5.3.5.7a; or
  1> upon SCG configuration failure while MCG transmission is suspended in accordance with clause 5.3.5.8.2 in NR-DC or in accordance with TS 36.331 clause 5.3.5.5 in NE-DC; or 1> upon integrity check failure indication from SCG lower layers concerning SRB3 while MCG is suspended; or 1> upon T316 expiry, in accordance with clause 5.7.3b.5; or 1> upon detecting sidelink radio link failure by L2 U2N Remote UE in RRC_CONNECTED, in accordance with clause 5.8.9.3; or 1> upon reception of NotificationMessageSidelink including indicationType by L2 U2N Remote UE in RRC_CONNECTED, in accordance with clause 5.8.9.10.

[ . . . ]

5.5 Measurements
5.5.1 Introduction

The network may configure an RRC_CONNECTED UE to perform measurements. The network may configure the UE to report them in accordance with the measurement configuration or perform conditional reconfiguration evaluation in accordance with the conditional reconfiguration. The measurement configuration is provided by means of dedicated signalling i.e. using the RRCReconfiguration or RRCResume.

The network may configure the UE to perform the following types of measurements:
    NR measurements;
    Inter-RAT measurements of E-UTRA frequencies;
    Inter-RAT measurements of UTRA-FDD frequencies;
    NR sidelink measurements of L2 U2N Relay UEs.
The network may configure the UE to report the following measurement information based on SS/PBCH block(s):
    Measurement results per SS/PBCH block;
    Measurement results per cell based on SS/PBCH block(s);
    SS/PBCH block(s) indexes.
The network may configure the UE to report the following measurement information based on CSI-RS resources:
    Measurement results per CSI-RS resource;
    Measurement results per cell based on CSI-RS resource(s);
    CSI-RS resource measurement identifiers.
The network may configure the UE to perform the following types of measurements for NR sidelink and V2X sidelink:
    CBR measurements.
The network may configure the UE to report the following CLI measurement information based on SRS resources:
    Measurement results per SRS resource;
    SRS resource(s) indexes.
The network may configure the UE to report the following CLI measurement information based on CLI-RSSI resources:
    Measurement results per CLI-RSSI resource;
    CLI-RSSI resource(s) indexes.
The network may configure the UE to report the following Rx-Tx time difference measurement information based on CSI-RS for tracking or PRS:
    UE Rx-Tx time difference measurement result.

[ . . . ]

CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

CellGroupConfig information element

```
-- ASN1START
-- TAG-CELLGROUPCONFIG-START
-- Configuration of one Cell-Group:
CellGroupConfig ::=                          SEQUENCE {
    cellGroupId                                  CellGroupId,
    rlc-BearerToAddModList                       SEQUENCE (SIZE(1..maxLC-ID)) OF RLC-BearerConfig
OPTIONAL, -- Need N
    rlc-BearerToReleaseList                      SEQUENCE (SIZE (1..maxLC-ID)) OF
LogicalChannelIdentity                       OPTIONAL, -- Need N
    mac-CellGroupConfig                          MAC-CellGroupConfig
OPTIONAL, -- Need M
    physicalCellGroupConfig                      PhysicalCellGroupConfig
OPTIONAL, -- Need M
    spCellConfig                                 SpCellConfig
OPTIONAL, -- Need M
    sCellToAddModList                            SEQUENCE (SIZE (1..maxNrofSCells)) OF SCellConfig
OPTIONAL, - Need N
    sCellToReleaseList                           SEQUENCE (SIZE (1..maxNrofSCells)) OF SCellIndex
OPTIONAL, -- Need N
    ...,
    [[
    reportUplinkTxDirectCurrent                  ENUMERATED {true}
OPTIONAL -- Cond BWP-Reconfig
    ]],
    [[
    bap-Address-r16                              BIT STRING (SIZE (10))
OPTIONAL, -- Need M
    bh-RLC-ChannelToAddModList-r16               SEQUENCE (SIZE(1..maxBH-RLC-ChannelID-r16)) OF BH-
RLC-ChannelConfig-r16 OPTIONAL, -- Need N
    bh-RLC-ChannelToReleaseList-r16              SEQUENCE (SIZE(1..maxBH-RLC-ChannelID-r16)) OF BH-
RLC-ChannelID-r16 OPTIONAL, -- Need N
    flc-TransferPath-r16                         ENUMERATED {lte, nr, both}
OPTIONAL, -- Need M
    simultaneousTCI-UpdateList1-r16              SEQUENCE (SIZE (1..maxNrofServingCellsTCI-r16)) OF
ServCellIndex   OPTIONAL, -- Need R
    simultaneousTCI-UpdateList2-r16              SEQUENCE (SIZE (1..maxNrofServingCellsTCI-r16)) OF
ServCellIndex   OPTIONAL, -- Need R
    simultaneousSpatial-UpdatedList1-r16         SEQUENCE (SIZE (1..maxNrofServingCellsTCI-r16)) OF
```

-continued

| CellGroupConfig information element | |
|---|---|
| ServCellIndex   OPTIONAL, -- Need R | |
| simultaneousSpatial-UpdatedList2-r16 | SEQUENCE (SIZE (1..maxNrofServingCellsTCI-r16)) OF |
| ServCellIndex   OPTIONAL, -- Need R | |
| uplinkTxSwitchingOption-r16 | ENUMERATED {switchedUL, dualUL} |
| OPTIONAL, -- Need R | |
| uplinkTxSwitchingPowerBoosting-r16 | ENUMERATED {enabled} |
| OPTIONAL -- Need R | |
| ]], | |
| [[ | |
| reportUplinkTxDirectCurrentTwoCarrier-r16 | ENUMERATED {true} |
| OPTIONAL -- Need N | |
| ]], | |
| [[ | |
| flc-TransferPathNRDC-r17 | ENUMERATED {mcg, scg, both} |
| OPTIONAL, -- Need M | |
| uplinkTxSwitching-2T-Mode-r17 | ENUMERATED {enabled} |
| OPTIONAL, -- Cond 2Tx | |
| uplinkTxSwitching-DualUL-TxState-r17 | ENUMERATED {oneT, twoT} |
| OPTIONAL, -- Cond 2Tx | |
| uu-Relay-RLC-ChannelToAddModList-r17 | SEQUENCE (SIZE(1..maxUu-Relay-RLC-ChannelID-r17)) |
| OF Uu-Relay-RLC-ChannelConfig-r17 | |
| OPTIONAL, -- Need N | |
| uu-Relay-RLC-ChannelToReleaseList-r17 | SEQUENCE (SIZE(1..maxUu-Relay-RLC-ChannelID-r17)) |
| OF Uu-Relay-RLC-ChannelID-r17 | |
| OPTIONAL, -- Need N | |
| simultaneousU-TCI-UpdateList1-r17 | SEQUENCE (SIZE (1..maxNrofServingCellsTCI-r16)) OF |
| ServCellIndex   OPTIONAL, -- Need R | |
| simultaneousU-TCI-UpdateList2-r17 | SEQUENCE (SIZE (1..maxNrofServingCellsTCI-r16)) OF |
| ServCellIndex   OPTIONAL, -- Need R | |
| simultaneousU-TCI-UpdateList3-r17 | SEQUENCE (SIZE (1..maxNrofServingCellsTCI-r16)) OF |
| ServCellIndex   OPTIONAL, -- Need R | |
| simultaneousU-TCI-UpdateList4-r17 | SEQUENCE (SIZE (1..maxNrofServingCellsTCI-r16)) OF |
| ServCellIndex   OPTIONAL, -- Need R | |
| rlc-BearerToReleaseListExt-r17 | SEQUENCE (SIZE (1..maxLC-ID)) OF |
| LogicalChannelIdentityExt-r17 | OPTIONAL -- Need N |
| ]] | |
| } | |
| -- Serving cell specific MAC and PHY parameters for a SpCell: | |
| SpCellConfig ::= | SEQUENCE { |
| servCellIndex | ServCellIndex |
| OPTIONAL, -- Cond SCG | |
| reconfigurationWithSync | ReconfigurationWithSync |
| OPTIONAL, -- Cond ReconfWithSync | |
| rlf-TimersAndConstants | SetupRelease { RLF-TimersAndConstants } |
| OPTIONAL, -- Need M | |
| rlmInSyncOutOfSyncThreshold | ENUMERATED {n1} |
| OPTIONAL, -- Need S | |
| spCellConfigDedicated | ServingCellConfig |
| OPTIONAL, -- Need M | |
| ..., | |
| [[ | |
| lowMobilityEvaluationConnected-r17 | SEQUENCE { |
| s-SearchDeltaP-Connected-r17 | ENUMERATED {ffs}, |
| t-SearchDeltaP-Connected-r17 | ENUMERATED {ffs} |
| } | |
| OPTIONAL, -- Need R | |
| goodServingCellEvaluationRLM-r17 | GoodServingCellEvaluation-r17 |
| OPTIONAL, -- Need R | |
| goodServingCellEvaluationBFD-r17 | GoodServingCellEvaluation-r17 |
| OPTIONAL, -- Need R | |
| deactivatedSCG-Config-r17 | SetupRelease { DeactivatedSCG-Config-r17 } |
| OPTIONAL -- Need M | |
| ]] | |
| } | |
| ReconfigurationWithSync ::= | SEQUENCE { |
| spCellConfigCommon | ServingCellConfigCommon |
| OPTIONAL, -- Need M | |
| newUE-Identity | RNTI-Value, |
| t304 | ENUMERATED {ms50, ms100, ms150, ms200, ms500, ms1000, |
| ms2000, ms10000}, | |
| rach-ConfigDedicated | CHOICE { |
| uplink | RACH-ConfigDedicated, |
| supplementaryUplink | RACH-ConfigDedicated |
| } | |
| OPTIONAL, -- Need N | |
| ..., | |
| [[ | |

| CellGroupConfig information element | |
|---|---|
| smtc<br>OPTIONAL -- Need S<br>]],<br>[[<br>daps-UplinkPowerConfig-r16<br>OPTIONAL -- Need N<br>]],<br>[[<br>sl-PathSwitchConfig-r17<br>OPTIONAL -- DirectToIndirect-PathSwitch<br>]]<br>} | SSB-MTC<br><br><br><br>DAPS-UplinkPowerConfig-r16<br><br><br><br>SL-PathSwitchConfig-r17 |

HandoverCommand

This message is used to transfer the handover command as generated by the target gNB. Direction: target gNB to source gNB/source RAN.

| HandoverCommand message |
|---|
| -- ASN1START<br>-- TAG-HANDOVER-COMMAND-START<br>HandoverCommand ::=                    SEQUENCE {<br>   criticalExtensions                 CHOICE {<br>     c1                               CHOICE{<br>       handoverCommand              HandoverCommand-IEs,<br>       spare3 NULL, spare2 NULL, spare1 NULL<br>     },<br>     criticalExtensionsFuture         SEQUENCE { }<br>   }<br>}<br>HandoverCommand-IEs ::=                SEQUENCE {<br>   handoverCommandMessage             OCTET STRING (CONTAINING RRCReconfiguration),<br>   nonCriticalExtension               SEQUENCE { }<br>OPTIONAL<br>}<br>-- TAG-HANDOVER-COMMAND-STOP<br>-- ASN1STOP |

| HandoverCommand field descriptions |
|---|
| handoverCommandMessage<br>Contains the RRCReconfiguration message used to perform handover within NR or handover to NR, as generated (entirely) by the target gNB. |

HandoverPreparationInformation

This message is used to transfer the NR RRC information used by the target gNB during handover preparation or UE context retrieval, e.g. in case of resume or re-establishment, including UE capability information. This message is also used for transferring the information between the CU and DU.

Direction: source gNB/source RAN to target gNB or CU to DU.

| HandoverPreparationInformation message |
|---|
| -- ASN1START<br>-- TAG-HANDOVER-PREPARATION-INFORMATION-START<br>HandoverPreparationInformation ::=       SEQUENCE {<br>   criticalExtentions                    CHOICE {<br>     C1                                  CHOICE{<br>       handoverPreparationInformation     HandoverPreparationInformation-IEs,<br>       spare3 NULL, spare2 NULL, spar1 Null<br>     },<br>     criticalExtensionFuture             SEQUENCE { }<br>   }<br>}<br>HandoverPreparationInformation-IEs ::=   SEQUENCE {<br>   ue-CapabilityRAT-List                 UE-CapabilityRAT-ContainerList,<br>   sourceConfig                          AS-Config<br>OPTIONAL, -- cond HO<br>   rrm-Config                            RRM-Config<br>OPTIONAL,<br>   as-Context                            AS-Context |

| HandoverPreparationInformation message | |
|---|---|
| OPTIONAL,<br>  nonCriticalExtention<br>OPTIONAL<br>} | SEQUENCE { } |
| As-config ::=<br>  rrcReconfiguration<br>...,<br>[[<br>sourceRB-SN-Config<br>OPTIONAL,<br>sourceSCG-NR-config<br>OPTIONAL,<br>sourceSCG-EUTRA-Config<br>OPTIONAL<br>]],<br>[[<br>sourceSCG-Configured<br>OPTIONAL<br>]]<br>} | SEQUEN CE {<br>  OCTET STRING (CONTAINING RRCReconfiguration),<br><br><br>OCTET STRING (CONTAINING RadioBearerConfig)<br><br>OCTET STRING (CONTAINING RRCReconfiguraiton)<br><br>OCTET STRING<br><br><br><br>ENUMERATED {true} |
| AS-Context ::=<br>  reestablishmentInfor<br>OPTIONAL,<br>  configRestrictInfo<br>OPTIONAL,<br>...,<br>[[ ran-NotificationAreaInfo<br>OPTIONAL<br>]],<br>[[ ueAssistanceInformation<br>OPTIONAL -- Cond HO2<br>]],<br>[[<br>selectedBandCombinationSN<br>OPTIONAL<br>]],<br>[[<br>configRestrictInfoDAPS-r16<br>OPTIONAL,<br>sidelinkUEInformationNR-r16<br>OPTIONAL,<br>sidelinkUEInformationEUTRA-r16<br>OPTIONAL,<br>ueAssistanceInformationEUTRA-r16<br>OPTIONAL,<br>ueAssistanceInformationSCG-r16<br>OPTIONAL, -- Cond HO2<br>needForGapsInfoNR-r16<br>OPTIONAL<br>]],<br>[[<br>configRestrictInfoDAPS-v1640<br>OPTIONAL<br>]],<br>[[<br>needForNCSG-InfoNR-r17<br>OPTIONAL,<br>needForNCSG-InfoEUTRA-r17<br>OPTIONAL,<br>mbsInterest Indication-r17<br>OPTIONAL<br>]]<br>} | SEQUENCE {<br>  ReestablishmentInfo<br><br>ConfigRestrictInfoSCG<br><br><br>RAN-NotificationAreaInfo<br><br><br>OCTET STRING (CONTAINING UEAssistanceInformation)<br><br><br>BandCombinationInfoSN<br><br><br>ConfigRestrictInfoDAPS-r16<br><br>OCTET STRING<br><br>OCTET STRING<br><br>OCTET STRING<br><br>OCTET STRING (CONTAINING UEAssistanceInformation)<br><br>NeedForGapsInfoNR-r16<br><br><br>ConfigRestrictInfoDAPS-v1640<br><br><br>NeedForNCSG-InfoNR-r17<br><br>NeedForNCSG-InfoEUTRA-r17<br><br>OCTET STRING (CONTAINING MBSInterestIndication-r17) |
| ConfigRestrictInfoDAPS-r16 ::=<br>  powerCoordination-r165<br>    p-DAPS-source-r16<br>    p-DAPS-Target-r16<br>    uplinkPowerSharingDAPS-Mode-r16<br>mode2, dynamic }<br>  }<br>OPTIONAL<br>} | SEQUENCE {<br>  SEQUENCE {<br>    P-Max,<br>    P-Max,<br>    ENUMERATED (semi-static-model, semi-static- |
| configRestrictInfoDAPS-v1640 ::=<br>  sourceFeatureSetPerDownlinkCC-r16<br>  sourceFeatureSetPerUplinkCC-r16<br>} | SEQUENCE {<br>  FeatureSetDownlinkPerCC-Id,<br>  FeatureSetUplinkPerCC-Id |
| ReestablishmentInfo ::= | SEQUENCE { |

| HandoverPreparationInformation message | |
|---|---|
| sourcePhysCellId | PhysCellId, |
| targetCellShortMAC-I | ShortMAC-I, |
| additionalReestabInfoList | ReestabNCellInfoList |
| OPTIONAL | |
| } | |
| ReestabNCellInfoList ::= | SEQUENCE ( SIZE (1..MaxCellPrep) ) OF ReestabNCellInfo |
| ReestabNCellInfo ::= SEQUENCE{ | |
|    cellIdentity | CellIdentity, |
|    key-gNodeB-Start | BIT STRING (SIZE (256)), |
|    short-MAC-I | ShortMAC-I |
| } | |
| RRM-Config ::= | SEQUENCE { |
|    ue-InactiveTime | ENUMERATED { |
| | s1, s2, s3, s5, s7, s10, s15, s20, |
| | s25, s30, s40, s50, min1, min1s20, min1s40, |
| | min2, min2s30, min3, min3s30, min4, min5, min6, |
| | min7, min8, min9, min10, min12, min14, min17, min20, |
| | min24, min28, min33, min38, min44, min50, hr1, |
| | hr1min30, hr2, hr2min30, hr3, hr3min30, hr4, hr5, hr6, |
| | hr8, hr10, hr13, hr16, hr20, day1, day1hr12, day2, |
| | day2hr12, day3, day4, day5, day7, day10, day14, day19, |
| | day24, day30, dayMoreThan30} |
| OPTIONAL, | |
|    candidateCellInfoList | MeasResultList2NR |
| OPTIONAL, | |
|    ..., | |
|    [[ | |
|    candidateCellInfoListSN-EUTRA | MeasResultServFreqListEUTRA-SCG |
| OPTIONAL | |
|    ]] | |
| } | |
| -- TAG-HANDOVER-PREPARATION-INFORMATION-STOP | |
| -- AN1STOP | |

| HandoverPreparationInformation field descriptions |
|---|
| as-Context |
| Local RAN context required by the target gNB or DU. |
| rrm-Config |
| Local RAN context used mainly for RRM purposes. |
| sourceConfig |
| The radio resource configuration as used in the source cell. |
| ue-CapabilityRAT-List |
| The UE radio access related capabilities concerning RATs supported by the UE. A gNB that retrieves MRDC related capability containers ensures that the set of included MRDC containers is consistent w.r.t. the feature set related information. |
| ue-InactiveTime |
| Duration while UE has not received or transmitted any user data. Thus the timer is still running in case e.g., UE measures the neighbour cells for the HO purpose. Value s1 corresponds to 1 second, s2 corresponds to 2 seconds and so on. Value min1 corresponds to 1 minute, value min1s20 corresponds to 1 minute and 20 seconds, value min1s40 corresponds to 1 minute and 40 seconds and so on. Value hr1 corresponds to 1 hour, hr1min30 corresponds to 1 hour and 30 minutes and so on. |

| AS-Config field descriptions |
|---|
| rrcReconfiguration |
| Contains the RRCReconfiguration configuration as generated entirely by the MN. |
| sourceRB-SN-Config |
| Contains the IE RadioBearerConfig as generated entirely by the SN. This field is only used when the UE is configured with SN terminated RB(s). |
| sourceSCG-Configured |
| Value true indicates that the UE is configured with NR or EUTRA SCG in source configuration. The field is only used in NR-DC and NE-DC and is included only if the fields sourceSCG-NR-Config and sourceSCG-EUTRA-Config are absent. |
| sourceSCG-EUTRA-Config |
| Contains the current dedicated SCG configuration in RRCConnectionReconfiguration message |

AS-Config field descriptions as specified in TS 36.331 [10] and generated entirely by the SN. In this version of the specification, the E-UTRA RRCConnectionReconfiguration message can only include the field scg-Configuration . This field is only used in NE-DC.
sourceSCG-NR-Config
Contains the current dedicated SCG configuration in RRCReconfiguration message as generated entirely by the SN. In this version of the specification, the RRCReconfiguration message can only include fields secondaryCellGroup and measConfig. This field is only used in NR-DC.

AS-Context field descriptions configRestrictInfoDAPS
Includes fields for which source cell explicitly indicates the restriction to be observed by target cell during DAPS handover.
mbsInterestIndication
Includes the information last reported by the UE in the NR MBSInterestIndication message, if any.
needForGapsInfoNR
Includes measurement gap requirement information of the UE for NR target bands.
selectedBandCombinationSN
Indicates the band combination selected by SN in (NG)EN-DC, NE-DC, and NR-DC.
sidelinkUEInformationEUTRA
This field includes SidelinkUEInformation IE as specified in TS 36.331 [10].
sidelinkUEInformationNR
This field includes SidelinkUEInformationNR IE.
ueAssistanceInformation
Includes for each UE assistance feature the information last reported by the UE, if any.
ueAssistanceInformationSCG
Includes for each UE assistance feature associated with the SCG, the information last reported by the UE in the NR UEAssistanceInformation message for the SCG, if any.

Figure 14:
FIG. 14 is a reproduction of FIG. 5.5.5.1-1 of 3GPP R2-2206823.

3GPP R2-2206823 introduces the following:
5.5.5 Measurement Reporting
5.5.5.1 General
[FIG. 5.5.5.1-1 of 3GPP R2-2206823, Entitled "Measurement Reporting", is Reproduced as FIG. 14]
The purpose of this procedure is to transfer measurement results from the UE to the network. The UE shall initiate this procedure only after successful AS security activation.
For the measId for which the measurement reporting procedure was triggered, the UE shall set the measResults within the MeasurementReport message as follows:
  1> set the measId to the measurement identity that triggered the measurement reporting;
  1> for each serving cell configured with servingCellMO:
    2> if the reportConfig associated with the measId that triggered the measurement reporting includes rsType:
      3> if the serving cell measurements based on the rsType included in the reportConfig that triggered the measurement report are available:
        4> set the measResultServingCell within measResultServingMOList to include RSRP, RSRQ and the available SINR of the serving cell, derived based on the rsType included in the reportConfig that triggered the measurement report;
    2> else:
      3> if SSB based serving cell measurements are available:
        4> set the measResultServingCell within measResultServingMOList to include RSRP, RSRQ and the available SINR of the serving cell, derived based on SSB;
      3> else if CSI-RS based serving cell measurements are available:
        4> set the measResultServingCell within measResultServingMOList to include RSRP, RSRQ and the available SINR of the serving cell, derived based on CSI-RS;
  1> set the servCellId within measResultServingMOList to include each NR serving cell that is configured with servingCellMO, if any;
  1> if the reportConfig associated with the measId that triggered the measurement reporting includes reportQuantityRS-Indexes and maxNrofRS-IndexesToReport:
    2> for each serving cell configured with servingCellMO, include beam measurement information according to the associated reportConfig as described in 5.5.5.2;
  1> if the reportConfig associated with the measId that triggered the measurement reporting includes reportAddNeighMeas:
    2> for each measObjectId referenced in the measIdList which is also referenced with servingCellMO, other than the measObjectId corresponding with the measId that triggered the measurement reporting:
      3> if the measObjectNR indicated by the servingCellMO includes the RS resource configuration corresponding to the rsType indicated in the reportConfig:
        4> set the measResultBestNeighCell within measResultServingMOList to include the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR;

4> if the reportConfig associated with the measId that triggered the measurement reporting includes reportQuantityRS-Indexes and maxNrofRS-IndexesToReport:

5> for each best non-serving cell included in the measurement report:

6> include beam measurement information according to the associated reportConfig as described in 5.5.5.2;

1> if the reportConfig associated with the measId that triggered the measurement reporting is set to event-Triggered and eventID is set to eventA3, or eventA4, or eventA5, or eventB1, or eventB2:

2> if the UE is in NE-DC and the measurement configuration that triggered this measurement report is associated with the MCG:

3> set the measResultServFreoListEUTRA-SCG to include an entry for each E-UTRA SCG serving frequency with the following:

4> include carrierFreq of the E-UTRA serving frequency;

4> set the measResultServingCell to include the available measurement quantities that the UE is configured to measure by the measurement configuration associated with the SCG;

4> if reportConfig associated with the measId that triggered the measurement reporting includes reportAddNeighMeas:

5> set the measResultServFreoListEUTRA-SCG to include within measResultBestNeighCell the quantities of the best non-serving cell, based on RSRP, on the concerned serving frequency;

1> if reportConfig associated with the measId that triggered the measurement reporting is set to eventTriggered and eventID is set to eventA3, or eventA4, or eventA5:

2> if the UE is in NR-DC and the measurement configuration that triggered this measurement report is associated with the MCG:

3> set the measResultServFreoListNR-SCG to include for each NR SCG serving cell that is configured with servingCellMO, if any, the following:

4> if the reportConfig associated with the measId that triggered the measurement reporting includes rsType:

5> if the serving cell measurements based on the rsType included in the reportConfig that triggered the measurement report are available according to the measurement configuration associated with the SCG:

6> set the measResultServingCell within measResultSeryFreqListNR-SCG to include RSRP, RSRQ and the available SINR of the serving cell, derived based on the rsType included in the reportConfig that triggered the measurement report;

4> else:

5> if SSB based serving cell measurements are available according to the measurement configuration associated with the SCG:

6> set the measResultServingCell within measResultSeryFreqListNR-SCG to include RSRP, RSRQ and the available SINR of the serving cell, derived based on SSB;

5> else if CSI-RS based serving cell measurements are available according to the measurement configuration associated with the SCG:

6> set the measResultServingCell within measResultSeryFreqListNR-SCG to include RSRP, RSRQ and the available SINR of the serving cell, derived based on CSI-RS;

4> if results for the serving cell derived based on SSB are included:

5> include the ssbFrequency to the value indicated by ssbFrequency as included in the MeasObjectNR of the serving cell;

4> if results for the serving cell derived based on CSI-RS are included:

5> include the refFreqCSI-RS to the value indicated by refFreqCSI-RS as included in the MeasObjectNR of the serving cell;

4> if the reportConfig associated with the measId that triggered the measurement reporting includes reportQuantityRS-Indexes and maxNrofRS-IndexesToReport:

5> for each serving cell configured with servingCellMO, include beam measurement information according to the associated reportConfig as described in 5.5.5.2, where availability is considered according to the measurement configuration associated with the SCG;

4> if reportConfig associated with the measId that triggered the measurement reporting includes reportAddNeighMeas:

5> if the measObjectNR indicated by the servingCellMO includes the RS resource configuration corresponding to the rsType indicated in the reportConfig:

6> set the measResultBestNeighCellListNR within measResultSeryFreaListNR-SCG to include one entry with the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR, where availability is considered according to the measurement configuration associated with the SCG;

7> if the reportConfig associated with the measId that triggered the measurement reporting includes reportQuantityRS-Indexes and maxNrofRS-IndexesToReport:

8> for each best non-serving cell included in the measurement report:

9> include beam measurement information according to the associated reportConfig as described in 5.5.5.2, where availability is considered according to the measurement configuration associated with the SCG;
1> if the measRSSI-ReportConfig is configured within the corresponding reportConfig for this measId:
2> set the rssi-Result to the linear average of sample value(s) provided by lower layers in the reportInterval;
2> set the channelOccupancy to the rounded percentage of sample values which are beyond the channelOccupancyThreshold within all the sample values in the reportInterval;
1> if the UE is acting as L2 U2N Remote UE:
2> set the sl-MeasResultServingRelay to include the SL-RSRP of the serving L2 U2N Relay U E;
NOTE 1: In case of no data transmission from L2 U2N Relay UE to L2 U2N Remote UE, it is left to UE implementation whether to use SL-RSRP or SD-RSRP when setting the sl-MeasResultServingRelay of the serving L2 U2N Relay UE.
1> if there is at least one applicable neighbouring cell/or candidate L2 U2N Relay UE to report:
2> if the reportType is set to eventTriggered or periodical:
3> if the measurement report concerns the candidate L2 U2N Relay UE:
4> set the sl-MeasResultsCandRelay in measResultNeighCells to include the best candidate L2 U2N Relay UEs up to maxReportCells in accordance with the following:
5> if the reportType is set to event Triggered:
6> include the L2 U2N Relay UEs included in the relaysTriggeredList as defined within the VarMeasReportList for this measId;
5> else:
6> include the applicable L2 U2N Relay UEs for which the new measurement results became available since the last periodical reporting or since the measurement was initiated or reset;
5> for each L2 U2N Relay UE that is included in the sl-MeasResultsCandRelay:
6> include the sl-RelayUE-Identity;
5> for each included L2 U2N Relay UE, include the layer 3 filtered measured results in accordance with the reportConfig for this measId, ordered as follows:
6> set the sl-MeasResult to include the quantity (ies) indicated in the reportQuantityRelay within the concerned reportConfigRelay in decreasing order of the sorting quantity, determined as specified in 5.5.5.3, i.e. the best L2 U2N Relay UE is included first;
[ . . . ]
1> else:
2> submit the MeasurementReport message to lower layers for transmission, upon which the procedure ends.
[ . . . ]

5.8.3 Sidelink UE Information for NR Sidelink Communication 5.8.3.1 General

Figure 15:
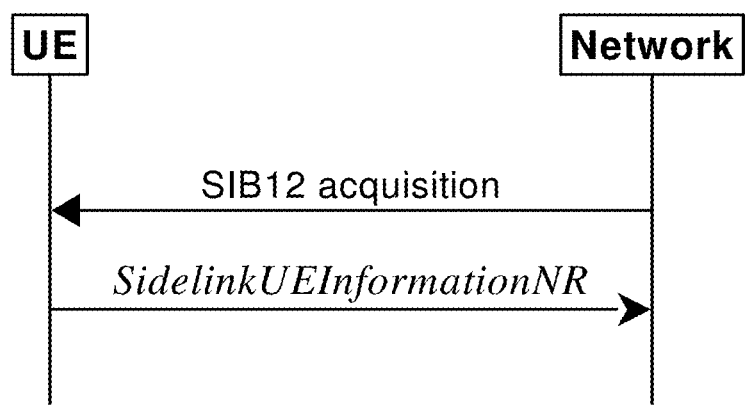
FIG. 15 is a reproduction of FIG. 5.8.3.1-1 of 3GPP R2-2206823.

[FIG. 5.8.3.1-1 of 3GPP R2-2206823, Entitled "Sidelink UE Information for $N_R$ Sidelink Communication", is Reproduced as FIG. 15]

The purpose of this procedure is to inform the network that the UE:
is interested or no longer interested to receive or transmit NR sidelink communication,
is requesting assignment or release of transmission resource for NR sidelink communication,
is reporting QoS parameters and QoS profile(s) related to NR sidelink communication,
is reporting that a sidelink radio link failure or sidelink RRC reconfiguration failure has been detected,
is reporting the sidelink UE capability information of the associated peer UE for unicast communication,
is reporting the RLC mode information of the sidelink data radio bearer(s) received from the associated peer UE for unicast communication,
is reporting the sidelink DRX configuration received from the associated peer UE for NR sidelink unicast communication,
is reporting the sidelink DRX assistance information received from the associated peer UE for NR sidelink unicast communication,
is reporting, for NR sidelink groupcast or broadcast communication, [FFS on additional information],
is reporting, for NR sidelink groupcast or broadcast communication, the Destination Layer-2 ID and QoS profile associated with its interested services that sidelink DRX is applied,
is reporting DRX configuration reject information from its associated peer RX UE, when the UE is a TX UE and is performing sidelink operation with resource allocation mode 1,
is reporting parameters related to U2N relay operation.
Editor's Note: FFS on the additional information/Tx profile, pending on reply from SA2 relate to WA "no additional RAN2 work if SA2 confirms it is feasible (whether the mapping from L2 id to TX profile is feasible in the gNB (like what we did in LTE)".

5.8.3.2 Initiation

A UE capable of NR sidelink communication or NR sidelink discovery or NR sidelink U2N relay operation that is in RRC_CONNECTED may initiate the procedure to indicate it is (interested in) receiving or transmitting NR sidelink communication or NR sidelink discovery or NR sidelink U2N relay operation in several cases including upon successful connection establishment or resuming, upon change of interest, upon changing QoS profiles, upon receiving UECapabilityInformationSidelink from the associated peer UE, upon RLC mode information updated from the associated peer UE or upon change to a PCell providing SIB12 including sl-ConfigCommonNR. A UE capable of NR sidelink communication may initiate the procedure to request assignment of dedicated sidelink DRB configuration and transmission resources for NR sidelink communication transmission. A UE capable of NR sidelink communication may initiate the procedure to report to the network that a sidelink radio link failure or sidelink RRC reconfiguration failure has been declared. A UE capable of NR sidelink discovery may initiate the procedure to request assignment of dedicated resources for sidelink discovery transmission or sidelink discovery reception. A UE capable of U2N relay operation may initiate the procedure to report/update parameters for acting as U2N Relay UE or U2N Remote UE (including L2 Remote UE's source L2 ID).

A UE capable of NR sidelink communication that is in RRC_CONNECTED may initiate the procedure to report the sidelink DRX configuration received from the associated peer UE for NR sidelink unicast communication, upon accepting the sidelink DRX configuration from the associated peer UE. A UE capable of NR sidelink communication that is in RRC_CONNECTED and is performing sidelink operation with resource allocation mode 1 may initiate the procedure to report the sidelink DRX assistance information received from the associated peer UE for NR sidelink unicast communication, upon receiving sidelink DRX assistance information from the associated peer UE.

An RX UE capable of NR sidelink communication that is in RRC_CONNECTED may initiate the procedure to report the Destination Layer-2 ID and QoS profile associated with its interested services that sidelink DRX is applied, for NR sidelink groupcast or broadcast communication. Upon initiating this procedure, the UE shall:

1> if SIB12 including sl-ConfigCommonNR is provided by the PCell:
  2> ensure having a valid version of SIB12 for the PCell;
  2> if configured by upper layers to receive NR sidelink communication on the frequency included in sl-FreqInfoList in SIB12 of the PCell:
    3> if the UE did not transmit a SidelinkUEInformationNR message since last entering RRC_CONNECTED state; or
    3> if since the last time the UE transmitted a SidelinkUEInformationNR message the UE connected to a PCell not providing SIB12 including sl-ConfigCommonNR; or
    3> if the last transmission of the SidelinkUEInformationNR message did not include sl-RxInterestedFreqList; or if the frequency configured by upper layers to receive NR sidelink communication on has changed since the last transmission of the SidelinkUEInformationNR message:
      4> initiate transmission of the SidelinkUEInformationNR message to indicate the NR sidelink communication reception frequency of interest in accordance with
    3> if the UE received a sidelink DRX configuration for NR sidelink unicast communication from the associated peer UE and the UE accepted the sidelink DRX configuration:
      4> initiate transmission of the SidelinkUEInformationNR message to report the sidelink DRX configuration in accordance with 5.8.3.3;
    3> if the UE is an RX UE for NR sidelink groupcast or broadcast communication and is interested in a service that sidelink DRX is applied:
      4> initiate transmission of the SidelinkUEInformationNR message to report the Destination Layer-2 ID and QoS profile associated with the service in accordance with 5.8.3.3;
  2> else:
    3> if the last transmission of the SidelinkUEInformationNR message included sl-RxInterestedFreqList:
      4> initiate transmission of the SidelinkUEInformationNR message to indicate it is no longer interested in NR sidelink communication reception in accordance with
  2> if configured by upper layers to transmit non-relay NR sidelink communication on the frequency included in sl-FreqInfoList in SIB12 of the PCell:
    3> if the UE did not transmit a SidelinkUEInformationNR message since last entering RRC_CONNECTED state; or
    3> if since the last time the UE transmitted a SidelinkUEInformationNR message the UE connected to a PCell not providing SIB12 including sl-ConfigCommonNR; or
    3> if the last transmission of the SidelinkUEInformationNR message did not include sl-TxResourceReqList; or if the information carried by the sl-TxResourceReqList has changed since the last transmission of the SidelinkUEInformationNR message:
      4> initiate transmission of the SidelinkUEInformationNR message to indicate the NR sidelink communication transmission resources required by the UE in accordance with 5.8.3.3;
    3> if the UE received a sidelink DRX assistance information for NR sidelink unicast communication from the associated peer UE:
      4> initiate transmission of the SidelinkUEInformationNR message to report the sidelink DRX assistance information in accordance with 5.8.3.3;
  2> else:
    3> if the last transmission of the SidelinkUEInformationNR message included sl-TxResourceReqList:
      4> initiate transmission of the SidelinkUEInformationNR message to indicate it no longer requires NR sidelink communication transmission resources in accordance with 5.8.3.3.
  2> if configured by upper layer to receive NR sidelink non-relay discovery messages on the frequency included in sl-FreqInfoList in SIB12 of the PCell including sl-NonRelayDiscovery:
    3> if the UE did not transmit a SidelinkUEInformationNR message since last entering RRC_CONNECTED state; or
    3> if since the last time the UE transmitted a SidelinkUEInformationNR message the UE connected to a PCell not providing SIB12 including sl-ConfigCommonNR or connected to a PCell providing SIB12 but not including sl-NonRelayDiscovery; or
    3> if the last transmission of the SidelinkUEInformationNR message did not include sl-RxInterestedFreqListDisc; or if the frequency configured by upper layers to receive NR sidelink discovery messages on has changed since the last transmission of the SidelinkUEInformationNR message:
      4> initiate transmission of the SidelinkUEInformationNR message to indicate the NR sidelink discovery reception frequency of interest in accordance with 5.8.3.3;
  2> else:
    3> if the last transmission of the SidelinkUEInformationNR message included sl-RxInterestedFreqListDisc:
      4> initiate transmission of the SidelinkUEInformationNR message to indicate it is no longer interested in NR sidelink discovery messages reception in accordance with
  2> if configured by upper layer to receive NR sidelink L2 U2N relay discovery messages on the frequency included in sl-FreqInfoList in SIB12 of the PCell including sl-L2U2N-Relay; or if configured by upper layer to receive NR sidelink L3 U2N relay discovery messages on the frequency included in sl-FreqInfoList in SIB12 of the PCell including sl-L3U2N-RelayDiscovery:
    3> if the UE did not transmit a SidelinkUEInformationNR message since last entering RRC_CONNECTED state; or 3> if since the last time the UE transmitted a SidelinkUEInformationNR message the UE connected to a PCell not providing SIB12 including sl-ConfigCommonNR or connected to a PCell providing SIB12 but not including sl-L2U2N-Relay in case of L2 U2N relay operation or connected to a PCell providing SIB12 but not including sl-L3U2N-RelayDiscovery in case of L3 U2N relay operation; or
3> if the last transmission of the SidelinkUEInformationNR message did not include sl-RxInterestedFreqListDisc; or if the frequency configured by upper layers to receive NR sidelink discovery messages on has changed since the last transmission of the SidelinkUEInformationNR message:
   4> if the UE is capable of U2N Relay UE, and if SIB12 includes sl-RelayUE-ConfigCommon, and if the U2N Relay UE threshold conditions as specified in 5.8.14.2 are met; or
   4> if the UE is selecting a U2N Relay UE/has a selected U2N Relay UE, and if SIB12 includes sl-RemoteUE-ConfigCommon, and if the U2N Remote UE threshold conditions as specified in 5.8.15.2 are met:
      5> initiate transmission of the SidelinkUEInformationNR message to indicate the NR sidelink discovery reception frequency of interest in accordance with
2> else:
   3> if the last transmission of the SidelinkUEInformationNR message included sl-RxInterestedFreqListDisc:
      4> initiate transmission of the SidelinkUEInformationNR message to indicate it is no longer interested in NR sidelink discovery messages reception in accordance with 5.8.3.3;
2> if configured by upper layer to transmit NR sidelink non-relay discovery messages on the frequency included in sl-FreqInfoList in SIB12 of the PCell including sl-NonRelayDiscovery:
   3> if the UE did not transmit a SidelinkUEInformationNR message since last entering RRC_CONNECTED state; or
   3> if since the last time the UE transmitted a SidelinkUEInformationNR message the UE connected to a PCell not providing SIB12 including sl-ConfigCommonNR or connected to a PCell providing SIB12 but not including sl-NonRelayDiscovery; or
   3> if the last transmission of the SidelinkUEInformationNR message did not include sl-TxResourceReqListDisc; or if the information carried by the sl-TxResourceReqListDisc has changed since the last transmission of the SidelinkUEInformationNR message:
      4> initiate transmission of the SidelinkUEInformationNR message to indicate the NR sidelink non-relay discovery messages resources required by the UE in accordance with 5.8.3.3;
2> else:
   3> if the last transmission of the SidelinkUEInformationNR message included sl-TxResourceReqListDisc:
      4> initiate transmission of the SidelinkUEInformationNR message to indicate it no longer requires NR sidelink non-relay discovery messages resources in accordance with 5.8.3.3;
2> if configured by upper layer to transmit NR sidelink L2 U2N relay discovery messages on the frequency included in sl-FreqInfoList in SIB12 of the PCell including sl-L2U2N-Relay; or if configured by upper layer to transmit NR sidelink L3 U2N relay discovery messages on the frequency included in sl-FreqInfoList in SIB12 of the PCell including sl-L3U2N-RelayDiscovery:
   3> if the UE did not transmit a SidelinkUEInformationNR message since last entering RRC_CONNECTED state; or
   3> if since the last time the UE transmitted a SidelinkUEInformationNR message the UE connected to a PCell not providing SIB12 including sl-ConfigCommonNR or connected to a PCell providing SIB12 but not including sl-L2U2N-Relay in case L2 U2N relay operation or connected to a PCell providing SIB12 but not including sl-L3U2N-RelayDiscovery in case of L3 U2N relay operation; or
   3> if the last transmission of the SidelinkUEInformationNR message did not include sl-TxResourceReqListDisc; or if the information carried by the sl-TxResourceReqListDisc has changed since the last transmission of the SidelinkUEInformationNR message:
      4> if the UE is capable of U2N Relay UE, and if SIB12 includes sl-RelayUE-ConfigCommon, and if the U2N Relay UE threshold conditions as specified in are met; or
      4> if the UE is selecting a U2N Relay UE/has a selected U2N Relay UE, and if SIB12 includes sl-RemoteUE-ConfigCommon, and if the U2N Remote UE threshold conditions as specified in 5.8.15.2 are met:
         5> initiate transmission of the SidelinkUEInformationNR message to indicate the NR sidelink relay discovery messages resources required by the UE in accordance with 5.8.3.3;
2> else:
   3> if the last transmission of the SidelinkUEInformationNR message included sl-TxResourceReqListDisc:
      4> initiate transmission of the SidelinkUEInformationNR message to indicate it no longer requires NR sidelink relay discovery messages resources in accordance with 5.8.3.3;
2> if configured by upper layer to transmit NR sidelink L2 U2N relay communication on the frequency included in sl-FreqInfoList in SIB12 of the PCell including sl-L2U2N-Relay or if configured by upper layer to transmit NR sidelink L3 U2N relay communication on the frequency included in sl-FreqInfoList in SIB12 of the PCell including sl-L3U2N-RelayDiscovery:
   3> if the UE did not transmit a SidelinkUEInformationNR message since last entering RRC_CONNECTED state; or
   3> if since the last time the UE transmitted a SidelinkUEInformationNR message the UE connected to a PCell not providing SIB12 including sl-ConfigCommonNR or connected to a PCell providing SIB12 but not including sl-L2U2N-Relay in case L2 U2N relay operation or connected to a PCell providing SIB12 but not including sl-L3U2N-RelayDiscovery in case of L3 U2N relay operation; or 3> if the last transmission of the SidelinkUEInformationNR message did not include sl-TxResourceReqL2U2N-Relay; or if the information carried by the sl-TxResourceReqL2U2N-Relay has changed since the last transmission of the SidelinkUEInformationNR message:
    4> if the UE is capable of U2N Relay UE, and if SIB12 includes sl-RelayUE-ConfigCommon, and if the U2N Relay UE threshold conditions as specified in are met; or
    4> if the UE is selecting a U2N Relay UE/has a selected U2N Relay UE, and if SIB12 includes sl-RemoteUE-ConfigCommon, and if the U2N Remote UE threshold conditions as specified in 5.8.15.2 are met:
        5> initiate transmission of the SidelinkUEInformationNR message to indicate the NR sidelink relay discovery messages resources required by the UE in accordance with 5.8.3.3;
2> else:
    3> if the last transmission of the SidelinkUEInformationNR message included sl-TxResourceReqListDisc:
        4> initiate transmission of the SidelinkUEInformationNR message to indicate it no longer requires NR sidelink relay discovery messages resources in accordance with 5.8.3.3;

5.8.3.3 Actions Related to Transmission of SidelinkUEInformationNR Message

The UE shall set the contents of the SidelinkUEInformationNR message as follows:

1> if the UE initiates the procedure to indicate it is (no more) interested to receive NR sidelink communication or to request (configuration/release) of NR sidelink communication transmission resources or to report to the network that a sidelink radio link failure or sidelink RRC reconfiguration failure has been declared or to report to the network the sidelink DRX configuration for NR sidelink unicast communication or to report to the network the sidelink DRX assistance information for NR sidelink unicast communication or to report the Destination Layer-2 ID and QoS profile associated with its interested services that sidelink DRX is applied for NR sidelink groupcast or broadcast communication or to indicate it is (no more) interested to receive NR sidelink discovery messages or to request (configuration/release) of NR sidelink discovery messages transmission resources or to request (configuration/release) of NR sidelink U2N relay communication transmission resources (i.e. UE includes all concerned information, irrespective of what triggered the procedure):
    2> if SIB12 including sl-ConfigCommonNR is provided by the PCell:
        3> if configured by upper layers to receive NR sidelink communication:
            4> include sl-RxInterestedFreoList and set it to the frequency for NR sidelink communication reception;
            4> include sl-RxDRX-ReportList and set its fields (if needed) as follows for each destination for which it reports to network:
                5> if sl-DRX-ConfigCommon-GC-BC is included in SIB12-IEs:
                    6> set sl-DRX-ConfigFromTx to include the accepted sidelink DRX configuration of the associated destination, if received from the associated peer UE;
                6> set sl-RxInterestedQoS-InfoList to include the QoS profile of its interested service for the associated destination for NR sidelink groupcast or broadcast communication;
        3> if configured by upper layers to transmit non-relay NR sidelink communication:
            4> include sl-TxResourceReqList and set its fields (if needed) as follows for each destination for which it requests network to assign NR sidelink communication resource:
                5> set sl-DestinationIdentity to the destination identity configured by upper layer for NR sidelink communication transmission;
                5> set sl-CastType to the cast type of the associated destination identity configured by the upper layer for the NR sidelink communication transmission;
                5> set sl-RLC-ModeIndication to include the RLC mode(s) and optionally QoS profile(s) of the sidelink QoS flow(s) of the associated RLC mode(s), if the associated bi-directional sidelink DRB has been established due to the configuration by RRCReconfigurationSidelink;
                5> set sl-QoS-InfoList to include QoS profile(s) of the sidelink QoS flow(s) of the associated destination configured by the upper layer for the NR sidelink communication transmission;
                5> set sl-InterestedFreqList to indicate the frequency of the associated destination for NR sidelink communication transmission;
                5> set sl-TypeTxSyncList to the current synchronization reference type used on the associated sl-InterestedFreqList for NR sidelink communication transmission.
                5> set sl-CapabilityInformationSidelink to include
                5> UECapabilityInformationSidelink message, if any, received from the associated peer UE.
                5> if sl-DRX-ConfigCommon-GC-BC is included in SIB12-IEs and UE is configured with sl-ScheduledConfig:
                    6> set sl-DRX-InfoFromRx to include the sidelink DRX assistance information of the associated destination, if any, received from the associated peer UE;
    Editor's Note: FFS on the message used for Tx UE to report DRX configuration reject information.
            4> if a sidelink radio link failure or a sidelink RRC reconfiguration failure has been declared, according to clauses 5.8.9.3 and 5.8.9.1.8, respectively;
            5> include sl-FailureList and set its fields as follows for each destination for which it reports the NR sidelink communication failure:
                6> set sl-DestinationIdentity to the destination identity configured by upper layer for NR sidelink communication transmission;
                6> if the sidelink RLF is detected as specified in clause 5.8.9.3:
                    7> set sl-Failure as rlf for the associated destination for the NR sidelink communication transmission;
                6> else if RRCReconfigurationFailureSidelink is received:
                    7> set sl-Failure as configFailure for the associated destination for the NR sidelink communication transmission;

3> if SIB12 including sl-NonRelayDiscovery and if configured by upper layers to receive NR sidelink non-relay discovery messages, or if SIB12 including sl-L2U2N-Relay and if configured by upper layers to receive NR sidelink L2 U2N relay discovery messages, or if SIB12 including sl-L3U2N-RelayDiscovery and if configured by upper layers to receive NR sidelink L3 U2N relay discovery messages:
  4> include sl-RxInterestedFreqListDisc and set it to the frequency for NR sidelink discovery messages reception;
  4> if the UE is capable of L2 U2N remote UE:
    5> include sl-SourceIdentityRemoteUE and set it to the source identity configured by upper layer for NR sidelink L2 U2N relay communication transmission;

3> if SIB12 including sl-NonRelayDiscovery and if configured by upper layers to transmit NR sidelink non-relay discovery messages, or if SIB12 including sl-L2U2N-Relay and if configured by upper layers to transmit NR sidelink L2 U2N relay discovery messages, or if SIB12 including sl-L3U2N-RelayDiscovery and if configured by upper layers to transmit NR sidelink L3 U2N relay discovery messages:
  4> include sl-TxResourceReqUstDisc and set its fields (if needed) as follows for each destination for which it requests network to assign NR sidelink discovery messages resource:
    5> set sl-DestinationIdentityDisc to the destination identity configured by upper layer for NR sidelink discovery messages transmission;
    5> if the UE is acting as L2 U2N Relay UE; 6> set sl-SourceIdentityRelayUE to the source identity configured by upper layer for NR sidelink L2 U2N relay discovery messages transmission;
    5> set sl-CastTypeDisc to the cast type of the associated destination identity configured by the upper layer for the NR sidelink discovery messages transmission;
    5> set sl-TxInterestedFreqUstDisc to indicate the frequency of the associated destination for NR sidelink discovery messages transmission;
    5> set sl-TypeTxSyncListDisc to the current synchronization reference type used on the associated sl-InterestedFreqUst for NR sidelink discovery messages transmission;
    5> set sl-DiscoveryType to the current discovery type of the associated destination identity configured by the upper layer for NR sidelink discovery messages transmission;

3> if SIB12 including sl-L2U2N-Relay and if configured by upper layers to transmit NR sidelink L2 U2N relay communication and the UE is acting as L2 U2N Relay UE:
  4> include sl-TxResourceReqL2U2N-Relay in sl-TxResourceReqUstCommRelay and set its fields (if needed) as follows for each destination for which it requests network to assign NR sidelink L2 U2N relay communication resource:
    5> set sl-DestinationIdentityL2U2N to the destination identity configured by upper layer for NR sidelink L2 U2N relay communication transmission;
    5> set sl-TxInterestedFreqListL2U2N to indicate the frequency of the associated destination for NR sidelink L2 U2N relay communication transmission;
    5> set sl-TypeTxSyncListL2U2N to the current synchronization reference type used on the associated sl-InterestedFreqUstL2U2N for NR sidelink L2 U2N relay communication transmission;
    5> set sl-LocalID-Request to request local ID for L2 U2N Remote UE;
    5> set sl-PagingIdentityRemoteUE to the paging UE ID received from peer L2 U2N Remote UE;
    5> set sl-CapabilityInformationSidelink to include UECapabilityInformationSidelink message, if any, received from peer UE.
  4> include ue-Type and set it to relayUE;

3> if SIB12 including sl-L2U2N-Relay and if configured by upper layers to transmit NR sidelink L2 U2N relay communication and the UE has a selected L2 U2N Relay UE:
  5> 4> include sl-TxResourceReqL2U2N-Relay in sl-TxResourceReqUstCommRelay and set its fields (if needed) as follows to request network to assign NR sidelink L2 U2N relay communication resource:
    5> set sl-TxInterestedFreqUstL2U2N to indicate the frequency of the associated destination for NR sidelink L2 U2N relay communication transmission;
    5> set sl-TypeTxSyncListL2U2N to the current synchronization reference type used on the associated sl-InterestedFreqUstL2U2N for NR sidelink L2 U2N relay communication transmission;
    5> set sl-CapabilityInformationSidelink to include UECapabilityInformationSidelink message, if any, received from peer UE.
  4> include ue-Type and set it to remoteUE;

3> if SIB12 including sl-L3U2N-RelayDiscovery and if configured by upper layers to transmit NR sidelink L3 U2N relay communication:
  4> include sl-TxResourceReqL3U2N-Relay in sl-TxResourceReqUstCommRelay and set its fields (if needed) as follows for each destination for which it requests network to assign NR sidelink L3 U2N relay communication resource:
    5> set sl-DestinationIdentity to the destination identity configured by upper layer for NR sidelink L3 U2N relay communication transmission;
    5> set sl-CostType to the cast type of the associated destination identity configured by the upper layer for the NR sidelink L3 U2N relay communication transmission;
    5> set sl-RLC-ModeIndication to include the RLC mode(s) and optionally QoS profile(s) of the sidelink QoS flow(s) of the associated RLC mode(s), if the associated bi-directional sidelink DRB has been established due to the configuration by RRCReconfigurationSidelink;
    5> set sl-QoS-InfoList to include QoS profile(s) of the sidelink QoS flow(s) of the associated destination configured by the upper layer for the NR sidelink L3 U2N relay communication transmission;
    5> set sl-TxInterestedFreqList to indicate the frequency of the associated destination for NR sidelink L3 U2N relay communication transmission;
    5> set sl-TypeTxSyncList to the current synchronization reference type used on the associated sl-InterestedFreqUst for NR sidelink L3 U2N relay communication transmission.
    5> set sl-CapabilityInformationSidelink to include UECapabilityInformationSidelink message, if any, received from peer UE.
      4> include ue-Type and set it to relayUE if the UE is acting as NR sidelink L3 U2N Relay UE or to remoteUE otherwise;
1> if the UE initiates the procedure while connected to an E-UTRA PCell:
    2> submit the SidelinkUEInformationNR to lower layers via SRB1, embedded in E-UTRA RRC message ULInformationTransferIRAT as specified in TS 36.331 [10], clause 5.6.28;
1> else:
    2> submit the SidelinkUEInformationNR message to lower layers for transmission.
[ . . . ]
5.8.9.1 Sidelink RRC Reconfiguration
5.8.9.1.1 General
[FIG. 5.8.9.1.1-1 of 3GPP R2-2206823, Entitled "Sidelink RRC Reconfiguration, Successful", is Reproduced as FIG. 16]
The purpose of this procedure is to modify a PC5-RRC connection, e.g. to establish/modify/release sidelink DRBs or PC5 Relay RLC channels, to (re-)configure NR sidelink measurement and reporting, to (re-)configure sidelink CSI reference signal resources and CSI reporting latency bound. The UE may initiate the sidelink RRC reconfiguration procedure and perform the operation in clause 5.8.9.1.2 on the corresponding PC5-RRC connection in following cases:
    the release of sidelink DRBs associated with the peer UE, as specified in clause 5.8.9.1a.1;
    the establishment of sidelink DRBs associated with the peer UE, as specified in clause
    the modification for the parameters included in SLRB-Config of sidelink DRBs associated with the peer UE, as specified in clause 5.8.9.1a.2;
    the release of PC5 Relay RLC channels for L2 U2N Relay UE and Remote UE, as specified in clause 5.8.9.7.1;
    the establishment of PC5 Relay RLC channels for L2 U2N Relay UE and Remote UE, as specified in clause 5.8.9.7.2;
    the modification for the parameters included in SL-RLC-ChannelConfigPC5 of PC5 Relay RLC channels for L2 U2N Relay UE and Remote UE, as specified in clause 5.8.9.7.2;
    the (re-)configuration of the peer UE to perform NR sidelink measurement and report.
    the (re-)configuration of the sidelink CSI reference signal resources and CSI reporting latency bound;
    the (re-)configuration of the peer UE to perform sidelink DRX.
In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.
5.8.9.1.2 Actions Related to Transmission of RRCReconfigurationSidelink Message
The UE shall set the contents of RRCReconfigurationSidelink message as follows:
    1> for each sidelink DRB that is to be released, according to clause 5.8.9.1a.1.1, due to configuration by sl-ConfigDedicatedNR, SIB12, SidelinkPreconfigNR or by upper layers:
      2> set the SLRB-PC5-ConfigIndex included in the slrb-ConfigToReleaseList corresponding to the sidelink DRB;
    1> for each sidelink DRB that is to be established or modified, according to clause due to receiving sl-ConfigDedicatedNR, SIB12 or SidelinkPreconfigNR:
      2> set the SLRB-Config included in the slrb-ConfigToAddModList, according to the received sl-Rodio-BearerConfig and sl-RLC-BearerConfig corresponding to the sidelink DRB;
    1> set the sl-MeasConfig as follows:
      2> If the frequency used for NR sidelink communication is included in sl-FreqInfoToAddModList in sl-ConfigDedicatedNR within RRCReconfiguration message or included in sl-ConfigCommonNR within S1B12:
        3> if UE is in RRC_CONNECTED:
          4> set the sl-MeasConfig according to stored NR sidelink measurement configuration information for this destination;
        3> if UE is in RRC_IDLE or RRC_INACTIVE:
          4> set the sl-MeasConfig according to stored NR sidelink measurement configuration received from SIB12;
      2> else:
        3> set the sl-MeasConfig according to the sl-MeasPreconfig in SidelinkPreconfigNR;
    1> start timer T400 for the destination associated with the sidelink DRB;
    1> set the sl-CSI-RS-Config;
    1> set the sl-LatencyBoundCSI-Report,
    NOTE 1: How to set the parameters included in sl-CSI-RS-Config and sl-LatencyBoundCSI-Report is up to UE implementation.
    1> set the sl-DRX-ConfigUC-PC5 as follows:
      2> If the frequency used for NR sidelink communication is included in sl-FreqInfoToAddModList in sl-ConfigDedicatedNR within RRCReconfiguration message or included in sl-ConfigCommonNR within SIB12:
        3> if UE is in RRC_CONNECTED and is performing sidelink operation with resource allocation mode 1:
          4> set the sl-DRX-ConfigUC-PC5 according to stored NR sidelink DRX configuration information for this destination.
        3> else if UE is in RRC_CONNECTED and is performing sidelink operation with resource allocation mode 2:
          4> UE determines the sidelink DRX configuration for unicast for the associated peer U E;

NOTE 2: If UE is in RRC_IDLE or in RRC_INACTIVE or out of coverage, it is up to UE implementation to set the sl-DRX-ConfigUC-PC5.
1> for each PC5 Relay RLC channel that is to be released due to configuration by si-ConfigDedicatedNR:
   2> set the SL-RLC-ChannelID corresponding to the PC5 Relay RLC channel in the sl-RLC-ChannelToReleaseListPC5;
1> for each PC5 Relay RLC channel that is to be established or modified due to receiving si-ConfigDedicatedNR:
   2> set the SL-RLC-ChannelConfigPC5 included in the sl-RLC-ChannelToAddModListPC5, according to the received sl-RLC-ChannelConfig corresponding to the PC5 Relay RLC channel;
The UE shall submit the RRCReconfigurationSidelink message to lower layers for transmission.

5.8.9.1.3 Reception of an RRCReconfigurationSidelink by the UE

The UE shall perform the following actions upon reception of the RRCReconfigurationSidelink:
1> if the RRCReconfigurationSidelink includes the sl-ResetConfig:
   2> perform the sidelink reset configuration procedure as specified in 5.8.9.1.10;
1> if the RRCReconfigurationSidelink includes the slrb-ConfigToReleaseList:
   2> for each SLRB-PC5-ConfigIndex value included in the slrb-ConfigToReleaseList that is part of the current UE sidelink configuration;
      3> perform the sidelink DRB release procedure, according to clause 5.8.9.1a.1;
1> if the RRCReconfigurationSidelink includes the slrb-ConfigToAddModList:
   2> for each slrb-PC5-ConfigIndex value included in the slrb-ConfigToAddModList that is not part of the current UE sidelink configuration:
      3> if sl-MappedQoS-FlowsToAddList is included:
         4> apply the SL-PQFI included in sl-MappedQoS-FlowsToAddList;
      3> perform the sidelink DRB addition procedure, according to clause 5.8.9.1a.2;
   2> for each slrb-PC5-ConfigIndex value included in the slrb-ConfigToAddModList that is part of the current UE sidelink configuration:
      3> if sl-MappedQoS-FlowsToAddList is included:
         4> add the SL-PQFI included in sl-MappedQoS-FlowsToAddList to the corresponding sidelink DRB;
      3> if sl-MappedQoS-FlowsToReleaseList is included:
         4> remove the SL-PQFI included in sl-MappedQoS-FlowsToReleaseList from the corresponding sidelink DRB;
      3> if the sidelink DRB release conditions as described in clause 5.8.9.1a.1.1 are met:
         4> perform the sidelink DRB release procedure according to clause 5.8.9.1a.1.2;
      3> else if the sidelink DRB modification conditions as described in clause 5.8.9.1a.2.1 are met:
         4> perform the sidelink DRB modification procedure according to clause 5.8.9.1a.2.2;
1> if the RRCReconfigurationSidelink message includes the sl-MeasConfig:
   2> perform the sidelink measurement configuration procedure as specified in 5.8.10;
1> if the RRCReconfigurationSidelink message includes the sl-CSI-RS-Config:
   2> apply the sidelink CSI-RS configuration;
1> if the RRCReconfigurationSidelink message includes the sl-LatencyBoundCSI-Report:
   2> apply the configured sidelink CSI report latency bound;
1> if the RRCReconfigurationSidelink includes the sl-RLC-ChannelToReleaseListPC5:
   2> for each SL-RLC-ChannelID value included in the sl-RLC-ChannelToReleaseListPC5 that is part of the current UE sidelink configuration;
      3> perform the PC5 Relay RLC channel release procedure, according to clause 5.8.9.7.1;
1> if the RRCReconfigurationSidelink includes the sl-RLC-ChannelToAddModListPC5:
   2> for each sl-RLC-ChannelID-PC5 value included in the sl-RLC-ChannelToAddModListPC5 that is not part of the current UE sidelink configuration:
      3> perform the sidelink RLC channel addition procedure, according to clause 5.8.9.7.2;
   2> for each sl-RLC-ChannelID-PC5 value included in the sl-RLC-ChannelToAddModListPC5 that is part of the current UE sidelink configuration:
      3> perform the PC5 Relay RLC channel modification procedure according to clause 5.8.9.7.2;
1> if the UE is unable to comply with (part of) the configuration included in the RRCReconfigurationSidelink (i.e. sidelink RRC reconfiguration failure):
   2> continue using the configuration used prior to the reception of the RRCReconfigurationSidelink message;
   2> set the content of the RRCReconfigurationFailureSidelink message;
      3> submit the RRCReconfigurationFailureSidelink message to lower layers for transmission;
1> else:
   2> set the content of the RRCReconfigurationCompleteSidelink message;
      3> submit the RRCReconfigurationCompleteSidelink message to lower layers for transmission;
NOTE 1: When the same logical channel is configured with different RLC mode by another UE, the UE handles the case as sidelink RRC reconfiguration failure.

[ . . . ]

MeasResults

The IE MeasResults covers measured results for intra-frequency, inter-frequency, inter-RAT mobility and measured results for NR sidelink communication.

| MeasResults information element |
| --- |
| -- ASN1START |
| -- TAG-MEASRESULTS-START |
| MeasResults ::=      SEQUENCE { |
|   measId            MeasId, |
|   measResultServingMOList    MeasResultServMOList, |
|   measResultNeighCells     CHOICE { |
|     measResultListNR       MeasResultListNR, |
|     ..., |
|     measResultListEUTRA     MeasResultListEUTRA, |
|     measResultListUTRA-     MeasResultListUTRA- |
|     FDD-r16             FDD-r16, |
|     sl-MeasResultsCandRelay-r17   SL-MeasResultsRelay-r17 |

| MeasResults information element |
|---|
| }<br>OPTIONAL,<br>  ...,<br>  -<br>}<br>-<br>-- TAG-MEASRESULTS-STOP<br>-- ASN1STOP |

| MeasResults field descriptions |
|---|
| sl-MeasResultsCandRelay<br>Measurement result(s) of candiate L2 U2N relay UE(s). |

SL-MeasResultsRelay

The IE SL-MeasResultsRelay covers measured results of L2 U2N Relay UEs.

| SL-MeasResultsRelay information element |
|---|
| -- ASN1START<br>-- TAG-SL-MEASRESULTSRELAY-START<br>SL-MeasResultsRelay-r17 ::=      SEQUENCE {<br>  sl-MeasResultsListRelay-r17      SEQUENCE {<br>    sl-MeasResultListRelay-r17      SEQUENCE (SIZE (1.. maxNrofRelayMeas-r17)) OF SL-MeasResultRelay-r17,<br>    ...<br>  },<br>  ...<br>}<br>SL-MeasResultRelay-r17 ::=      SEQUENCE {<br>  cellIdentity-r17      CellAccessRelatedInfo<br>OPTIONAL,<br>  sl-RelayUE-Identity-r17      SL-SourceIdentity-r17,<br>  sl-MeasResult-r17      SL-MeasResult-r16,<br>  ...<br>}<br>-- Rapporteur's note: The following two IEs are defined in PC5 module but redifined here to avoid IMPORTS to RRC module.<br>SL-MeasResult-r16 ::=      SEQUENCE {<br>  sl-ResultDMRS-r16      SL-MeasQuantityResult-r16<br>OPTIONAL,<br>  ...<br>}<br>SL-MeasQuantityResult-r16 ::=      SEQUENCE {<br>  sl-RSRP-r16      RSRP-Range<br>OPTIONAL,<br>  ...<br>}<br>-- TAG-SL-MEASRESULTSRELAY-STOP<br>-- ASN1STOP |

| SL-MeasResultsRelay field descriptions |
|---|
| sl-MeasResultListRelay<br>Include the measured results for L2 U2N Relay UEs. |

| SL-MeasResultRelay field descriptions |
|---|
| sl-RelayUE-Identity |
| The identity of the measured L2 U2N Relay UE's source L2 ID. |
| cellIdentity |
| The information used to identify the L2 U2N relay UE's serving cell. |

CellAccessRelatedInfo
The IE CellAccessRelatedInfo indicates cell access related information for this cell.

| CellAccessRelatedInfo information element |
|---|
| -- ASN1START<br>-- TAG-CELLACCESSRELATEDINFO-START |

-continued

| CellAccessRelatedInfo information element |
|---|

```
CellAccessRelatedInfo ::=            SEQUENCE {
    plmn-IdentityInfoList               PLMN-IdentityInfoList,
    cellReservedForOtherUse             ENUMERATED {true}       OPTIONAL,   -- Need R
    ...,
    [[
    cellReservedForFutureUse-r16        ENUMERATED {true}       OPTIONAL,   -- Need R
    npn-IdentityInfoList-r16            NPN-IdentityInfoList-r16 OPTIONAL   -- Need R
    ]],
    [[
    snpn-AccessInfoList-r17             SEQUENCE (SIZE (1..maxNPN-r16)) OF SNPN-AccessInfo-r17
OPTIONAL -- Need R
    ]]
}
SNPN-AccessInfo-r17 ::=              SEQUENCE {
    extCH-Supported-r17                 ENUMERATED {true}       OPTIONAL,   -- Need R
    extCH-WithoutConfigAllowed-r17      ENUMERATED {true}       OPTIONAL,   -- Need R
    onboardingEnabled-r17               ENUMERATED {true}       OPTIONAL,   -- Need R
    imsEmergencySupportForSNPN-r17      ENUMERATED {true}       OPTIONAL    -- Need R
}
-- TAG-CELLACCESSRELATEDINFO-STOP
-- ASN1STOP
```

SidelinkUEInformationNR

The SidelinkUEinformationNR message is used for the indication of NR sidelink UE information to the network.

Signalling radio bearer: SRB1
RLC-SAP: AM
Logical channel: DCCH
Direction: UE to Network

| SidelinkUEInformationNR message |
|---|

```
-- ASN1START
-- TAG-SIDELINKUEINFORMATIONNR-START
SidelinkUEInformationNR-r16::=           SEQUENCE {
    criticalExtensions                      CHOICE {
        sidelinkUEInformationNR-r16             SidelinkUEInformationNR-r16-IEs,
        criticalExtensionsFuture                SEQUENCE { }
    }
}
SidelinkUEInformationNR-r16-IEs ::=      SEQUENCE {
    sl-RxInterestedFreqList-r16             SL-InterestedFreqList-r16           OPTIONAL,
    sl-TxResourceReqList-r16                SL-TxResourceReqList-r16            OPTIONAL,
    sl-FailureList-r16                      SL-FailureList-r16                  OPTIONAL,
    lateNonCriticalExtension                OCTET STRING                        OPTIONAL,
    nonCriticalExtention                    SidelinkUEInformationNR-v1700-IEs   OPTIONAL
}
SidelinkUEInformationNR-v1700-IEs ::=    SEQUENCE {
    sl-TxResourceReqList-v1700              SL-TxResourceReqList-v1700
OPTIONAL,
    sl-RxDRX-ReportList-v1700               SL-RxDRX-ReportList-v1700
OPTIONAL,
    sl-RxInterestedFreqListDisc-r17         SL-InterestedFreqList-r16
OPTIONAL,
    sl-TxResourceReqListDisc-r17            SL-TxResourceReqListDisc-r17
OPTIONAL,
    sl-TxResourceReqListCommRelay-r17       SL-TxResourceReqListCommRelay-r17
OPTIONAL,
    ue-Type-r17                             ENUMERATED {relayUE, remoteUE}
OPTIONAL,
    sl-SourceIdentityRemoteUE-r17           SL-SourceIdentity-r17
OPTIONAL,
    nonCriticalExtension                    SEQUENCE { }
OPTIONAL
}
SL-InterestedFreqList-r16 ::=            SEQUENCE (SIZE (1..maxNrofFreqSL-r16)) OF INTEGER
(1..maxNrofFreqSL-r16)
SL-TxResourceReqList-r16 :: =            SEQUENCE (SIZE (1..maxNrofSL-Dest-r16)) OF SL-
TxResourceReq-r16
SL-TxResourceReq-r16 :: =                SEQUENCE {
    sl-DestinationIdentity-r16              SL-DestinationIdentity-r16,
    sl-CastType-r16                         ENUMERATED {broadcast, groupcast, unicast, spare1},
    sl-RLC-ModeIndicationList-r16           SEQUENCE (SIZE (1.. maxNrofSLRB-r16)) OF SL-RLC-
```

| SidelinkUEInformationNR message | |
|---|---|
| ModeIndication-r16  OPTIONAL, | |
| sl-QoS-InfoList-r16 | SEQUENCE (SIZE (1..maxNrofSL-QFIsPerDest-r16)) OF SL-QoS-Info-r16   OPTIONAL, |
| sl-TypeTxSyncList-r16 | SEQUENCE (SIZE (1..maxNrofFreqSL-r16)) OF SL-TypeTxSync-r16     OPTIONAL, |
| sl-TxInterestedFreqList-r16 | SL-TxInterestedFreqList-r16 OPTIONAL, |
| sl-CapabilityInformationSidelink-r16 | OCTET STRING OPTIONAL |
| } | |
| SL-TxResourceReqList-v1700 ::= | SEQUENCE (SIZE (1..maxNrofSL-Dest-r16)) OF SL-TxResourceReq-v1700 |
| SL-RxDRX-ReportList-v1700 ::= | SEQUENCE (SIZE (1..maxNrofSL-Dest-r16)) OF SL-RxDRX-Report-v1700 |
| SL-TxResourceReq-v1700 ::= | SEQUENCE { |
| sl-DRX-InfoFromRx-List-r17 | SEQUENCE (SIZE (1..maxNrofSL-Rx-InfoSet-r17)) OF SL-DRX-ConfigUC-SemiStatic-r17 OPTIONAL |
| } | |
| SL-RxDRX-Report-v1700 ::= | SEQUENCE { |
| sl-DRX-ConfigFromTx-r17 | SL-DRX-ConfigUC-SemiStatic-r17 OPTIONAL, |
| sl-RxInterestedQoS-InfoList-r17 | SEQUENCE (SIZE (1..maxNrofSL-QFIsPerDest-r16)) OF SL-QoS-Info-r16   OPTIONAL |
| } | |
| SL-TxResourceReqListDisc-r17 ::= | SEQUENCE (SIZE (1..maxNrofSL-Dest-r16)) OF SL-TxResourceReqDisc-r17 |
| SL-TxResourceReqDisc-r17 ::= | SEQUENCE { |
| sl-DestinationIdentityDisc-r17 | SL-DestinationIdentity-r16, |
| sl-SourceIdentityRelayUE-r17 | SL-SourceIdentity-r17 OPTIONAL, |
| sl-CastTypeDisc-r17 | ENUMERATED {broadcast, groupcast, unicast, spare1}, |
| sl-TxInterestedFreqListDisc-r17 | SL-TxInterestedFreqList-r16, |
| sl-TypeTxSyncListDisc-r17 | SEQUENCE (SIZE (1..maxNrofFreqSL-r16) ) OF SL-TypeTxSync-r16, |
| sl-DiscoveryType-r17 | ENUMERATED {relay, non-Relay}, |
| ... | |
| } | |
| SL-TxResourceReqListCommRelay-r17 ::= | SEQUENCE (SIZE (1..maxNrofSL-Dest-r16)) OF SL-TxResourceReqCommRelay-r17 |
| SL-TxResourceReqCommRelay-r17 ::= | CHOICE { |
| sl-TxResourceReqL2U2N-Relay-r17 | SL-TxResourceReqL2U2N-Relay-r17, |
| sl-TxResourceReqL3U2N-Relay-r17 | SL-TxResourceReq-r16 |
| } | |
| SL-TxResourceReqL2U2N-Relay-r17 ::= | SEQUENCE { |
| sl-DestinationIdentityL2U2N-r17 | SL-DestinationIdentity-r16 OPTIONAL, |
| sl-TxInterestedFreqListL2U2N-r17 | SL-TxInterestedFreqList-r16, |
| sl-TypeTxSyncListL2U2N-r17 | SEQUENCE (SIZE (1..maxNrofFreqSL-r16)) OF SL-TypeTxSync-r16, |
| sl-LocalID-Request-r17 | ENUMERATED {true} OPTIONAL, |
| sl-PagingIdentityRemoteUE-r17 | SL-PagingIdentityRemoteUE-r17 OPTIONAL, |
| sl-CapabilityInformationSidelink-r17 | OCTET STRING OPTIONAL, |
| ... | |
| } | |
| SL-TxInterestedFreqList-r16 ::= (1..maxNrofFreqSL-r16) | SEQUENCE (SIZE (1..maxNrofFreqSL-r16)) OF INTEGER |
| SL-QoS-Info-r16 ::= | SEQUENCE { |
| sl-QoS-FlowIdentity-r16 | SL-QoS-FlowIdentity-r16, |
| sl-QoS-Profile-r16 | SL-QoS-Profile-r16 OPTIONAL |
| } | |
| SL-RLC-ModeIndication-r16 ::= | SEQUENCE { |
| sl-Mode-r16 | CHOICE { |
| sl-AM-Mode-r16 | NULL, |
| sl-UM-Mode-r16 | NULL |
| }, | |
| sl-QoS-InfoList-r16 | SEQUENCE (SIZE (1..maxNrofSL-QFIsPerDest-r16)) OF SL-QoS-Info-r16 |
| } | |
| SL-FailureList-r16 ::= | SEQUENCE (SIZE (1..maxNrofSL-Dest-r16)) OF SL-Failure-r16 |
| SL-Failure-r16 ::= | SEQUENCE { |
| sl-DestinationIdentity-r16 | SL-DestinationIdentity-r16, |
| sl-Failure-r16 | ENUMERATED {rlf,configFailure, spare6, spare5, spare4, spare3, spare2, spare1} |

-continued

| SidelinkUEInformationNR message |
|---|
| }<br>-- TAG-SIDELINKUEINFORMATIONNR-STOP<br>-- ASN1STOP |

Editor's Note 1: the content of assistance information for determining sidelink DRX configuration, is FFS.

Editor's Note 2: FFS on inactivity timer to be included in assistance information from RX UE to TX UE.

| SidelinkUEinformationNR field descriptions |
|---|
| sl-RxDRX-ReportList |
| Indicates the reported DRX configuration received from peer UE and the reported QoS profile for which service UE is interested to the network for NR sidelink unicast communication.<br>sl-RxInterestedFreqList |
| Indicates the index of frequency on which the UE is interested to receive NR sidelink communication. The value 1 corresponds to the frequency of first entry in sl-FreqInfoList broadcast in SIB12, the value 2 corresponds to the frequency of second entry in sl-FreqInfoList broadcast in SIB12 and so on. In this release, only value 1 can be included in the interested frequency list.<br>sl-SourceIdentityRemoteUE |
| This field is used to indicate the Source Layer-2 ID to be used to establish PC5 link with the target L2 U2N Relay UE for path switch.<br>sl-TxResourceReq |
| Parameters to request the transmission resources for NR sidelink communication to the network in the Sidelink UE Information report.<br>ue-Type |
| Indicates the UE is acting as U2N Relay UE or U2N Remote UE. |

| SL-TxResourceReq field descriptions |
|---|
| sl-CapabilityInformationSidelink |
| Includes the UECapabilityInformationSidelink message (which can be also included in ueCapabilityInformationSidelink-r16 in UECapabilityEnquirySidelink from peer UE) received from the peer UE.<br>sl-CastType |
| Indicates the cast type for the corresponding destination for which to request the resource.<br>sl-CapabilityInformationSidelink |
| Includes the UECapabilityInformationSidelink message (which can be also included in ueCapabilityInformationSidelink-r16 in UECapabilityEnquirySidelink from peer UE) received from the peer UE.<br>sl-DestinationIdentity |
| Indicates the destination for which the TX resource request and allocation from the network are concerned.<br>sl-DRX-InfoFromRx-List |
| Indicates list of the sidelink DRX assistance information received from peer UE for NR sidelink unicast communication.<br>sl-QoS-InfoList |
| Includes the QoS profile of the sidelink QoS flow as specified in TS 23.287 [55].<br>sl-QoS-FlowIdentity |
| This identity uniquely identifies one sidelink QoS flow between the UE and the network in the scope of UE, which is unique for different destination and cast type.<br>sl-RLC-ModeIndication |
| This field indicates the RLC mode and optionally the related QoS profiles for the sidelink radio bearer, which has not been configured by the network and is initiated by another UE in unicast. The RLC mode for one sidelink radio bearer is aligned between UE and NW by the sl-QoS-FlowIdentity. |

| SL-TxResourceReq field descriptions |
|---|
| sl-TxInterestedFreqList |
| Each entry of this field indicates the index of frequency on which the UE is interested to transmit NR sidelink communication. The value 1 corresponds to the frequency of first entry in sl-FreqInfoList broadcast in SIB12, the value 2 corresponds to the frequency of second entry in sl-FreqInfoList broadcast in SIB12 and so on. In this release, only value 1 can be included in the interested frequency list. In this release, only one entry can be included in the list. |
| sl-CapabilityInformationSidelink |
| Includes the UECapabilityInformationSidelink message (which can be also included in ueCapabilityInformationSidelink-r16 in UECapabilityEnquirySidelink from peer UE) received from the peer UE. |
| sl-TypeTxSyncList |
| A list of synchronization reference used by the UE. The UE shall include the same number of entries, listed in the same order, as in sl-TxInterestedFreqList, i.e. one for each carrier frequency included in sl-TxInterestedFreqList. |

[ . . . ]

| SL-TxResourceReqDisc field descriptions |
|---|
| sl-DestinationIdentityDisc |
| This field is used to indicate the destination L2 ID for which the TX resource request and allocation from the network are concerned for relay discovery and non-relay discovery.. |
| sl-SourceIdentityRelayUE |
| This field is used to indicate the source L2 ID of relay-related discovery transmission by L2 U2N Relay UE. |
| sl-TxInterestedFreqListDisc |
| Each entry of this field indicates the index of frequency on which the UE is interested to transmit NR sidelink discovery. The value 1 corresponds to the frequency of first entry in sl-FreqInfoList broadcast in SIB12, the value 2 corresponds to the frequency of second entry in sl-FreqInfoList broadcast in SIB12 and so on. In this release, only value 1 can be included in the interested frequency list. In this release, only one entry can be included in the list. |

| SL-TxResourceReqCommRelay field descriptions |
|---|
| sl-DestinationIdentityL2U2N |
| This field is used to indicate the destination L2 ID for which the TX resource request and allocation from the network are concerned for the established PC5 link for relay by L2 U2N Relay UE, or L3 U2N Relay UE, or L3 U2N Remote UE. |
| sl-LocalID-Request |
| This field is used to request local UE ID for the corresponding destination by the L2 U2N Relay UE. |
| sl-TxInterestedFreqListL2U2N |
| Each entry of this field indicates the index of frequency on which the UE is interested to transmit NR sidelink communication for established PC5 link for relay. The value 1 corresponds to the frequency of first entry in sl-FreqInfoList broadcast in SIB12, the value 2 corresponds to the frequency of second entry in sl-FreqInfoList broadcast in SIB12 and so on. In this release, only value 1 can be included in the interested frequency list. In this release, only one entry can be included in the list. |
| sl-PagingIdentityRemoteUE |
| This field is used to indicate the paging UE ID(s) for the corresponding destination(s) by the L2 U2N Relay UE. |

[ . . . ]
  SL-ConfigDedicatedNR
The IE SL-ConfigDedicatedNR specifies the dedicated configuration information for NR sidelink communication.

| SL-ConfigDedicatedNR information element |
|---|

```
-- ASN1START
-- TAG-SL-CONFIGDEDICATEDNR-START
SL-ConfigDedicatedNR-r16 ::=            SEQUENCE {
    sl-PHY-MAC-RLC-Config-r16               SL-PHY-MAC-RLC-Config-r16
OPTIONAL,   -- Need M
    sl-RadioBearerToReleaseList-r16         SEQUENCE (SIZE (1..maxNrofSLRB-r16)) OF SLRB-Uu-
ConfigIndex-r16     OPTIONAL,   -- Need N
    sl-RadioBearerToAddModList-r16          SEQUENCE (SIZE (1..maxNrofSLRB-r16)) OF SL-
RadioBearerConfig-r16   OPTIONAL,   -- Need N
    sl-MeasConfigInfoToReleaseList-r16      SEQUENCE (SIZE (1..maxNrofSL-Dest-r16)) OF SL-
DestinationIndex-r16    OPTIONAL,   -- Need N
    sl-MeasConfigInfoToAddModList-r16       SEQUENCE (SIZE (1..maxNrofSL-Dest-r16)) OF SL-
MeasConfigInfo-r16  OPTIONAL,   -- Need R
    t400-r16                                ENUMERATED {ms100, ms200, ms300, ms400, ms600, ms1000,
ms1500, ms2000} OPTIONAL,    -- Need M
    ...,
    [[
    sl-PHY-MAC-RLC-Config-v1700             SL-PHY-MAC-RLC-Config-v1700
OPTIONAL,   -- Need M
    sl-DiscConfig-r17                       SetupRelease { SL-DiscConfig-r17}
OPTIONAL   -- Need M
    ]]
}
SL-DestinationIndex-r16 ::=             INTEGER (0..maxNrofSL-Dest-1-r16)
SL-PHY-MAC-RLC-Config-r16::=            SEQUENCE {
    sl-ScheduledConfig-r16                  SetupRelease { SL-ScheduledConfig-r16 }
OPTIONAL,   -- Need M
    sl-UE-SelectedConfig-r16                SetupRelease { SL-UE-SelectedConfig-r16 }
OPTIONAL,   -- Need M
    sl-FreqInfoToReleaseList-r16            SEQUENCE (SIZE (1..maxNrofFreqSL-r16)) OF SL-Freq-Id-r16
OPTIONAL, -- Need N
    sl-FreqInfoToAddModList-r16             SEQUENCE (SIZE (1..maxNrofFreqSL-r16)) OF SL-FreqConfig-
r16     OPTIONAL,   -- Need N
    sl-RLC-BearerToReleaseList-r16          SEQUENCE (SIZE (1..maxSL-LCID-r16)) OF SL-RLC-
BearerConfigIndex-r16   OPTIONAL,   -- Need N
    sl-RLC-BearerToAddModList-r16           SEQUENCE (SIZE (1..maxSL-LCID-r16)) OF SL-RLC-
BearerConfig-r16    OPTIONAL,   -- Need N
    sl-MaxNumConsecutiveDTX-r16             ENUMERATED {n1, n2, n3, n4, n6, n8, n16, n32}
OPTIONAL,   -- Need M
    sl-CSI-Acquisition-r16                  ENUMERATED {enabled}
OPTIONAL,   -- Need R
    sl-CSI-SchedulingRequestId-r16          SetupRelease {SchedulingRequestId}
OPTIONAL,   -- Need M
    sl-SSB-PriorityNR-r16                   INTEGER (1..8)
OPTIONAL,   -- Need R
    networkControlledSyncTx-r16             ENUMERATED {on, off}
OPTIONAL   -- Need M
}
SL-PHY-MAC-RLC-Config-v1700 ::=         SEQUENCE {
    sl-DRX-Config-r17                       SetupRelease { SL-DRX-Config-r17 }
OPTIONAL,   -- Need M
    sl-RLC-ChannelToReleaseList-r17         SEQUENCE (SIZE (1..maxSL-LCID-r16)) OF SL-RLC-ChannelID-
r17         OPTIONAL,   -- Cond L2U2N
    sl-RLC-ChannelToAddModList-r17          SEQUENCE (SIZE (1..maxSL-LCID-r16)) OF SL-RLC-
ChannelConfig-r17   OPTIONAL,   -- Cond L2U2N
    ...
}
SL-DiscConfig-r17::=                    SEQUENCE {
    sl-RelayUE-Config-r17                   SetupRelease { SL-RelayUE-Config-r17}
OPTIONAL, -- L2RelayUE
    sl-RemoteUE-Config-r17                  SetupRelease { SL-RemoteUE-Config-r17}
OPTIONAL -- L2RemoteUE
}
-- TAG-SL-CONFIGDEDICATEDNR-STOP
-- ASN1STOP
```

SL-L2RelayUE-Config
The IE SL-L2RelayUE-Config is used to configure L2 U2N relay operation related configurations used by L2 U2N Relay UE, e.g. SRAP-Config.

---

SL-L2RelayUE-Config information element

---

```
-- ASN1START
-- TAG-SL-L2RELAYUE-CONFIG-START
SL-L2RelayUE-Config-r17 ::=      SEQUENCE {
    sl-RemoteUE-ToAddModList-r17        SEQUENCE (SIZE (1..maxNrofRemoteUE-r17) ) OF SL-RemoteUE-ToAddMod-r17     OPTIONAL,  -- Need N
    sl-RemoteUE-ToReleaseList-r17       SEQUENCE (SIZE (1..maxNrofRemoteUE-r17) ) OF SL-DestinationIdentity-r16   OPTIONAL,  -- Need N
    ...
}
SL-RemoteUE-ToAddMod-r17 ::=    SEQUENCE {
    sl-L2IdentityRemote-r17             SL-DestinationIdentity-r16,
    sl-SRAP-Config-Relay-r17            SL-SRAP-Config-r17              OPTIONAL,  --Need M
    ...
}
-- TAG-SL-L2RELAYUE-CONFIG-STOP
-- ASN1STOP
```

---

SL-L2RelayUE-Config field descriptions sl-RemoteUE-ToAddModList

List of L2 U2N Remote UEs to be added and modified to the L2 U2N Relay UE.

sl-RemoteUE-ToReleaseList

List of L2 U2N Remote UEs to be released by the L2 U2N Relay UE.

---

SL-L2RemoteUE-Config
The IE SL-L2RemoteUE-Config is used to configure L2 U2N relay operation related configurations used by L2 U2N Remote UE, e.g. SRAP-Config.

---

SL-L2RemoteUE-Config information element

---

```
-- ASN1START
-- TAG-SL-L2REMOTEUE-CONFIG-START
SL-L2RemoteUE-Config-r17 ::=     SEQUENCE {
    sl-SRAP-ConfigRemote-r17            SL-SRAP-Config-r17     OPTIONAL, --Need M
    sl-UEIdentityRemote-r17             RNTI-Value             OPTIONAL, -- Cond FirstRRCReconfig
    ...
}
-- TAG-SL-L2REMOTEUE-CONFIG-STOP
-- ASN1STOP
```

---

SL-L2RemoteUE-Config field descriptions sl-SRAP-ConfigRemote

Indicates SRAP configuration used for L2 U2N Remote UE.

sl-UEIdentityRemote

Indicates the C-RNTI to the L2 U2N Remote UE.

---

| Conditional Presence | Explanation |
| --- | --- |
| FirstRRCReconfig | This field is mandatory present in the first RRCReconfiguration. Otherwise the field is absent. |

SL-SRAP-Config
The IE SL-SRAP-Config is used to set the configurable SRAP parameters used by L2 U2N Relay UE and L2 U2N Remote UE as specified in TS 38.351 [66].

---

SL-SRAP-Config information element

---

```
-- ASN1START
-- TAG-SL-SRAP-CONFIG-START
SL-SRAP-Config-r17 ::=    SEQUENCE {
    sl-LocalIdentity-r17              INTEGER (0..255)      OPTIONAL,  -- Need M
    sl-MappingToAddModList-r17        SEQUENCE (SIZE (1..maxLC-ID) ) OF SL-MappingToAddMod-r17   OPTIONAL,  -- Need N
    sl-MappingToReleaseList-r17       SEQUENCE (SIZE (1..maxLC-ID) ) OF SL-RemoteUE-RB-Identity-r17   OPTIONAL,  -- Need N
    ...
}
SL-MappingToAddMod-r17            SEQUENCE {
    sl-RemoteUE-RB-Identity-r17       SL-RemoteUE-RB-Identity-r17,
    sl-EgressRLC-ChannelUu-r17        Uu-RelayRLC-ChannelID-r17
```

| SL-SRAP-Config information element |
| --- |
| OPTIONAL,   -- L2RelayUE<br>    sl-EgressRLC-ChannelPC5-r17    SL-RLC-ChannelID-r17<br>OPTIONAL,   -- Need N<br>    ...<br>}<br>SL-RemoteUE-RB-Identity-r17 ::=    CHOICE {<br>    srb-Identity-r17    INTEGER (0 .. 3) ,<br>    drb-Identity-r17    DRB-Identity,<br>    ...<br>}<br>-- TAG-SL-SRAP-CONFIG-STOP<br>-- ASN1STOP |

| SL-SRAP-Config field descriptions |
| --- |
| sl-LocalIdentity |
| Indicates the local UE ID of the L2 U2N Remote UE used in SRAP as specified in TS 38.351 [66]. |
| sl-MappingToAddModList |
| Indicates the list of mapping between the bearer identity of the L2 U2N Remote UE and the egress RLC channel as specified in TS 38.351 [66]. |
| sl-MappingToReleaseList |
| Indicates the list of mapping to be released. |
| sl-RemoteUE-RB-Identity |
| Identity of the end-to-end Uu bearer identity of the L2 U2N Remote UE. |
| sl-EgressRLC-ChannelUu |
| Indicates the egress RLC channel on Uu Hop. |
| sl-EgressRLC-ChannelPC5 |
| Indicates the egress RLC channel on PC5 Hop. |

SL-RLC-ChannelConfig

The IE SL-RLC-ChannelConfig specifies the configuration information for PC5 Relay RLC channel between L2 U2N Relay UE and L2 U2N Remote UE.

| SL-RLC-ChannelConfig information element |
| --- |
| -- ASN1START<br>-- TAG-SL-RLC-RLC-CHANNEL-CONFIG-START<br>SL-RLC-ChannelConfig-r17 ::=    SEQUENCE {<br>    sl-RLC-ChannelID-r17    SL-RLC-ChannelID-r17,<br>    sl-RLC-Config-r17    SL-RLC-Config-r16<br>OPTIONAL,   -- Need M<br>    sl-MAC-LogicalChannelConfig-r17    SL-LogicalChannelConfig-r16<br>OPTIONAL,   -- Need M<br>    sl-PacketDelayBudget-r17    INTEGER (0..1023)<br>OPTIONAL,   -- Need M<br>    ...}<br>-- TAG-SL-RLC-CHANNEL-CONFIG-STOP<br>-- ASN1STOP |

| SL-RLC-ChannelConfig field descriptions |
| --- |
| sl-MAC-LogicalChannelConfig |
| The field is used to configure MAC SL logical channel parameters. |
| sl-RLC-ChannelID |
| Indicates the PC5 Relay RLC channel in the link between L2 U2N Relay UE and L2 U2N Remote UE. |
| sl-RLC-Config |
| Determines the RLC mode (UM, AM) and provides corresponding parameters. |
| sl-PacketDelayBudget |
| Indicates the Packet Delay Budget for a PC5 Relay RLC channel. Upper bound value for the delay that a packet may experience expressed in unit of 0.5 ms. |

SL-LogicalChannelConfig

The IE SL-LogicalChannelConfig is used to configure the sidelink logical channel parameters.

| SL-LogicalChannelConfig information element |
| --- |

```
-- ASN1START
-- TAG-SL-LOGICALCHANNELCONFIG-START
SL-LogicalChannelConfig-r16 ::=         SEQUENCE {
    sl-Priority-r16                         INTEGER (1..8) ,
    sl-PrioritisedBitRate-r16               ENUMERATED {kBps0, kBps8, kBps16, kBps32, kBps64,
                                            kBps128, kBps256, kBps512, kBps1024, kBps2048, kBps4096,
                                            kBps8192, kBps16384, kBps32768, kBps65536, infinity},
    sl-BucketSizeDuration-r16               ENUMERATED {ms5, ms10, ms20, ms50, ms100, ms150,
                                            ms300, ms500, ms1000, spare7, spare6, spare5, spare4, spare3,
                                            spare2, spare1),
    sl-ConfiguredGrantType1Allowed-r16      ENUMERATED {true}
OPTIONAL, --Need R
    sl-HARQ-FeedbackEnabled-r16             ENUMERATED {enabled, disabled }
OPTIONAL, -- Need R
    sl-AllowedCG-List-r16                   SEQUENCE (SIZE (0 ..maxNrofCG-SL-1-r16) ) OF SL-
ConfigIndexCG-r16
OPTIONAL, -- Need R
    sl-AllowedSCS-List-r16                  SEQUENCE (SIZE (1..maxSCSs) ) OF SubcarrierSpacing
OPTIONAL, -- Need R
    sl-MaxPUSCH-Duration-r16                ENUMERATED {ms0p02, ms0p04, ms0p0625, ms0p125,
OPTIONAL, -- Need R                         ms0p25, ms0p5, spare2, spare1 }
    sl-LogicalChannelGroup-r16              INTEGER (0..maxLCG-ID)
OPTIONAL, -- Need R
    sl-SchedulingRequestId-r16              SchedulingRequestId
OPTIONAL, -- Need R
    sl-LogicalChannelSR-DelayTimerApplied-r16   BOOLEAN
OPTIONAL, -- Need R
    ...
}
-- TAG-SL-LOGICALCHANNELCONFIG-STOP
-- ASN1STOP
```

SL-RLC-Config

The IE SL-RLC-Config is used to specify the RLC configuration of sidelink DRB. RLC AM configuration is only applicable to the unicast NR sidelink communication.

| SL-RLC-Config information element |
| --- |

```
-- ASN1 START
-- TAG-SL-RLC-CONFIG-
START
SL-RLC-Config-r16 ::=           CHOICE {
    sl-AM-RLC-r16                   SEQUENCE {
        sl-SN-FieldLengthAM-r16         SN-FieldLengthAM
OPTIONAL, -- Cond SLRBSetup
        sl-T-PollRetransmit-r16         T-PollRetransmit,
        sl-PollPDU-r16                  PollPDU,
        sl-PollByte-r16                 PollByte,
        sl-MaxRetxThreshold-r16         ENUMERATED
                                        { t1, t2, t3, t4, t6, t8, t16, t32 },
    ...
    },
    sl-UM-RLC-r16                   SEQUENCE {
        sl-SN-                          SN-FieldLengthUM
```

-continued

| SL-RLC-Config information element |
| --- |

```
        FieldLengthUM-r16
OPTIONAL,
-- Cond SLRBSetup
        ...
    },
    ...
}
-- TAG-SL-RLC-CONFIG-STOP
-- ASN1STOP
```

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE

| RRCReconfiguration message |
| --- |

```
-- ASN1START
-- TAG-RRCRECONFIGURATION-START
RRCReconfiguration-v1560-IEs ::=                SEQUENCE {
    mrdc-SecondaryCellGroupConfig                   SetupRelease { MRDC-SecondaryCellGroupConfig }
OPTIONAL, Need M
    radioBearerConfig2                              OCTET STRING (CONTAINING RadioBearerConfig)
OPTIONAL, -- Need M
    sk-Counter                                      SK-Counter
```

| RRCReconfiguration message |
|---|
| OPTIONAL, -- Need N     nonCriticalExtension                            RRCReconfiguration-v1610-IEs<br>OPTIONAL<br>}<br>RRCReconfiguration-v1610-IEs ::=       SEQUENCE {<br>    otherConfig-v1610                          OtherConfig-v1610<br>OPTIONAL, -- Need M<br>    bap-Config-r16                             SetupRelease { BAP-Config-r16 }<br>OPTIONAL, -- Need M<br>    iab-IP-AddressConfigurationList-r16      IAB-IP-AddressConfigurationList-r16<br>OPTIONAL, -- Need M<br>    conditionalReconfiguration-r16           ConditionalReconfiguration-r16<br>OPTIONAL, -- Need M<br>    daps-SourceRelease-r16                 ENUMERATED {true}<br>OPTIONAL, -- Need N<br>    t316-r16                                 SetupRelease {T316-r16}<br>OPTIONAL, -- Need M<br>    needForGapsConfigNR-r16             SetupRelease {NeedForGapsConfigNR-r16}<br>OPTIONAL, -- Need M<br>    onDemandSIB-Request-r16             SetupRelease { OnDemandSIB-Request-r16 }<br>OPTIONAL, -- Need M<br>    dedicatedPosSysInfoDelivery-r16     OCTET STRING (CONTAINING PosSystemInformation-<br>OPTIONAL, -- Need N                             r16-IEs)<br>    sl-ConfigDedicatedNR-r16            SetupRelease {SL-ConfigDedicatedNR-r16}<br>OPTIONAL, -- Need M<br>    sl-ConfigDedicatedEUTRA-Info-r16     SetupRelease { SL-ConfigDedicatedEUTRA-Info-r16}<br>OPTIONAL, -- Need M<br>    targetCellSMTC-SCG-r16                 SSB-MTC<br>OPTIONAL, -- Need S<br>    nonCriticalExtension                        RRCReconfiguration-v1700-IEs<br>OPTIONAL<br>}<br>RRCReconfiguration-v1700-IEs =        SEQUENCE {<br>    otherConfig-v1700                          OtherConfig-v1700<br>OPTIONAL, -- Need M<br>    ul-GapFR2-Config-r17                     SetupRelease { UL-GapFR2-Config-r17 }<br>OPTIONAL, -- Need M<br>    sl-L2RelayUE-Config-r17               SetupRelease { SL-L2RelayUE-Config-r17 }<br>OPTIONAL, -- Need M<br>    sl-L2RemoteUE-Config-r17             SetupRelease { SL-L2RemoteUE-Config-r17 }<br>OPTIONAL, -- Need M<br>    dedicatedPagingDelivery-r17             OCTET STRING (CONTAINING Paging)<br>OPTIONAL, -- Cond PagingRelay<br>    needForNCSG-ConfigNR-r17             SetupRelease {NeedForNCSG-ConfigNR-r17}<br>OPTIONAL, -- Need M<br>    needForNCSG-ConfigEUTRA-r17        SetupRelease {NeedForNCSG-ConfigEUTRA-r17}<br>OPTIONAL, -- Need M<br>    musim-GapConfig-r17                      SetupRelease {MUSIM-GapConfig-r17}<br>OPTIONAL, -- Need M<br>    scg-State-r17                               ENUMERATED { deactivated }<br>OPTIONAL, -- Need S<br>    appLayerMeasConfig-r17                 AppLayerMeasConfig-r17<br>OPTIONAL, -- Need M<br>    nonCriticalExtension                        SEQUENCE { }<br>OPTIONAL<br>}<br>...<br>-- TAG-RRCRECONFIGURATION-STOP<br>-- ASN1STOP |

| RRCReconfiguration-IEs field descriptions |
|---|
| sl-L2RelayUE-Config |
| Contains L2 U2N relay operation related configurations used by a UE acting as or to be acting as a L2 U2N Relay UE. The field is absent if conditionalReconfiguration is configured for CHO. |
| sl-L2RemoteUE-Config |
| Contains L2 U2N relay operation related configurations used by a UE acting as or to be acting as a L2 U2N Remote UE. The field is absent if conditionalReconfiguration is configured for CHO. |

| RRCReconfiguration-IEs field descriptions |
|---|
| sl-ConfigDedicatedNR |
| This field is used to provide the dedicated configurations for NR sidelink communication/discovery. |

RRCSetup        10

The RRCSetup message is used to establish SRB1.
   Signalling radio bearer: SRB0
   RLC-SAP: TM
   Logical channel: CCCH
   Direction: Network to UE

| RRCSetup message |
|---|
| ```
-- ASN1START
-- TAG-RRCSETUP-START
RRCSetup ::=                         SEQUENCE {
    rrc-TransactionIdentifier            RRC-TransactionIdentifier,
    criticalExtensions                   CHOICE {
        rrcSetup                             RRCSetup-IEs,
        criticalExtensionsFuture             SEQUENCE { }
    }
}
RRCSetup-IEs ::=                     SEQUENCE {
    radioBearerConfig                    RadioBearerConfig,
    masterCellGroup                      OCTET STRING (CONTAINING CellGroupConfig) ,
    lateNonCriticalExtension             OCTET STRING
OPTIONAL,
}
    nonCriticalExtension                 RRCSetup-v1700-IEs
OPTIONAL
}
RRCSetup-v1700-IEs ::=               SEQUENCE {
    sl-ConfigDedicatedNR-r17             SL-ConfigDedicatedNR-r16

OPTIONAL, -- Cond L2RemoteUE
    sl-L2RemoteUE-Config-r17             SL-L2RemoteUE-Config-r17
OPTIONAL, -- Cond L2RemoteUE
    nonCriticalExtension                 SEQUENCE { }
OPTIONAL
}
-- TAG-RRCSETUP-STOP
-- ASN1STOP
``` |

| RRCSetup-IEs field descriptions |
|---|
| masterCellGroup |
| The network configures only the RLC bearer for the SRB1, mac-CellGroupConfig, physicalCellGroupConfig and spCellConfig. |
| radioBearerConfig |
| Only SRB1 can be configured in RRC setup. |
| sl-ConfigDedicatedNR |
| Contains dedicated configurations for NR sidelink communication. The network configures only the PC5 Relay RLC channel and sl-PHY-MAC-RLC-Config used for the SRB1. |
| sl-L2RemoteUE-Config |
| Contains dedicated configurations used for L2 U2N relay related operation. The network configures only the SRAP configuration used for the SRB1. |

| Conditional Presence | Explanation |
|---|---|
| L2RemoteUE | The field is mandatory present for L2 U2N Remote UE; otherwise it is absent. |

RRCSetupComplete
The RRCSetupComplete message is used to confirm the successful completion of an RRC connection establishment.
    Signalling radio bearer: SRB1
    RLC-SAP: AM
    Logical channel: DCCH
    Direction: UE to Network RRCSetupComplete message

```
-- ASN1START
-- TAG-RRCSETUPCOMPLETE-START
RRCSetupComplete ::=                    SEQUENCE {
    rrc-TransactionIdentifier               RRC-TransactionIdentifier,
    criticalExtensions                      CHOICE {
        rrcSetupComplete                        RRCSetupComplete-IEs,
        criticalExtensionsFuture                SEQUENCE { }
    }
}
RRCSetupComplete-IEs ::=                SEQUENCE {
    selectedPLMN-Identity                   INTEGER (1..maxPLMN) ,
    registeredAMF                           RegisteredAMF                                   OPTIONAL,
    guami-Type                              ENUMERATED {native, mapped}                     OPTIONAL,
    s-NSSAI-List                            SEQUENCE (SIZE (1..maxNrofS-NSSAI) ) OF S-NSSAI OPTIONAL,
    dedicatedNAS-Message                    DedicatedNAS-Message,
    ng-5G-S-TMSI-Value                      CHOICE {
        ng-5G-S-TMSI                            NG-5G-S-TMSI,
        ng-5G-S-TMSI-Part2                      BIT STRING (SIZE (9))
    }                                                                                       OPTIONAL,
    lateNonCriticalExtension                OCTET STRING                                    OPTIONAL,
    nonCriticalExtension                    RRCSetupComplete-v1610-IEs                      OPTIONAL
}
RRCSetupComplete-v1610-IEs ::=          SEQUENCE {
    iab-NodeIndication-r16                  ENUMERATED {true}                               OPTIONAL,
    idleMeasAvailable-r16                   ENUMERATED {true}                               OPTIONAL,
    ue-MeasurementsAvailable-r16            UE-MeasurementsAvailable-r16                    OPTIONAL,
    mobilityHistoryAvail-r16                ENUMERATED {true}                               OPTIONAL,
    mobilityState-r16                       ENUMERATED {normal, medium, high, spare}        OPTIONAL,
    nonCriticalExtension                    RRCSetupComplete-v1700-IEs                      OPTIONAL
}
RRCSetupComplete-v1700-IEs ::=          SEQUENCE {
    onboardingRequest-r17                   ENUMERATED {true}                               OPTIONAL,
    nonCriticalExtension                    SEQUENCE { }                                    OPTIONAL
}
RegisteredAMF ::=                       SEQUENCE {
    plmn-Identity                           PLMN-Identity                                   OPTIONAL,
    amf-Identifier                          AMF-Identifier
}
-- TAG-RRCSETUPCOMPLETE-STOP
-- ASN1STOP
```

RRCSetupRequest
The RRCSetupRequest message is used to request the establishment of an RRC connection.
    Signalling radio bearer: SRB0
    RLC-SAP: TM
    Logical channel: CCCH
    Direction: UE to Network RRCSetupRequest messsage

```
-- ASN1START
-- TAG-RRCSETUPREQUEST-START
RRCSetupRequest ::=                     SEQUENCE {
    rrcSetupRequest                         RRCSetupRequest-IEs
}
RRCSetupRequest-IEs ::=                 SEQUENCE {
    ue-Identity                             InitialUE-Identity,
    establishmentCause                      EstablishmentCause,
    spare                                   BIT STRING (SIZE (1))
}
InitialUE-Identity ::=                  CHOICE
    ng-5G-S-TMSI-Part1                      BIT STRING (SIZE (39)),
    randomValue                             BIT STRING (SIZE (39) )
}
```

| RRCSetupRequest messsage |
| --- |
| EstablishmentCause ::=    ENUMERATED {<br>    emergency, highPriorityAccess, mt-Access, mo-Signalling,<br>    mo-Data, mo-VoiceCall, mo-VideoCall, mo-SMS, mps-<br>PriorityAccess, mcs-PriorityAccess,<br>    spare6, spare5, spare4, spare3, spare2, spare1}<br>-- TAG-RRCSETUPREQUEST-STOP<br>-- ASN1STOP |

RRCReconfigurationSidelink
The RRCReconfigurationSidelink message is the command to AS configuration of the PC5 RRC connection. It is only applied to unicast of NR sidelink communication.

Signalling radio bearer: SL-SRB3
RLC-SAP: AM
Logical channel: SCCH
Direction: UE to UE

| RRCReconfigurationSidelink message |
| --- |
| ```
-- ASN1START
-- TAG-RRCRECONFIGURATIONSIDELINK-START
RRCReconfigurationSidelink ::=                    SEQUENCE {
    rrc-TransactionIdentifier-r16                     RRC-TransactionIdentifier,
    criticalExtensions                                CHOICE {
        rrcReconfigurationSidelink-r16                    RRCReconfigurationSidelink-IEs-r16,
        criticalExtensionsFuture                          SEQUENCE { }
    }
}
RRCReconfigurationSidelink-IEs-r16 ::=            SEQUENCE {
    slrb-ConfigToAddModList-r16                       SEQUENCE (SIZE (1..maxNrofSLRBEB-r16)) OF SLRB-Config-r16
        OPTIONAL, -- Need N
    slrb-ConfigToReleaseList-r16                      SEQUENCE (SIZE (1..maxNrofSLRBEB-r16)) OF SLRB-PCS5-ConfigIndex-r16
        OPTIONAL, -- Need N
    sl-MeasConfig-r16                                 SetupRelease {SL-MeasConfig-r16}
        OPTIONAL, -- Need M
    sl-CSI-RS-Config-r16                              SetupRelease {SL-CSI-RS-Config-r16}
        OPTIONAL, -- Need M
    sl-ResetConfig-r16                                ENUMERATED {true}
        OPTIONAL, -- Need N
    sl-LatencyBoundCSI-Report-r16                     INTEGER (3..160)
        OPTIONAL, -- Need M
    lateNonCriticalExtension                          OCTET STRING
        OPTIONAL,
    nonCriticalExtension                              RRCReconfigurationSidelink-v1700-IEs
        OPTIONAL
}
RRCReconfigurationSidelink-v1700-IEs ::=          SEQUENCE {
    sl-DRX-ConfigUC-PCS-r17                           SetupRelease { SL-DRX-ConfigUC-r17 }
        OPTIONAL, -- Need M
    sl-LatencyBoundIUC-Report-r17                     SetupRelease { SL-LatencyBoundIUC-Report-r17 }
        OPTIONAL, -- Need M
    sl-RLC-ChannelToReleaseListPC5-r17                SEQUENCE (SIZE (1..maxSL-LCID-r16)) OF SL-RLC-ChannelID-r17
        OPTIONAL, -- Need N
    sl-RLC-ChannelToAddModListPC5-r17                 SEQUENCE (SIZE (1..maxSL-LCID-r16)) OF SL-RLC-ChannelConfigPC5-r17
        OPTIONAL, -- Need N
    nonCriticalExtension                              SEQUENCE { }
        OPTIONAL
}
SL-LatencyBoundIUC-Report-r17::=                  INTEGER (3..160)
SLRB-Config-r16::=                                SEQUENCE {
    slrb-PC5-ConfigIndex-r16                          SLRB-PC5-ConfigiIndex-r16,
    sl-SDAP-ConfigPC5-r16                             SL-SDAP-ConfigPC5-r16
        OPTIONAL, -- Need M
    sl-PDCP-ConfigPC5-r16                             SL-PDCP-ConfigPC5-r16
        OPTIONAL, -- Need M
    sl-RLC-ConfigPC5-r16                              SL-RLC-ConfigPC5-r16
        OPTIONAL, -- Need M
    sl-MAC-LogicalChannelConfigPC5-r16                SL-LogicalChannelConfigPC5-r16
        OPTIONAL, -- Need M
    ...
}
SLRB-PC5-ConfigiIndex-r16 ::=                     INTEGER (1..maxNrofSLRBEB-r16)
SL-SDAP-ConfigPC5-r16 ::=                         SEQUENCE {
    sl-MappedQoS-FlowsToAddList-r16                   SEQUENCE (SIZE (1..maxNrofSL-QFIsPerDest-r16)) OF SL-PQFI-r16
        OPTIONAL, -- Need N
    sl-MappedQoS-FlowsToReleaseList-r16               SEQUENCE (SIZE (1..maxNrofSL-QFIsPerDest-r16)) OF SL-PQFI-r16
        OPTIONAL, -- Need N
    sl-SDAP-Header-r16                                ENUMERATED {present, absent},
``` |

| RRCReconfigurationSidelink message |
|---|

```
...
    }
SL-PDCP-ConfigPC5-r16 ::=              SEQUENCE {
    sl-PDCP-SN-Size-r16                    ENUMERATED {len12bits, len18bits}
OPTIONAL, -- Need M
    sl-OutOfOrderDelivery-r16              ENUMERATED { true }
OPTIONAL, -- Need R
    ...
}
SL-RLC-ConfigPC5-r16 ::=               CHOICE {
    sl-AM-RLC-r16                          SEQUENCE {
        sl-SN-FieldLengthAM-r1 6               SN-FieldLengthAM
OPTIONAL, -- Need M
        ...
    },
    sl-UM-Bi-Directional-RLC-r16           SEQUENCE {
        sl-SN-FieldLengthUM-r16                SN-FieldLengthUM
OPTIONAL, -- Need M
        ...
    },
    sl-UM-Uni-Directional-RLC-r16          SEQUENCE {
        sl-SN-FieldLengthUM-r16                SN-FieldLengthUM
OPTIONAL, -- Need M
        ...
    }
}
SL-LogicalChannelConfigPC5-r16 ::=     SEQUENCE {
    sl-LogicalChannelIdentity-r16          LogicalChannelIdentity,
    ...
}
SL-PQFI-r16 ::=                        INTEGER (1..64)
SL-CSI-RS-Config-r16 ::=               SEQUENCE {
    sl-CSI-RS-FreqAllocation-r16           CHOICE {
        sl-OneAntennaPort-r16                  BIT STRING (SIZE (12)),
        sl-TwoAntennaPort-r16                  BIT STRING (SIZE (6))
    }
OPTIONAL, -- Need M
    sl-CSI-RS-FirstSymbol-r16              INTEGER (3..12)
OPTIONAL, -- Need M
    ...
}
SL-RLC-ChannelConfigPC5-r17::=         SEQUENCE {
    sl-RLC-ChannelID-PC5-r17               SL-RLC-ChannelID-r17,
    sl-RLC-ConfigPC5-r17                   SL-RLC-ConfigPC5-r16
OPTIONAL, -- Need M
    sl-MAC-LogicalChannelConfigPC5-r17     SL-LogicalChannelConfigPC5-r16
OPTIONAL, -- Need M
    ...
}
-- TAG-RRCRECONFIGURATIONSIDELINK-STOP
-- ASN1STOP
```

| RRCReconfigurationSidelink field descriptions |
|---|
| sl-CSI-RS-FreqAllocation |
| Indicates the frequency domain position for sidelink CSI-RS. |
| sl-CSI-RS-FirstSymbol |
| Indicates the position of first symbol of sidelink CSI-RS. |
| sl-DRX-ConfigUC-PC5 |
| Indicates the NR sidelink DRX configuration for unicast communication, as specified in TS 38.321 [3] |
| sl-LatencyBoundCSI-Report |
| Indicate the latency bound of SL CSI report from the associated SL CSI triggering in terms of number of slots. |
| sl-LatencyBoundIUC-Report |
| Indicates the latency bound of SL Inter-UE coordination report from the associated SL Inter-UE coordination explicit request triggering in terms of number of slots. |

| RRCReconfigurationSidelink field descriptions |
|---|
| sl-LogicalChannelIdentity |
| Indicates the identity of the sidelink logical channel.<br>sl-MappedQoS-FlowsToAddList |
| Indicate the QoS flows to be mapped to the configured sidelink DRB. Each entry is indicated by the SL-PQFI, which is used between UEs, as defined in TS 23.287 [55].<br>sl-MappedQoS-FlowsToReleaseList |
| Indicate the QoS flows to be released from the configured sidelink DRB. Each entry is indicated by the SL-PQFI, which is used between UEs, as defined in TS 23.287 [55].<br>sl-MeasConfig |
| Indicates the sidelink measurement configuration for the unicast destination.<br>sl-OutOfOrderDelivery |
| Indicates whether or not outOfOrderDelivery specified in TS 38.323 [5] is configured. This field should be either always present or always absent, after the sidelink radio bearer is established.<br>sl-PDCP-SN-Size |
| Indicates the PDCP SN size of the configured sidelink DRB.<br>sl-Resetconfig |
| Indicates that the full configuration should be applicable for the RRCReconfigurationSidelink message.<br>sl-SDAP-Header |
| Indicates whether or not a SDAP header is present on this sidelink DRB. |

9.4 Radio Information Related to Discovery Message
This clause specifies RRC information elements that are transferred in Discovery Message.
 SL-AccessInfo-L2U2N
The IE SL-AccessInfo-L2U2N includes the radio information included in Discovery Message used for L2 U2N relay operation.

| SL-AccessInfo-L2U2N information elements |
|---|
| -- ASN1START<br>-- TAG-SL-ACCESSINFO-L2U2N-START<br>NR-Sidelink-DiscoveryMessage DEFINITIONS AUTOMATIC TAGS ::= -- Rapp created new ASN.1 module here. FFS if should be like this<br>BEGIN<br>IMPORTS<br>    CellAccessRelatedInfo,<br>    SL-ServingCellInfo<br>FROM NR-RRC-Definitions;<br>SL-AccessInfo-L202N-r17 ::=        SEQUENCE {<br>    cellAccessRelatedInfo-r17        CellAccessRelatedInfo,<br>    sl-ServingCellInfo-r17        SL-ServingCellInfo-r17,<br>    ...<br>}<br>END<br>-- TAG-SL-ACCESSINFO-L2U2N-STOP<br>-- ASN1STOP |

SL-ServingCellInfo
The IE SL-ServingCellinfo is used to indicate L2 U2N Remote UE's serving cell information.

| SL-ServingCellInfo information element |
|---|
| -- ASN1START<br>-- TAG-SL-SERVINGCELLINFO-START<br>SL-ServingCellInfo-r17 ::=        SEQUENCE { |

| SL-ServingCellInfo information element |
|---|
| sl-PhysCellId-r17        PhysCellId,<br>sl-CarrierFreqNR-r17        ARFCN-ValueNR<br>}<br>-- TAG-SL-SERVINGCELLINFO-STOP<br>-- ASN1STOP |

| SL-ServingCellInfo field descriptions |
| --- |
| sl-CarrierFreqNR |
| Indicate the DL frequency of the cell indicated by sl-PhysCellId. |
| sl-PhysCellId |
| Indicates the PCI of the PCell. |

Figure 17:
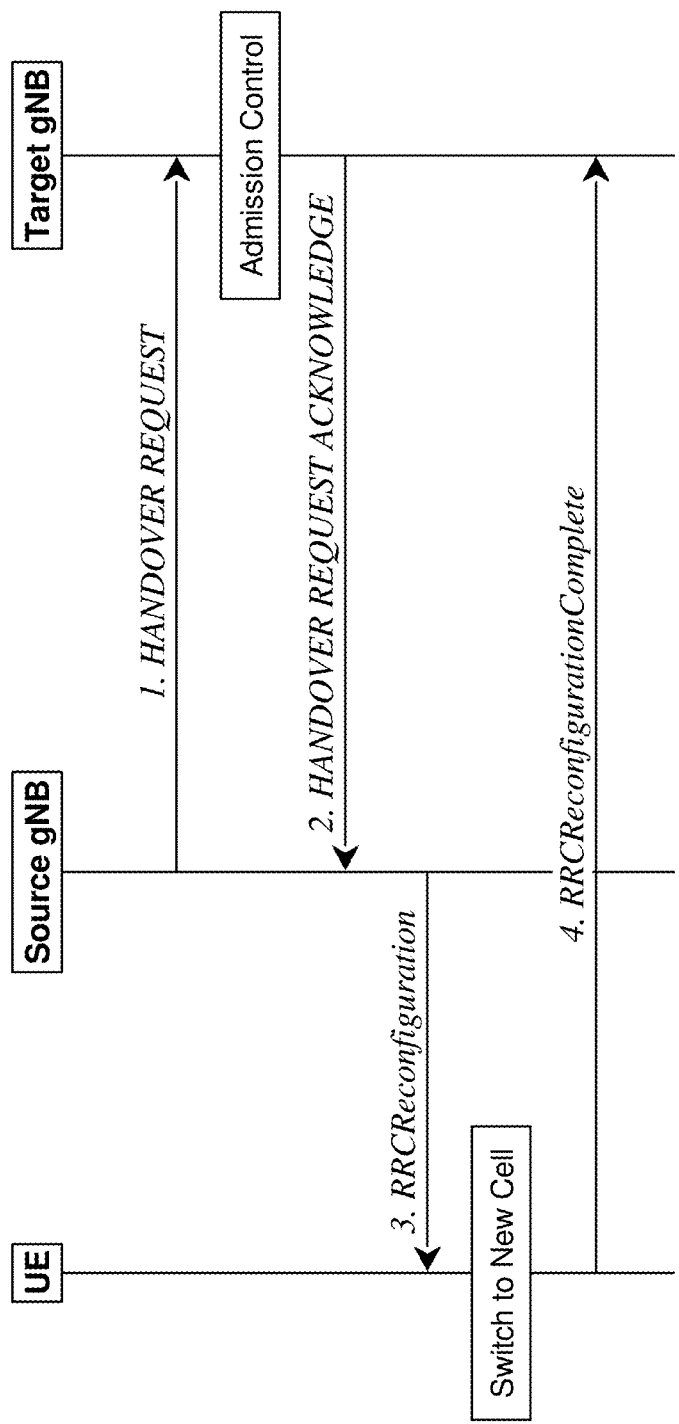
FIG. 17 is a reproduction of FIG. 9.2.3.1-1 of 3GPP TS 38.300 V17.0.0.
Figure 18:
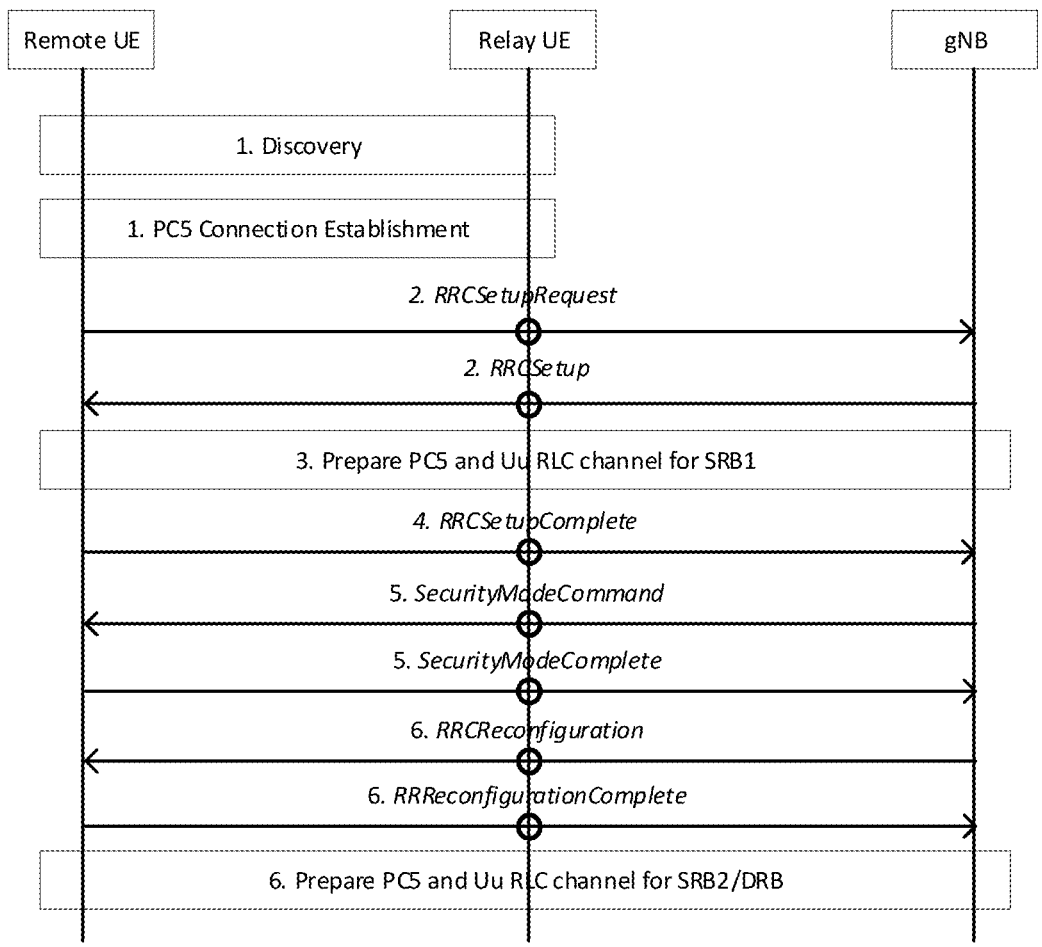
FIG. 18 is a reproduction of FIG. 16.12.5.1-1 of 3GPP R2-2206232.

3GPP TS 38.300 introduces the following:
9.2.3 Mobility in RRC_CONNECTED
9.2.3.1 Overview
Network controlled mobility applies to UEs in RRC_CONNECTED and is categorized into two types of mobility: cell level mobility and beam level mobility. Beam level mobility includes intra-cell beam level mobility and inter-cell beam level mobility.
Cell Level Mobility requires explicit RRC signalling to be triggered, i.e. handover. For inter-gNB handover, the signalling procedures consist of at least the following elemental components illustrated in FIG. 9.2.3.1-1:
[FIG. 9.2.3.1-1 of 3GPP TS 38.300 V17.0.0, Entitled "Inter-gNB Handover Procedures", is Reproduced as FIG. 17]
1. The source gNB initiates handover and issues a HANDOVER REQUEST over the Xn interface.
2. The target gNB performs admission control and provides the new RRC configuration as part of the HANDOVER REQUEST ACKNOWLEDGE.
3. The source gNB provides the RRC configuration to the UE by forwarding the RRCReconfiguration message received in the HANDOVER REQUEST ACKNOWLEDGE. The RRCReconfiguration message includes at least cell ID and all information required to access the target cell so that the UE can access the target cell without reading system information. For some cases, the information required for contention-based and contention-free random access can be included in the RRCReconfiguration message. The access information to the target cell may include beam specific information, if any.
4. The UE moves the RRC connection to the target gNB and replies with the RRCReconfigurationComplete.
NOTE 1: User Data can also be sent in step 4 if the grant allows.
[ . . . ]
3GPP R2-2206232 introduces the following:
16.12.5.1 RRC Connection Management
The L2 U2N Remote UE needs to establish its own PDU sessions/DRBs with the network before user plane data transmission.
The NR V2X PC5 unicast link establishment procedures can be used to setup a secure unicast link between L2 U2N Remote UE and L2 U2N Relay UE before L2 U2N Remote UE establishes a Uu RRC connection with the network via L2 U2N Relay UE.
The establishment of Uu SRB1/SRB2 and DRB of the L2 U2N Remote UE is subject to Uu configuration procedures for L2 UE-to-Network Relay.
The following high level connection establishment procedure in FIG. 16.12.5.1-1 applies to L2 U2N Relay:
[FIG. 16.12.5.1-1 of 3GPP R2-2206232, entitled "Procedure for L2 U2N Remote UE connection establishment", is reproduced as FIG. 18]
1. The L2 U2N Remote and L2 U2N Relay UE perform discovery procedure, and establish PC5-RRC connection using NR sidelink PC5 unicast link establishment procedure.
2. The L2 U2N Remote UE sends the first RRC message (i.e., RRCSetupRequest) for its connection establishment with gNB via the L2 U2N Relay UE, using a specified PC5 Relay RLC channel configuration. If the L2 U2N Relay UE is not in RRC_CONNECTED, it needs to do its own connection establishment upon reception of a message on the specified PC5 Relay RLC channel. During L2 U2N Relay UE's RRC connection establishment procedure, gNB may configure SRB0 relaying Uu Relay RLC channel to the U2N Relay UE. The gNB responds with an RRCSetup message to L2 U2N Remote UE. The RRCSetup message is sent to the L2 U2N Remote UE using SRB0 relaying channel over Uu and a specified PC5 Relay RLC channel over PC5.
NOTE x: During the L2 U2N Relay UE's RRC connection establishment procedure due to Remote UE, it is left to the L2 U2N Relay UE's implementation on how to set the establishment cause value in the RRCSetup message.
3. The gNB and L2 U2N Relay UE perform relaying channel setup procedure over Uu. According to the configuration from gNB, the L2 U2N Relay/Remote UE establishes a PC5 Relay RLC channel for relaying of SRB1 towards the L2 U2N Remote/Relay UE over PC5.
4. The RRCSetupComplete message is sent by the L2 U2N Remote UE to the gNB via the L2 U2N Relay UE using SRB1 relaying channel over PC5 and SRB1 relaying channel configured to the L2 U2N Relay UE over Uu. Then the L2 U2N Remote UE is RRC connected over Uu.
5. The L2 U2N Remote UE and gNB establish security following Uu procedure and the security messages are forwarded through the L2 U2N Relay UE.
6. The gNB sends an RRCReconfiguration message to the L2 U2N Remote UE via the L2 U2N Relay UE, to setup the SRB2/DRBs for relaying purpose. The L2 U2N Remote UE sends an RRCReconfigurationComplete message to the gNB via the L2 U2N Relay UE as a response. In addition, the gNB may configure additional Uu Relay RLC channels between the gNB and L2 U2N Relay UE, and PC5 Relay RLC channels between L2 U2N Relay UE and L2 U2N Remote UE for the relay traffic.
16.12.5.2 Radio Link Failure
The L2 U2N Remote UE in RRC_CONNECTED suspends Uu RLM (as described in clause 9.2.7) when L2 U2N Remote UE is connected to gNB via L2 U2N Relay UE.
The L2 U2N Relay UE declares Uu Radio Link Failure (RLF) following the same criteria as described in clause 9.2.7.
After Uu RLF is declared, the L2 U2N Relay UE takes the following action on top of the actions described in clause 9.2.7:
a PC5-RRC message can be used for sending an indication to its connected L2 U2N Remote UE(s), which may trigger RRC connection re-establishment for L2 U2N Remote UE.
Upon detecting PC5 RLF, the L2 U2N Remote UE may trigger connection re-establishment.
[ . . . ]
16.12.6 Service Continuity for L2 U2N Relay
16.12.6.0 General
The service continuity procedure is applicable only for the mobility cases of path switch from indirect to direct path, and from direct to indirect path when the L2 U2N Remote UE and L2 U2N Relay UE belong to the same gNB.

[ . . . ]

16.12.6.2 Switching from direct to indirect path

The gNB can select a L2 U2N Relay UE in any RRC state i.e., RRC_IDLE, RRC_INACTIVE, or RRC_CONNECTED, as a target L2 U2N Relay UE for direct to indirect path switch.

Figure 16:
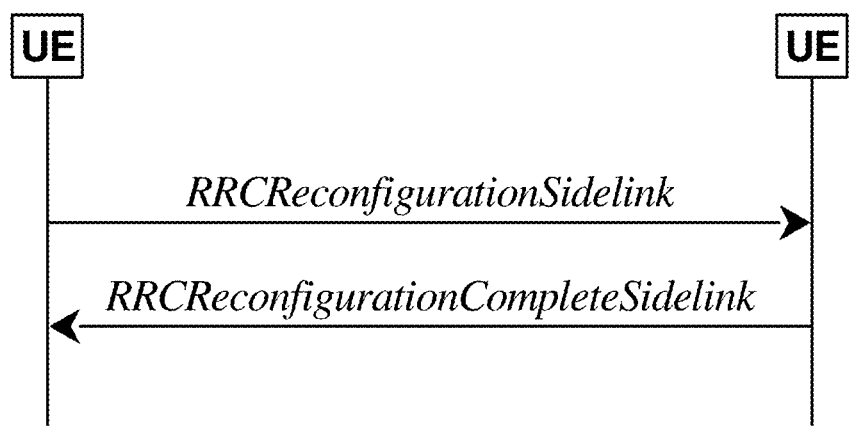
FIG. 16 is a reproduction of FIG. 5.8.9.1.1-1 of 3GPP R2-2206823.
Figure 19:
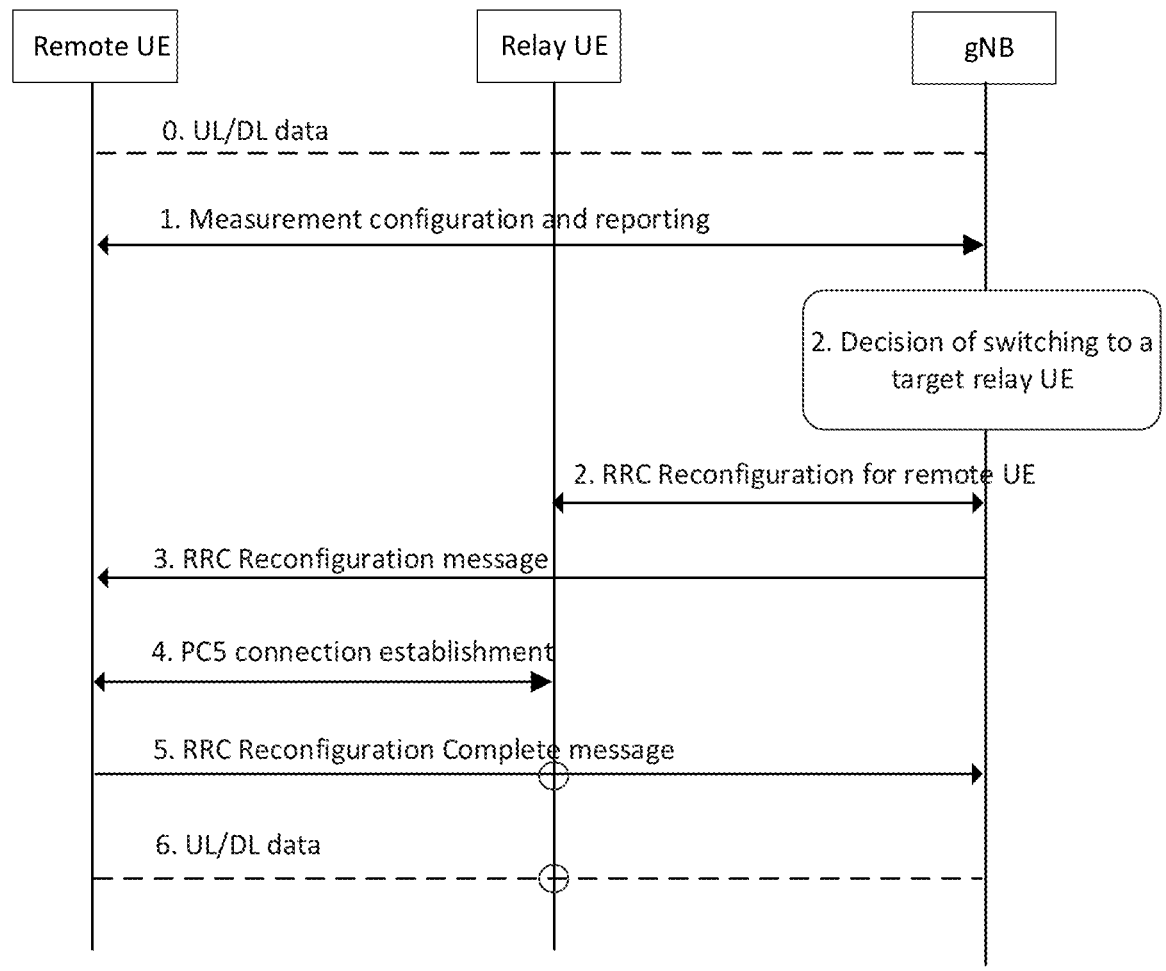
FIG. 19 is a reproduction of FIG. 16.12.6.2-1 of 3GPP R2-2206232.

For service continuity of L2 U2N Remote UE, the following procedure is used, in case of the L2 U2N Remote UE switching to indirect path via a L2 U2N Relay UE in RRC_CONNECTED:

[FIG. 16.12.6.2-1 of 3GPP R2-2206232, entitled "Procedure for L2 U2N Remote UE switching to indirect path", is reproduced as FIG. 19]

1. The L2 U2N Remote UE reports one or multiple candidate L2 U2N Relay UE(s) and Uu measurements, after it measures/discovers the candidate L2 U2N Relay UE(s):

The L2 U2N Remote UE filters the appropriate L2 U2N Relay UE(s) according to Relay selection criteria before reporting. The L2 U2N Remote UE shall report only the L2 U2N Relay UE candidate(s) that fulfil the higher layer criteria;

The reporting includes at least L2 U2N Relay UE ID, L2 U2N Relay UE's serving cell ID, and sidelink measurement quantity information. The sidelink measurement quantity can be SL-RSRP of the candidate L2 U2N Relay UE, and if SL-RSRP is not available, SD-RSRP is used.

2. The gNB decides to switch the L2 U2N Remote UE to a target L2 U2N Relay UE. Then the gNB sends an RRCReconfiguration message to the target L2 U2N Relay UE, which includes at least L2 U2N Remote UE's local ID and L2 ID, Uu and PC5 Relay RLC channel configuration for relaying, and bearer mapping configuration.

3. The gNB sends the RRCReconfiguration message to the L2 U2N Remote UE. The RRCReconfiguration message includes at least L2 U2N Relay UE ID, Remote UE's local ID, PC5 Relay RLC channel configuration for relay traffic and the associated end-to-end radio bearer(s). The L2 U2N Remote UE stops UP and CP transmission over Uu after reception of RRCReconfiguration message from the gNB.

4. The L2 U2N Remote UE establishes PC5 RRC connection with target L2 U2N Relay UE.

5. The L2 U2N Remote UE completes the path switch procedure by sending the RRCReconfigurationComplete message to the gNB via the L2 U2N Relay UE.

6. The data path is switched from direct path to indirect path between the L2 U2N Remote UE and the gNB.

In case the selected L2 U2N Relay UE for direct to indirect path switch is in RRC_IDLE or RRC_INACTIVE, after receiving the path switch command, the L2 U2N Remote UE establishes a PC5 link with the L2 U2N Relay UE and sends the RRCReconfigurationComplete message via the L2 U2N Relay UE, which triggers the L2 U2N Relay UE to enter RRC_CONNECTED state. The procedure for L2 U2N Remote UE switching to indirect path in FIG. 16.12.6.2-1 can be also applied for the case that the selected L2 U2N Relay UE for direct to indirect path switch is in RRC_IDLE or RRC_INACTIVE with the exception that the RRCReconfiguration message is sent from the gNB to the L2 U2N Relay UE after the L2 U2N Relay UE enters RRC_CONNECTED state.

3GPP TS 38.351 introduces the following:

6.2.2 Data PDU

FIG. 6.2.2-1 shows the format of the SRAP Data PDU.

Figure 20:
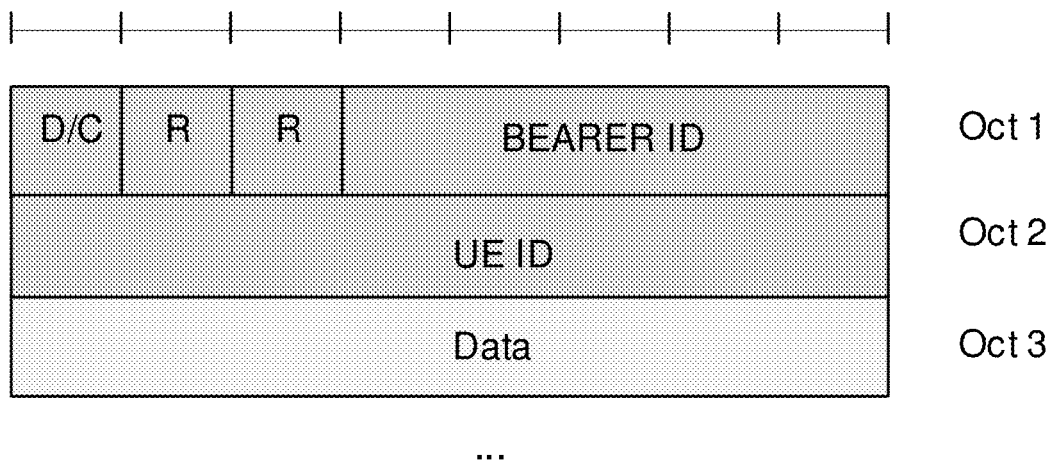
FIG. 20 is a reproduction of FIG. 6.2.2-1 of 3GPP TS 38.351 V17.0.0.

[FIG. 6.2.2-1 of 3GPP TS 38.351 V17.0.0, entitled "SRAP Data PDU format", is reproduced as FIG. 20]

[ . . . ]

6.3.2 UE ID

Length: 8 bits.

This field carries local identity of U2N Remote UE.

6.3.3 BEARER ID

Length: 5 bits.

This field carries Uu radio bearer identity for U2N Remote UE.

6.3.4 Data

Length: Variable

This field carries the SRAP SDU (i.e. PDCP PDU).

3GPP TS 23.700-33 introduces the following:

4.1 Architecture Requirements

Solutions shall build on the 5G ProSe architecture principles as defined in TS 23.304 [3] and 5G System architectural principles as defined in TS 23.501 [7], including flexibility and modularity for newly introduced functionalities.

In order to satisfy the normative stage-1 general requirements in TS 22.278 [5], TS 22.261 [4] and TS 22.115 [6], the system shall:

support single NR PC5 hop UE-to-UE Relay for unicast.

enhance UE-to-Network Relay functionality to support:

service continuity when switching between two indirect network communication paths for UE-to-Network Relay;

service continuity when switching between direct network communication path and indirect network communication path for 5G ProSe Layer-2 UE-to-Network Relay, including inter-gNB indirect-to-direct and inter-gNB direct-to-indirect path switching;

multi-path transmission using only one direct network communication path and only one indirect network communication path e.g. for improved reliability or data rates;

Emergency Services for Remote UE over UE-to-Network Relay.

support path switching between direct NR Uu communication path and direct NR PC5 communication path;

NOTE 1: The UE-to-Network Relay and UE-to-UE Relay in this study include both Layer-3 and Layer-2 Relays unless explicitly stated.

NOTE 2: It is not targeted to support session continuity (e.g. IP address preservation) during path switching between direct NR Uu communication path and direct NR PC5 communication path.

NOTE 3: For multi-path transmission over Layer-2 UE-to-Network Relay, a UE is connected to the same gNB using one direct path and one indirect path via Layer-2 UE-to-Network relay.

NOTE 4: Multi-path transmission over Layer-3 UE-to-Network Relay cannot have RAN impacts.

NOTE 5: Path switching between Layer-2 UE-to-Network Relay and Layer-3 UE-to-Network Relay cannot have RAN impacts.

[ . . . ]

5.4 Key Issue #4: Support of Path Switching Between Direct Network Communication Path and Indirect Network Communication Path for Layer-2 UE-to-Network Relay with Session Continuity Consideration 5.4.1 General Description This key issue addresses how to enhance the 5GS to support the path switching between direct network communication path and indirect network communication path for Layer-2 UE-to-Network Relay, including inter-gNB indirect-to-direct and inter-gNB direct-to-indirect path switching.

When studying the above aspect, the following needs to be considered:
What the triggers and criteria for path switching
How to select a direct network communication path or an indirect communication path for path switching.
How to perform the path switching with session continuity consideration.
NOTE: This key issue has strong dependency with RAN, and input from RAN WGs is needed to conclude.
[ . . . ]
6.23 Solution #23: Session Continuity for path switching for L2 U2N Relay
6.23.1 Description
This solution addresses key issue 4 "Support of path switching between direct network communication path and indirect network communication path for Layer-2 UE-to-Network Relay with session continuity consideration". This solution has considered Xn based and N2 based HO procedure applied for inter-gNB indirect-to-direct and inter-gNB direct-to-indirect path switching.
In this solution, the source gNB determines whether to switch to a direct cell or a L2 U2N relay UE. If the source gNB determines to switch to a L2 U2N relay UE, the source gNB selects the target L2 U2N relay UE for remote UE taken the authorized PLMN list for L2 U2N remote UE into account.

Editor's note: For the inter-gNB cases which gNB (source or target) gNB selects a target Relay UE or direct Uu route depends upon RAN2 conclusion.

6.23.2.2 Xn Based Inter-gNB Direct-to-Indirect Path Switching FIG. 6.23.2.2-1 shows the procedure for Xn based inter-gNB indirect-to-direct path switching.

Figure 21:
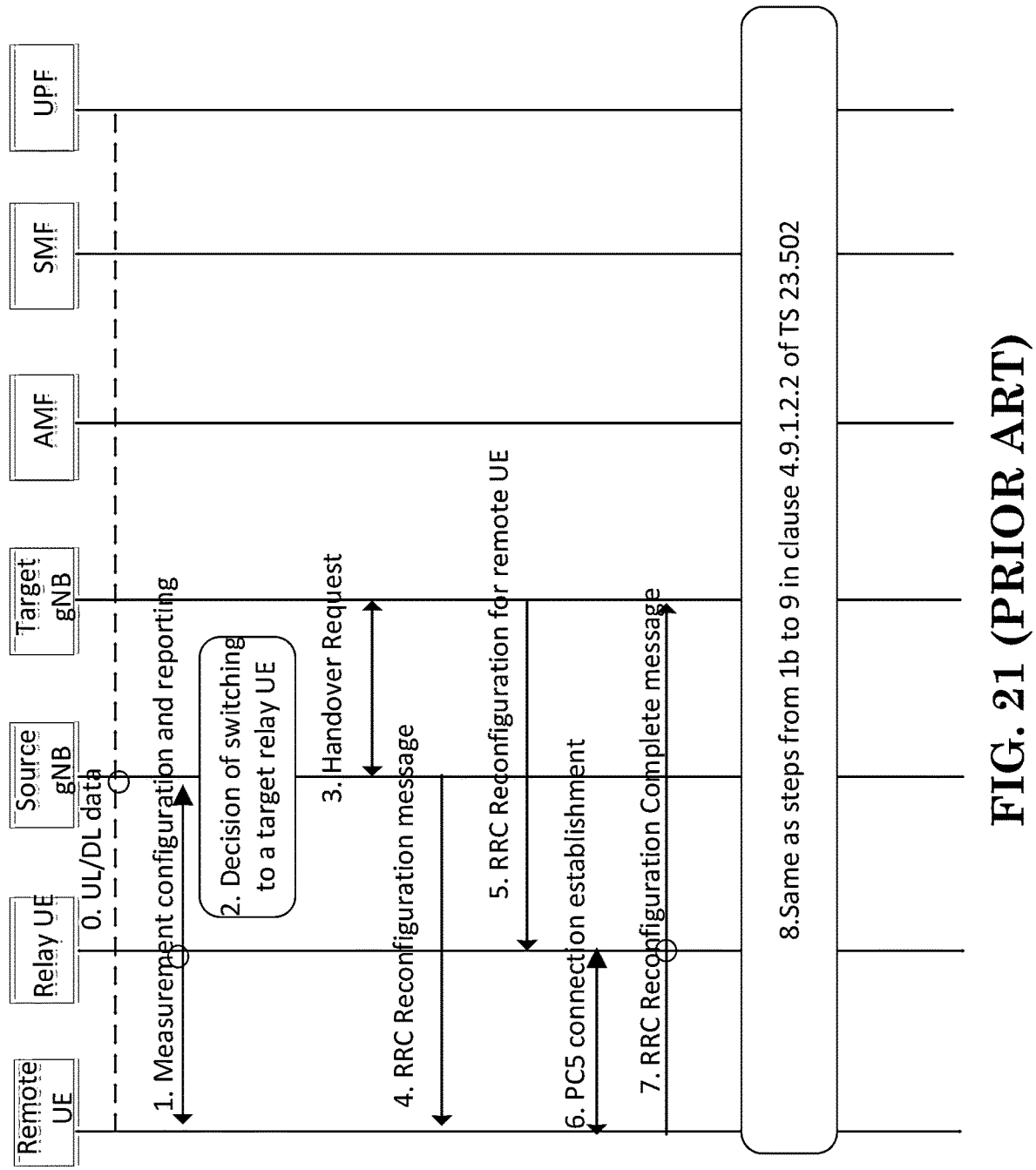
FIG. 21 is a reproduction of FIG. 6.23.2.2-1 of 3GPP TS 23.700-33 V0.3.0.

[FIG. 6.23.2.2-1 of 3GPP TS 23.700-33 V0.3.0, Entitled "Procedure for Xn Based Inter-gNB Direct-to-Indirect Path Switching", is Reproduced as FIG. 21]

1. The remote UE performs the measurement and reporting procedure, this step is the same as step 1 in clause 16.x.6.2 in TS 38.300 [15].
2. The gNB decides to switch the U2N Remote UE to a target U2N Relay UE. The gNB selects a target U2N relay UE taken into the authorized PLMN list which is retrieved from AMF to select the target U2N relay UE.
3. The source gNB sends the Handover Request defined in TS 38.423 in addition at least U2N Relay UE ID, U2N Relay UE's serving cell ID. The target gNB responds the Handover Request Ack defined in TS 38.413 [19]. Steps 4 to 7 are performed as steps 2 to 5 in clause 16.x.6.2 in TS 38.300 [15].
    If the selected U2N Relay UE is in RRC_IDLE or RRC_INACTIVE, step 7 will trigger the U2N Relay UE to enter RRC_CONNECTED state, then in this case step 7 will be performed before step 5.
8. The procedures are performed as steps 1b to 9 in clause 4.9.1.2.2 in TS 23.502 [8]. Editor's note: The procedures have RAN dependency. The procedures are required to be evaluated by RAN WGs.
[ . . . ]
6.23.2.4 N2 Based Inter-gNB Direct-to-Indirect Path Switching
FIG. 6.23.2.4-1 shows the procedure for N2 based inter-gNB indirect-to-direct path switching.

Figure 22:
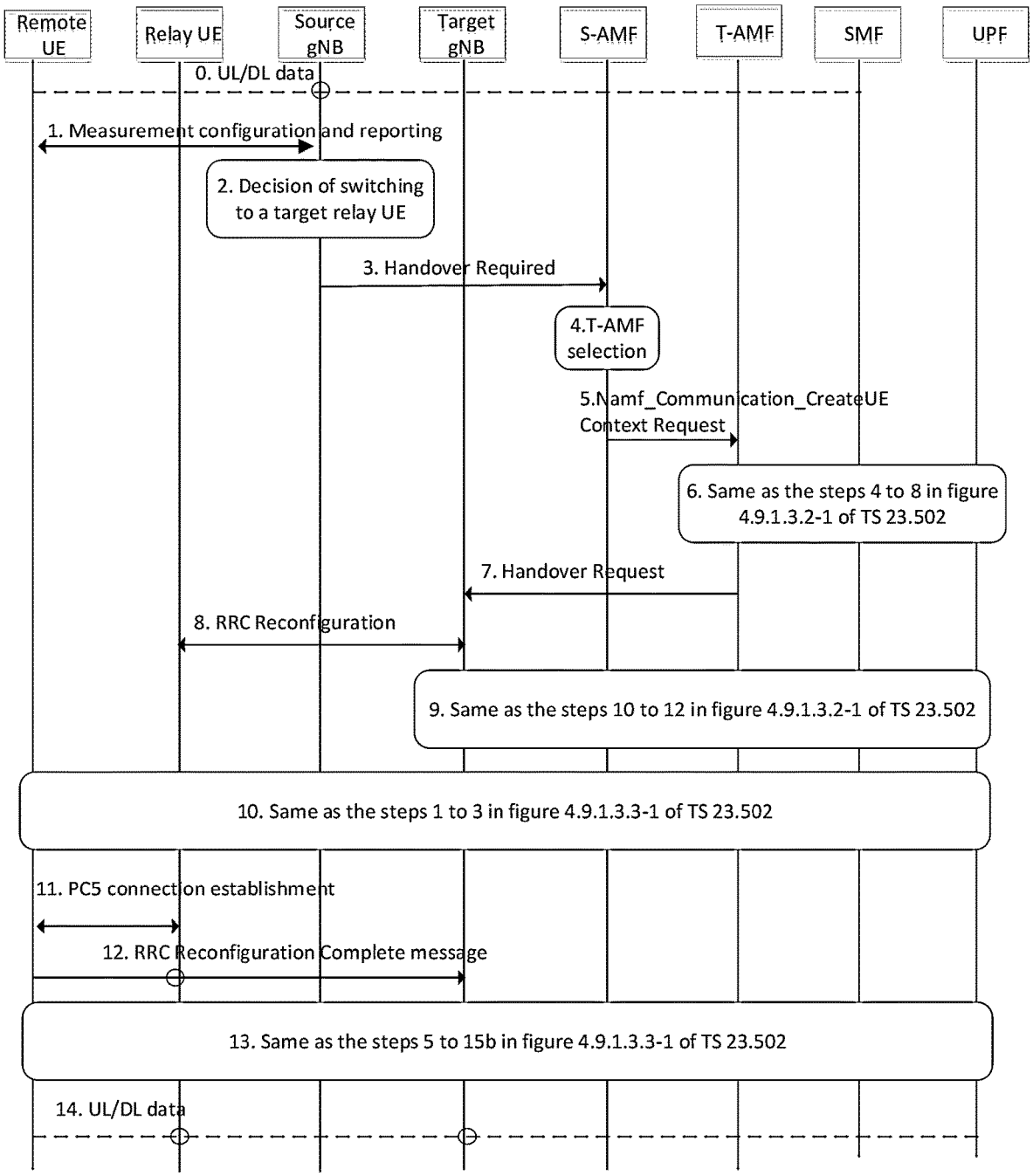
FIG. 22 is a reproduction of FIG. 6.23.2.4-1 of 3GPP TS 23.700-33 V0.3.0.

[FIG. 6.23.2.4-1 of 3GPP TS 23.700-33 V0.3.0, entitled "Procedure for N2 based inter-gNB direct-to-indirect path switching", is reproduced as FIG. 22]

1. The remote UE performs the measurement and reporting procedure, this step is the same as step1 in clause 16.x.6.2 in TS 38.300 [15].
2. The gNB decides to switch the U2N Remote UE to a target U2N Relay UE. The gNB selects a target U2N relay UE taken into the authorized PLMN list which is retrieved from AMF to select the target U2N relay UE.
3. The source gNB sends the Handover Required defined in TS 38.413 in addition at least U2N Relay UE ID, U2N Relay UE's serving cell ID.
4. T-AMF selection: same as step 2 in clause 4.9.1.3.2 in TS 23.502 [8].
5. S-AMF to T-AMF: Namf_Communication_CreateUEContext Request is sent as specified in step 3 in clause 4.9.1.3.2 in TS 23.502 [8] in addition at least U2N Relay UE ID, U2N Relay UE's serving cell ID.
6. The procedures are performed as step 4 to 8 as specified in clause 4.9.1.3.2 in TS 23.502 [8].
7. T-AMF to T-RAN: Handover Request is sent as specified in step 9 in clause 4.9.1.3.2 in TS 23.502 [8] in addition at least U2N Relay UE ID, U2N Relay UE's serving cell ID.
8. This step is performed as step2 in clause 16.x.6.1 in TS 38.300
9. The procedures are performed as steps 10 to 12 as specified in clause 4.9.1.3.2 in TS 23.502 [8].
10. The procedures are performed as steps 1 to 3 as specified in clause 4.9.1.3.3 in TS 23.502 [8].
Step 11 and step 12 are performed as step 4 and step 5 in clause 16.x.6.2 in TS 38.300 [15].
If the selected U2N Relay UE is in RRC_IDLE or RRC_INACTIVE, step 7 will trigger the U2N Relay UE to enter RRC_CONNECTED state, then in this case step 12 will be performed before step 8.
13. The procedures are performed as steps 5 to 15b in clause 4.9.1.3.3 in TS 23.502 [8].
Editor's note: The procedures have RAN dependency. The procedures are required to be evaluated by RAN WGs.
6.23.3 Impacts on Services, Entities and Interfaces
The solution has impacts in the following entities:
gNB:
    source gNB selects a target UE and sends the target UE info to AMF or target gNB.
AMF:
    Receives the target U2N relay UE info from gNB and AMF.
    Sends the target U2N relay UE info to gNB.
    Sends the authorized PLMN list to gNB.
3GPP RP-221262 introduces the following:
The objective of this work item is to specify solutions that are needed to enhance NR Sidelink Relay for the V2X, public safety and commercial use cases.
    1. Specify mechanisms to support single-hop Layer-2 and Layer-3 UE-to-UE relay (i.e., source UE→relay UE→destination UE) for unicast [RAN2, RAN3, RAN4].
        A. Common part for Layer-2 and Layer-3 relay to be prioritized until RAN #98
            i. Relay discovery and (re)selection [RAN2, RAN4]
            ii. Signalling support for Relay and remote UE authorization if SA2 concludes it is needed [RAN3]
        B. Layer-2 relay specific part
            i. UE-to-UE relay adaptation layer design [RAN2]
            ii. Control plane procedures [RAN2]
            iii. QoS handling if needed, subject to SA2 progress [RAN2]

Note 1A: This work should take into account the forward compatibility for supporting more than one hop in a later release.

Note 1B: A remote UE is connected to only a single relay UE at a given time for a given destination UE.

2. Specify mechanisms to enhance service continuity for single-hop Layer-2 UE-to-Network relay for the following scenarios [RAN2, RAN3]:
   A. Inter-gNB indirect-to-direct path switching (i.e., "remote UE<-> relay UE A<->gNB X" to "remote UE<->gNB Y")
   B. Inter-gNB direct-to-indirect path switching (i.e., "remote UE<->gNB X" to "remote UE<->relay UE A<->gNB Y")
   C. Intra-gNB indirect-to-indirect path switching (i.e., "remote UE<-> relay UE A<->gNB X" to "remote UE<-> relay UE B<->gNB X")
   D. Inter-gNB indirect-to-indirect path switching (i.e., "remote UE<-> relay UE A<->gNB X" to "remote UE<-> relay UE B<->gNB Y")
   Note 2A: Scenario D is to be supported by reusing solutions for the other scenarios without specific optimizations.

3. Study the benefit and potential solutions for multi-path support to enhance reliability and throughput (e.g., by switching among or utilizing the multiple paths simultaneously) in the following scenarios [RAN2, RAN3]:
   A. A UE is connected to the same gNB using one direct path and one indirect path via 1) Layer-2 UE-to-Network relay, or 2) via another UE (where the UE-UE inter-connection is assumed to be ideal), where the solutions for 1) are to be reused for 2) without precluding the possibility of excluding a part of the solutions which is unnecessary for the operation for 2).
   Note 3A: Study on the benefit and potential solutions are to be completed in RAN #98 which will decide whether/how to start the normative work.
   Note 3B: UE-to-Network relay in scenario 1 reuses the Rel-17 solution as the baseline.
   Note 3C: Support of Layer-3 UE-to-Network relay in multi-path scenario is assumed to have no RAN impact and the work and solutions are subject to SA2 to progress.

4. With a low priority, study the gains and, if needed, specify signalling between gNB and relay UE in sidelink mode 2 to assist the determination of the sidelink DRX configuration used for remote UE in Layer-2 UE-to-Network sidelink relay operation [RAN2]

5. Specify RRM core requirements for relay discovery and (re)selection in UE-to-UE relay [RAN4] This work will not consider specific enhancement for sidelink relay support of functionality specified in Rel-18 sidelink enhancements. If Rel-18 sidelink enhancements can be operated in relay without any special handling, they can be used in relaying operations.

NR Sidelink in Rel-17 supports the feature of UE-to-Network (U2N) relay communication enabling cell coverage extension. UE-to-Network Relay UE is in coverage and Remote UE could be out of coverage or in coverage. On the other hand, there are two types of UE-to-Network relay communication, one is Layer-3 UE-to-Network Relay and the other is Layer-2 (L2) UE-to-Network Relay. For L2 U2N Relay, an adaptation layer (called Sidelink Relay Adaptation Protocol (SRAP) layer) is placed over Radio Link Control (RLC) sublayer for both CP and UP at the Uu interface between Relay UE and gNB. The Uu Service Data Adaptation Protocol (SDAP)/Packet Data Convergence Protocol (PDCP) and Radio Resource Control (RRC) are terminated between Remote UE and gNB, while RLC, Medium Access Control (MAC) and Physical (PHY) are terminated in each link (i.e. the PC5 layer-2 link or PC5 connection between Remote UE and UE-to-Network Relay UE, and the Uu link or Uu RRC connection between UE-to-Network Relay UE and the gNB). An adaptation layer placed at the PC5 interface enables that one or more Uu Data Radio Bearers (DRBs) can be mapped to one SL/PC5 RLC channel with N:1 mapping. In Rel-17, either direct network communication path (i.e. Remote UE directly communicates with gNB) or indirect network communication path (i.e. Remote UE communicates with gNB via U2N Relay UE) can be enabled for Remote UE at a time. Besides, Rel-17 only supports intra-gNB direct-to-indirect path switching for UE-to-NW relay communication. In other words, during direct-to-indirect communication path switching, the remote UE does not change the serving gNB.

Figure 23:
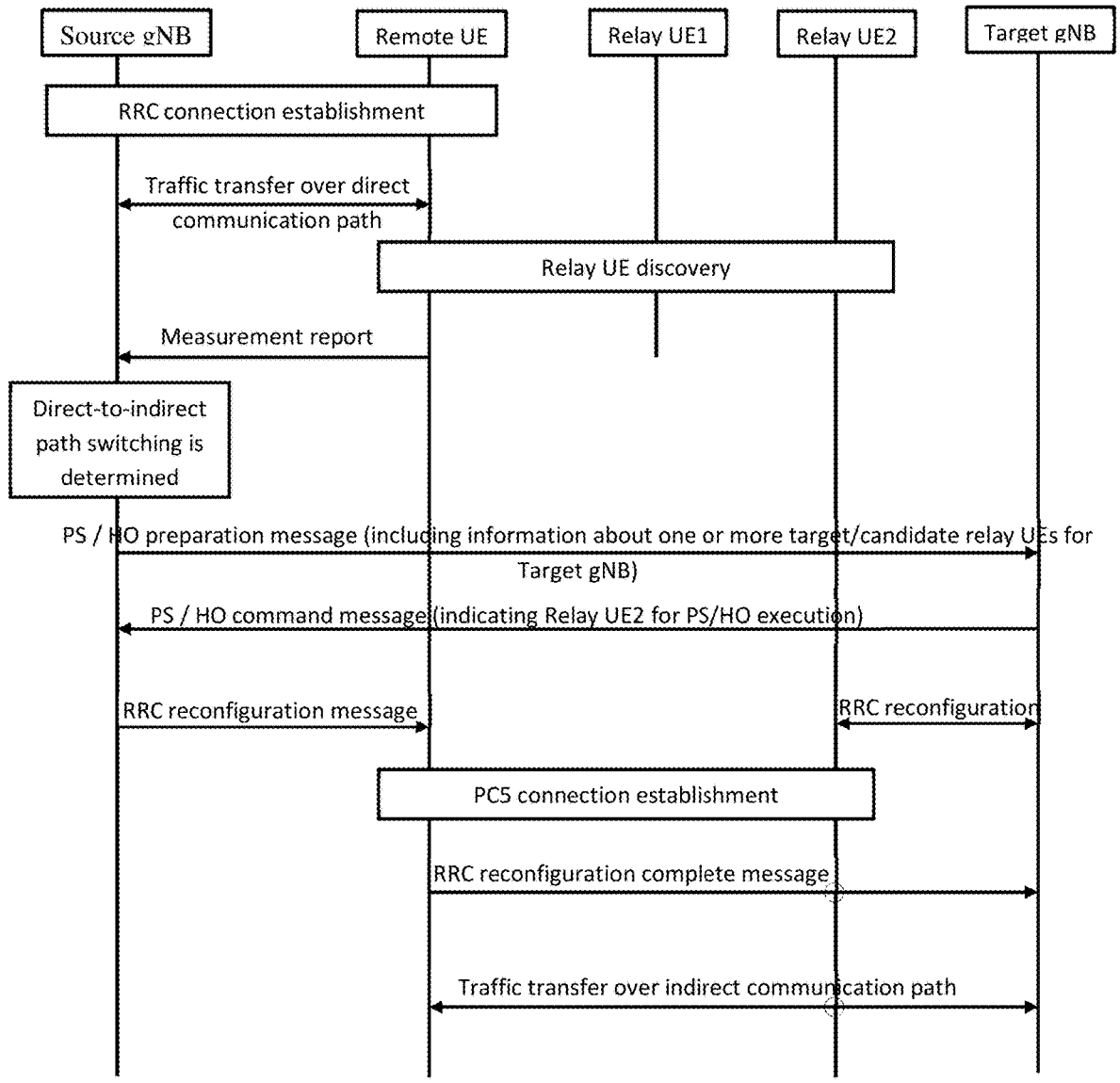
FIG. 23 illustrates the step flow for inter-gNB direct-to-indirect communication path switching according to one exemplary embodiment.

As discussed in 3GPP TR 23.700-33 and RP-221262, Rel-18 could support inter-gNB direct-to-indirect communication path switching, i.e. the remote UE could communicate with a gNB directly and then communicate with another gNB via a relay UE. The step flow of the inter-gNB direct-to-indirect communication path switching, according to one exemplary embodiment, is illustrated in FIG. 23 (which illustrates the step flow for inter-gNB direct-to-indirect communication path switching according to one exemplary embodiment), and each step is described below:

1. A UE in capable of L2 U2N remote UE functionality could establish a RRC connection with a first gNB (i.e. source gNB) and communicate with the first gNB over direct communication path.

2. The remote UE may initiate relay UE discovery procedure for discovering one or more candidate relay UEs. A relay UE1 may send one or more relay discovery messages by using a first identity (e.g. source Layer-2 ID) of the relay UE1. A relay UE2 may send one or more relay discovery messages by using a second identity (e.g. source Layer-2 ID) of the relay UE2. Possibly, the remote UE may discover the relay UE1 and the relay UE2 by receiving their relay discovery messages. Possibly, the remote UE could be in-coverage of serving cell handled/controlled by the first gNB while the relay UE1 and the relay UE2 could be in-coverage of serving cell(s) handled/controlled by a second gNB (i.e. target gNB). The second gNB could belong to a PLMN for which the first gNB could also belong to. The remote UE could report an identity (e.g. source Layer-2 ID) of the remote UE to the first gNB via, for example, SidelinkUEInformationNR.

3. The remote UE could be configured by the first gNB with measurement configuration. The remote UE could send a measurement report to the first gNB. The measurement report could include the first identity of the relay UE1 and the second identity of the relay UE2. The measurement report could include a first sidelink quality between the remote UE and the relay UE1 and a second sidelink quality between the remote UE and the relay UE2. The measurement report could include a first cell ID of the relay UE1 and a second cell ID of the relay UE2. The first cell ID and the second cell ID could be the same if the relay UE1 and the relay UE2 locate at or camp on the same serving cell. The measurement report could include a PLMN ID used to identify the PLMN and associated with the relay UE1 and the relay UE2. The measurement report could include a first list of target/candidate relay UEs found by the remote UE, and each entry of the first list for one target/candidate relay UE could include one (layer-2) identity of the one target/candidate relay UE, one cell ID of the one target/candidate relay UE, one PLMN ID of the one target/candidate relay UE and/or etc. Alternatively, the remote UE could report above information to the first gNB by sending another RRC message rather than said measurement report.

4. In Rel-17, gNB serving Remote UE is responsible to selection of target Relay UE for enabling intra-gNB direct-to-indirect communication path switching. Based on the measurement report received from the remote UE, if the principle in Rel-17 is also followed, the first gNB may select a target relay UE for switching the remote UE from the direct communication path to an indirect communication path via the target relay UE. Possibly, the first gNB may select the relay UE1 (since the first sidelink quality may be better than the second sidelink quality).

The maximum number of layer-2 link (or called e.g. unicast link, PC5-S connection, PC5-RRC connection, PC5 connection, etc.) can be established on a UE is limited (e.g. at most 8 layer-2 links is recommended according to [2]). On the other hand, a relay UE (in RRC_CONNECTED) serving any remote UE could report the identities (e.g. L2IDs) of the served remote UEs to gNB via e.g. SidelinkUEInformationNR. Thus, the gNB can know if the relay UE can serve more remote UEs based on the SidelinkUEInformationNR reported by the relay UE. In other words, the first gNB could not know the loading of the relay UE1 and the relay UE2 since these relay UEs are not served by the first gNB. The inter-gNB direct-to-indirect communication path switching involve many signalling exchange between two gNBs (e.g. handover preparation message sent by the first gNB and handover command message sent by the second gNB for handovering the remote UE from the first gNB to the second gNB) and between gNB and the remote/relay UE (e.g. RRC reconfiguration). If the first gNB selects the relay UE1 but the relay UE1 cannot serve more remote UEs, the relay UE1 would reject establishing a layer-2 link with the remote UE so that the direct-to-indirect communication path switching cannot be done. The failure of the direct-to-indirect communication path switching would trigger the remote UE to perform RRC connection re-establishment procedure for selecting a new suitable cell or a new suitable relay UE. This situation would cause traffic transfer suspension and service interruption.

Since the loading of the relay UE1 and the relay UE2 can be known by the second gNB, it would be better for the second gNB to select one target relay UE for the direct-to-indirect communication path switching.

5. The first gNB (i.e. source gNB) could send a first network signalling for preparing inter-gNB direct-to-indirect communication path switching to the second gNB (i.e. target gNB). The first network signalling could be path switching and/or handover preparation message. The first network signalling could include the RRCReconfiguration configuration (that is currently complied by the remote UE) as generated entirely by the first gNB. The first network signalling could indicate one or more target/candidate relay UEs which may be belonging to or associated with the second gNB. The first network signalling could include the first identity of the relay UE1 and the second identity of the relay UE2. The first network signalling could include the first cell ID of the relay UE1 and the second cell ID of the relay UE2. The first network signalling could include a second list of tartget/candidate relay UEs belonging to or associated with the second gNB, and each entry of the second list could be associated with one target/candidate relay UE and could include one (layer-2) identity of the one target/candidate relay UE, one cell ID of the one target/candidate relay UE, one PLMN ID of the one target/candidate relay UE, and/or etc. The first network signalling could not include information about any target/canddicate relay UE not belonging to or not associated with the second gNB. Thus, the size of the second list of target/candidate relay UEs could be equal to or small than the one of the first list of target/candidate relay UEs. Alternatively, the first list of tartget/candidate relay UEs could be included in the first network signalling.

6. Based on the first network signalling received from the first gNB, the second gNB could send a second network signalling to the first gNB for the first gNB to initiate/perform/execute procedure of the inter-gNB direct-to-indirect communication path switching. The second network signalling could be path switching and/or handover command message. The second network signalling could include a set of configurations (e.g. RRCReconfiguration that is to be complied by the remote UE) as generated by the second gNB. The set of configurations could include Uu SDAP configuration (e.g. establishing QoS flow-to-DRB mapping), Uu DRB configuration (e.g. establishing one or more DRBs), SRAP configuration (for e.g. allocating local UE ID of the remote UE and establishing DRB-to-PC5 RLC relay channel mapping), PC5 RLC relay channel configuration (e.g. establishing one or more PC5 RLC relay channels) and/or etc. The set of configurations or the second network signalling could indicate a target relay UE (e.g. the relay UE2) selected by the second gNB. The set of configurations or the second network signalling could include the second identity of the relay UE2.

7. The first gNB could send/forward the set of configurations included in the second network signalling to the remote UE for the inter-gNB direct-to-indirect communication path switching. This set of configurations could be sent via a first RRC message (e.g. first RRCReconfiguration). The first RRC message could also include the second identity of the relay UE2.

The second gNB could send a second RRC message (e.g. second RRCReconfiguration) to the relay UE2 for adding the remote UE for the inter-gNB direct-to-indirect communication path switching. The second RRC message could include the identity of the remote UE. The second RRC message could include SRAP configuration (e.g. assigning the local UE ID of the remote UE and establishing PC5 RLC relay channel-to-Uu RLC relay channel mapping), PC5 RLC relay channel configuration (e.g. establishing one or more PC5 RLC relay channels), Uu RLC relay channel configuration (e.g. establishing one or more Uu RLC relay channels), and/or etc.

8. In response to reception of the first RRC message from the first gNB, the remote UE could initiate/perform establishment of PC5 connection with the relay UE2. Upon complete of establishing the PC5 connection, the remote UE could send a third RRC message (e.g. RRCReconfigurationComplete) corresponding to the first RRC message to the second gNB via the relay UE2. The third RRC message could be included in an SRAP Protocol Data Unit (PDU). A header of the SRAP PDU could include a field indicating the local Identity/Identifier (ID) of the remote UE. The remote UE could then communicate with the second gNB via the relay UE2 over the indirect communication path.

Figure 24:
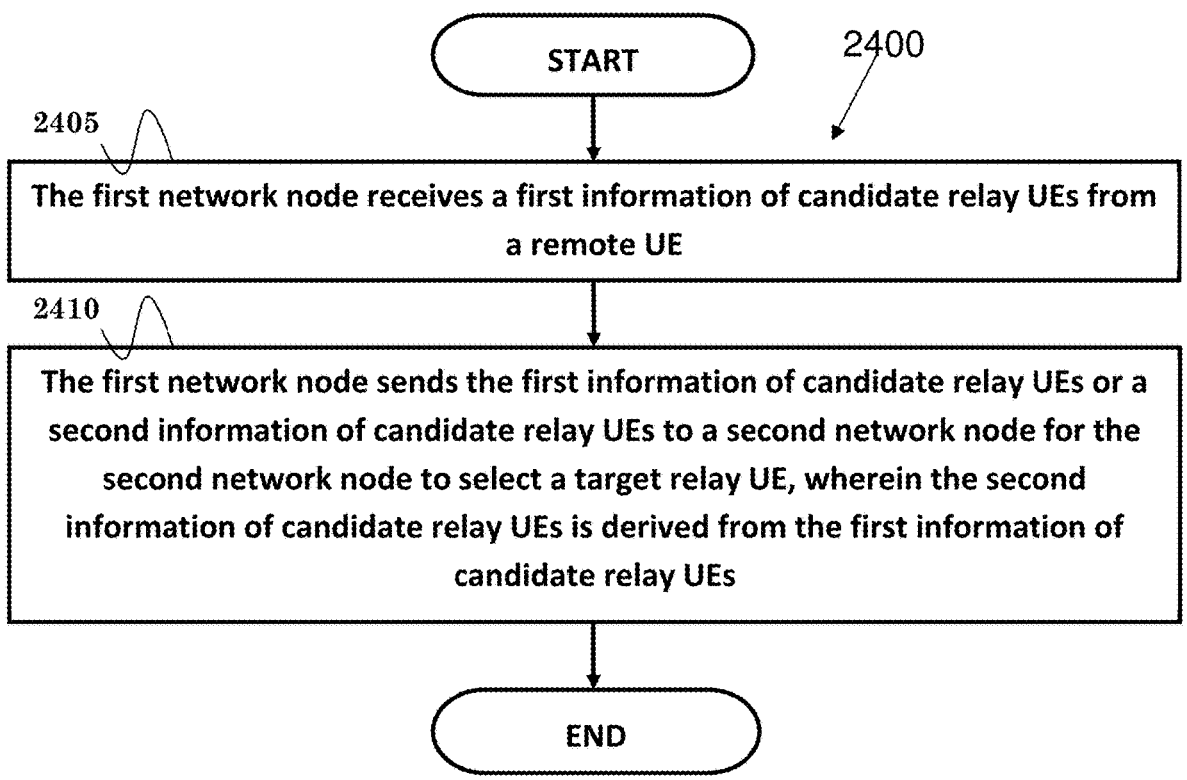
FIG. 24 is a flow diagram according to one exemplary embodiment.

FIG. 24 is a flow chart 2400 illustrating an exemplary method for a first network node. In step 2405, the first network node receives a first information of candidate relay User Equipments (UEs) from a remote UE. In step 2410, the first network node sends the first information of candidate relay UEs or a second information of candidate relay UEs to a second network node for the second network node to select a target relay UE, wherein the second information of candidate relay UEs is derived from the first information of candidate relay UEs.

In one embodiment, the first information of candidate relay UEs may indicate one or more candidate relay UEs discovered by the remote UE, and each candidate relay UE indicated in the first information of candidate relay UEs is associated with one layer-2 ID, one cell ID and/or one PLMN ID. The second information of candidate relay UEs may indicate one or more candidate relay UEs associated with or belonging to the second network node. Each candidate relay UE indicated in the second information of candidate relay UEs could be associated with one layer-2 ID, one cell ID and/or one PLMN ID.

In one embodiment, the first information of candidate relay UEs or the second information of candidate relay UEs could be sent via a first network signaling from the first network node to the second network node, wherein one or more candidate relay UEs indicated in the first network signalling are associated with a same cell ID, and/or a same PLMN ID. The first network signalling may be a Handover Request message.

In one embodiment, the first network node could receive a second network signalling from the second network node, wherein the second network signalling indicates the target relay UE and includes a set of configurations for indirect communication between the remote UE and the second network node via the target relay UE. The second network signalling may be a Handover Request Acknowledgement (ACK) message.

Referring back to FIGS. 3 and 4, in one exemplary embodiment of a first network node, the first network node 300 includes a program code 312 stored in the memory 310. The CPU 308 could execute program code 312 to enable the first network node (i) to receive a first information of candidate relay UEs from a remote UE, and (ii) to send the first information of candidate relay UEs or a second information of candidate relay UEs to a second network node for the second network node to select a target relay UE, wherein the second information of candidate relay UEs is derived from the first information of candidate relay UEs. Furthermore, the CPU 308 can execute the program code 312 to perform all of the above-described actions and steps or others described herein.

Figure 25:
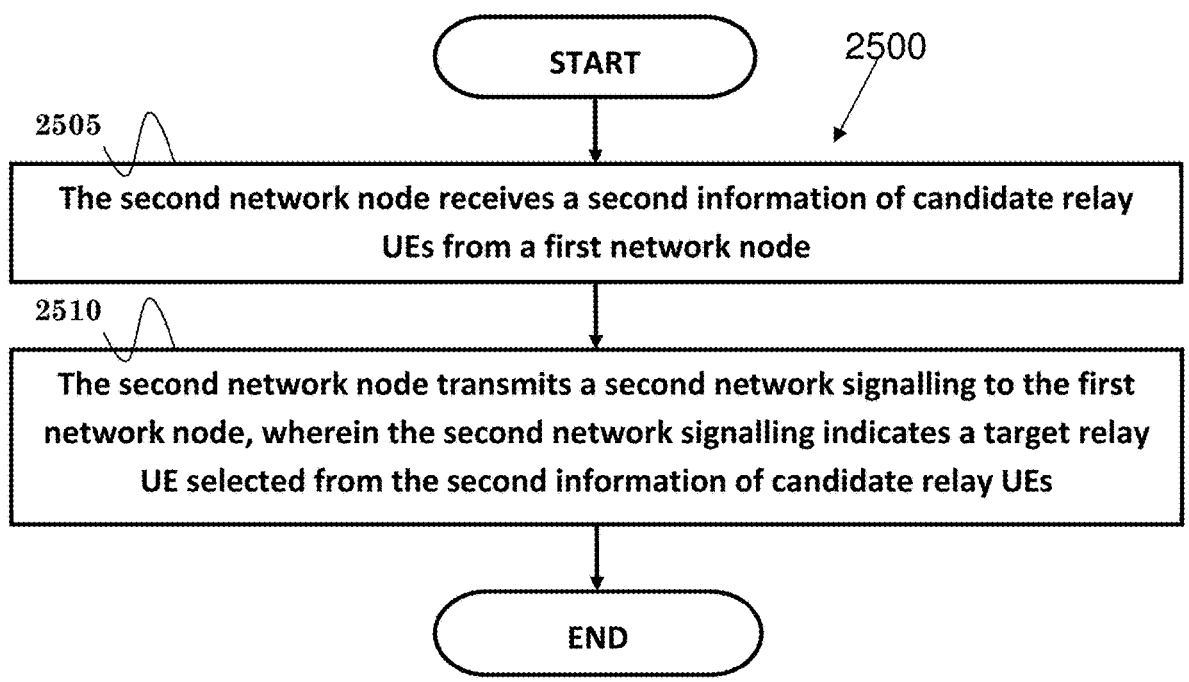
FIG. 25 is a flow diagram according to one exemplary embodiment.

FIG. 25 is a flow chart 2500 illustrating an exemplary method for a second network node. In step 2505, the second network node receives a second information of candidate relay UEs from a first network node. In step 2510, the second network node transmits a second network signalling to the first network node, wherein the second network signalling indicates a target relay UE selected from the second information of candidate relay UEs.

In one embodiment, the second information of candidate relay UEs indicates one or more candidate relay UEs associated with or belonging to the second network node. Each candidate relay UE indicated in the second information of candidate relay UEs could be associated with one layer-2 ID, one cell ID, and/or one PLMN ID. The second information of candidate relay UEs could be sent via a first network signaling from the first network node to the second network node, wherein one or more candidate relay UEs indicated in the first network signalling are associated with a same cell ID and/or a same PLMN ID. The first network signalling may be a Handover Request message.

In one embodiment, the second network signalling may include a set of configurations for indirect communication between the remote UE and the second network node via the target relay UE. The second network signalling may be a Handover Request ACK message.

Referring back to FIGS. 3 and 4, in one exemplary embodiment of a second network node, the second network node 300 includes a program code 312 stored in the memory 310. The CPU 308 could execute program code 312 to enable the second network node (i) to receive a second information of candidate relay UEs from a first network node, and (ii) to transmit a second network signalling to the first network node, wherein the second network signalling indicates a target relay UE selected from the second information of candidate relay UEs. Furthermore, the CPU 308 can execute the program code 312 to perform all of the above-described actions and steps or others described herein.

Figure 26:
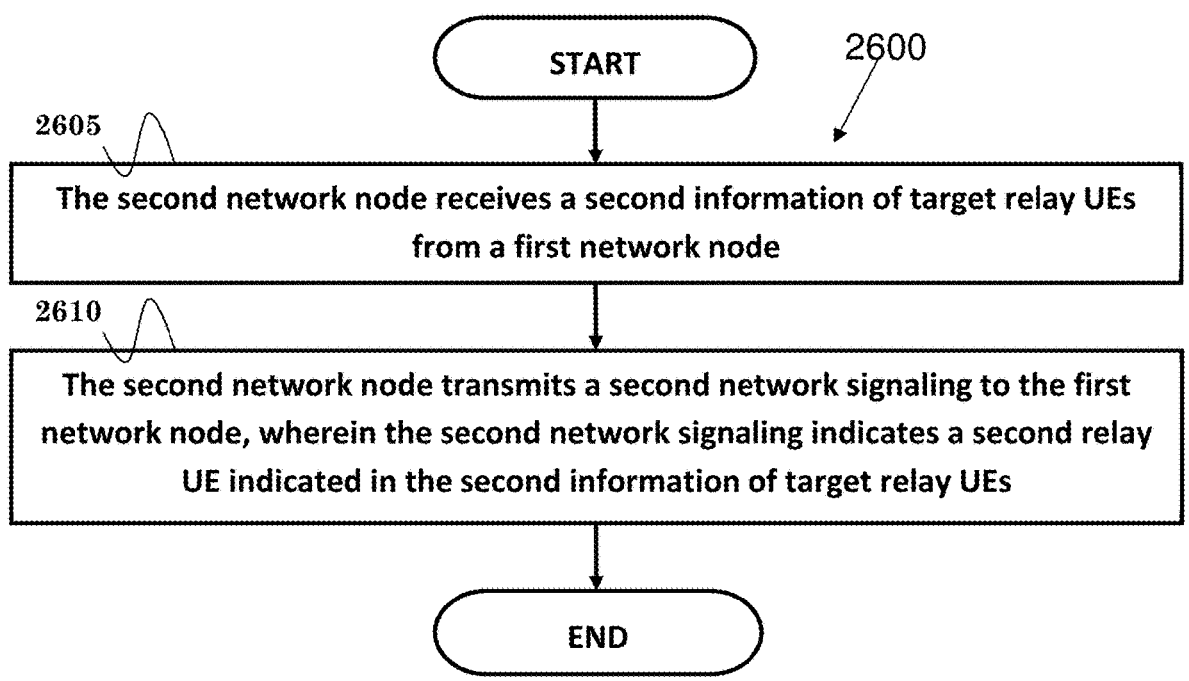
FIG. 26 is a flow diagram according to one exemplary embodiment.

FIG. 26 is a flow chart 2600 illustrating an exemplary method for a second network node. In step 2605, the second network node receives a second information of target relay UEs from a first network node. In step 2610, the second network node transmits a second network signaling to the first network node, wherein the second network signaling indicates a second relay UE indicated in the second information of target relay UEs.

In one embodiment, a Radio Resource Control (RRC) connection is established between the first network node and a remote UE before receiving the second information of target relay UEs.

In one embodiment, the second information of target relay UEs may indicate one or more target relay UEs associated with or belonging to the second network node. Each target relay UE indicated in the second information of target relay UEs could be associated with one layer-2 ID, one cell ID, and/or one PLMN ID. The second information of target relay UEs may indicate a first relay UE and the second relay UE. The second information of target relay UEs may include a layer-2 ID of the first relay UE and a layer-2 ID of the second relay UE. The second information of target relay UEs may be included in a first network signaling sent by the first network node.

In one embodiment, the second network signalling may include a set of configurations for indirect communication between the remote UE and the second network node via the second relay UE. The second network signaling may include the layer-2 ID of the second relay UE.

In one embodiment, the set of configuration may include Service Data Adaptation Protocol (SDAP) configuration, Packet Data Convergence Protocol (PDCP) configuration, Sidelink Relay Adaptation Protocol (SRAP) configuration, PC5 Radio Link Control (RLC) channel configuration and/ or etc. The set of configuration or the SRAP configuration may include a local UE ID of the remote UE.

In one embodiment, the second network node could receive a RRC reconfiguration complete message from the remote UE via the second relay UE, wherein the RRC reconfiguration complete message may be included in a SRAP PDU, and a header of the SRAP PDU may include the local UE ID of the remote UE.

In one embodiment, the first network node and/or the second network node may be a base station or a gNB. The first network signaling may be a handover preparation message or a Handover Request message. The second network signaling may be a handover command message or a Handover Request ACK message.

Referring back to FIGS. 3 and 4, in one exemplary embodiment of a second network node, the first network node 300 includes a program code 312 stored in the memory 310. The CPU 308 could execute program code 312 to enable the second network node (i) to receive a second information of target relay UEs from a first network node, and (ii) to transmit a second network signaling to the first network node, wherein the second network signaling indicates a second relay UE indicated in the second information of target relay UEs. Furthermore, the CPU 308 can execute the program code 312 to perform all of the above-described actions and steps or others described herein.

Figure 27:
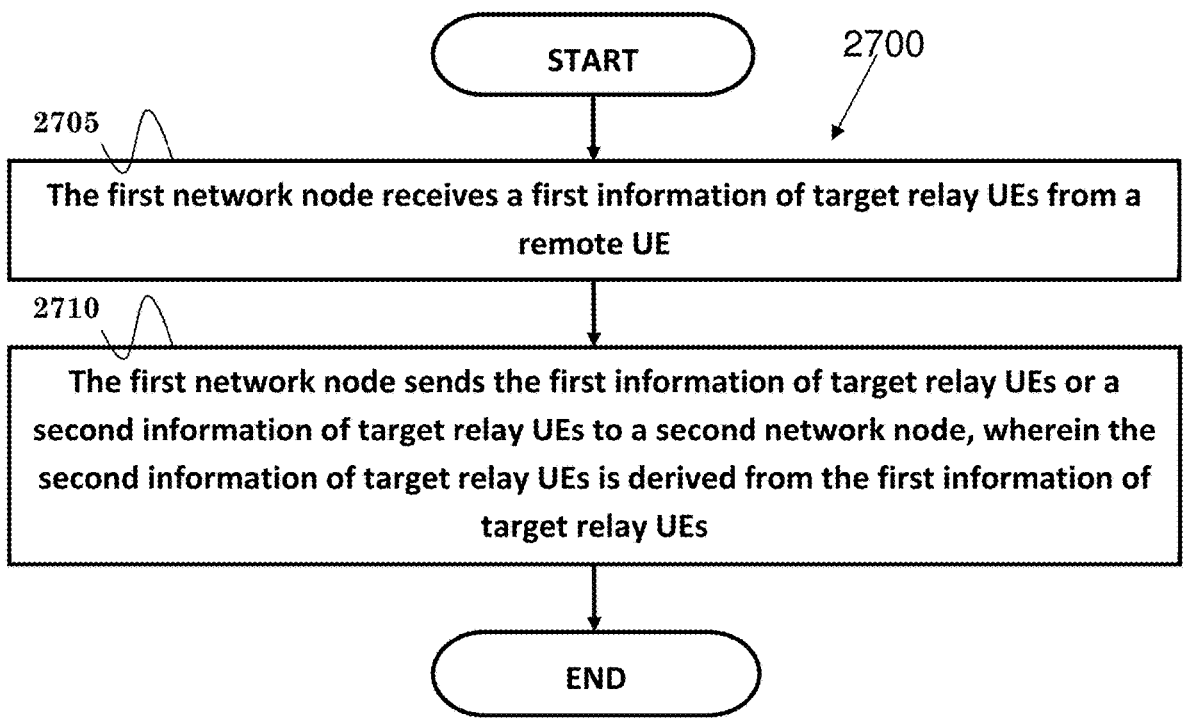
FIG. 27 is a flow diagram according to one exemplary embodiment.

FIG. 27 is a flow chart 2700 illustrating an exemplary method for a first network node. In step 2715, the first network node receives a first information of target relay UEs from a remote UE. In step 2710, the first network node sends the first information of target relay UEs or a second information of target relay UEs to a second network node, wherein the second information of target relay UEs is derived from the first information of target relay UEs.

In one embodiment, the first network node could establish a RRC connection with the remote UE. The first information of target relay UEs may be included in a RRC message or a measurement report sent by the remote UE. The first information of target relay UEs may indicate one or more target relay UEs discovered by the remote UE. Each target relay UE indicated in the first information of target relay UEs could be associated with one layer-2 ID, one cell ID and/or one PLMN ID. The first information of target relay UEs may indicate a first relay UE, a second relay UE and a third relay UE.

In one embodiment, the first relay UE and the second relay UE could be associated with or served by the second network node. The third relay UE could be associated with or served by a third network node.

In one embodiment, the second information of target relay UEs may indicate one or more target relay UEs associated with or belonging to the second network node. Each target relay UE indicated in the second information of target relay UEs could be associated with one layer-2 ID, one cell ID and/or one PLMN ID. The second information of target relay UEs may indicate the first relay UE and the second relay UE. The second information of target relay UEs my be included in a first network signalling sent by the first network node.

In one embodiment, the first network node could receive a second network signalling from the second network node, wherein the second network signaling indicates the second relay UE and includes a set of configurations for indirect communication between the remote UE and the second network node via the second relay UE. The second network signaling may include a layer-2 ID of the second relay UE.

In one embodiment, the first network node could send a RRC reconfiguration message to the remote UE for direct-to-indirect communication path switching, wherein the RRC reconfiguration message indicates the second relay UE and includes the set of configurations. The RRC reconfiguration message may include the layer-2 ID of the second relay UE. The set of configuration may include SDAP configuration, PDCP configuration, SRAP configuration, PC5 RLC channel configuration and/or etc.

In one embodiment, the first, second, or third network node may be a base station or a gNB. The first network signaling may be a handover preparation message or a Handover Request message. The second network signaling may be a handover command message or a Handover Request ACK message.

Referring back to FIGS. 3 and 4, in one exemplary embodiment of a first network node, the second network node 300 includes a program code 312 stored in the memory 310. The CPU 308 could execute program code 312 to enable the first network node (i) to receive a first information of target relay UEs from a remote UE, and (ii) to send the first information of target relay UEs or a second information of target relay UEs to a second network node, wherein the second information of target relay UEs is derived from the first information of target relay UEs. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first base station, comprising:
  receiving a first information of multiple candidate relay User Equipments (UEs) from a remote UE;
  sending the first information of multiple candidate relay UEs or a second information of multiple candidate relay UEs to a second base station for the second base station to select a target relay UE out of the multiple candidate relay UEs, wherein the second information of multiple candidate relay UEs is derived from the first information of multiple candidate relay UEs;
  receiving a Radio Resource Control (RRC) reconfiguration message from the second base station for the remote UE performing direct-to-indirect communication path switching, wherein the RRC reconfiguration message includes information identifying the target relay UE for the direct-to-indirect communication path switching and includes a set of configurations for the direct-to-indirect communication path switching; and
  sending the RRC reconfiguration message to the remote UE for performing the direct-to-indirect communication path switching.

2. The method of claim 1, wherein the first information of candidate relay UEs indicates one or more candidate relay UEs discovered by the remote UE, and each candidate relay UE indicated in the first information of candidate relay UEs is associated with one layer-2 Identity (ID), one cell ID and/or one Public Land Mobile Network (PLMN) ID, and wherein the second information of candidate relay UEs indicates one or more candidate relay UEs associated with or belonging to the second base station, and each candidate relay UE indicated in the second information of candidate relay UEs is associated with one layer-2 ID, one cell ID and/or one PLMN ID.

3. The method of claim 1, wherein the first information of candidate relay UEs or the second information of candidate relay UEs is sent via a first network signaling from the first base station to the second base station, wherein one or more candidate relay UEs indicated in the first network signalling are associated with a same cell Identity (ID) and/or a same Public Land Mobile Network (PLMN) ID, and/or wherein the first network signalling is a Handover Request message.

4. The method of claim 1, further comprising:
  the first base station receives a second network signalling from the second base station, wherein the second network signalling indicates the target relay UE and includes a set of configurations for indirect communication between the remote UE and the second base station via the target relay UE, and/or wherein the second network signalling is a Handover Request Acknowledgement (ACK) message.

5. A first base station, comprising:
a processor; and
a memory operatively coupled to the processor, wherein the processor is configured to execute a program code stored in the memory to:
  receive a first information of multiple candidate relay User Equipments (UEs) from a remote UE;
  send the first information of multiple candidate relay UEs or a second information of multiple candidate relay UEs to a second base station for the second base station to select a target relay UE out of the multiple candidate relay UEs, wherein the second information of multiple candidate relay UEs is derived from the first information of multiple candidate relay UEs;

receive a Radio Resource Control (RRC) reconfiguration message from the second base station for the remote UE performing direct-to-indirect communication path switching, wherein the RRC reconfiguration message includes information identifying the target relay UE for the direct-to-indirect communication path switching and includes a set of configurations for the direct-to-indirect communication path switching; and send the RRC reconfiguration message to the remote UE for performing the direct-to-indirect communication path switching.

6. The first base station of claim 5, wherein the first information of candidate relay UEs indicates one or more candidate relay UEs discovered by the remote UE, and each candidate relay UE indicated in the first information of candidate relay UEs is associated with one layer-2 Identity (ID), one cell ID and/or one Public Land Mobile Network (PLMN) ID, and wherein the second information of candidate relay UEs indicates one or more candidate relay UEs associated with or belonging to the second base station, and each candidate relay UE indicated in the second information of candidate relay UEs is associated with one layer-2 ID, one cell ID and/or one PLMN ID.

7. The first base station of claim 5, wherein the first information of candidate relay UEs or the second information of candidate relay UEs is sent via a first network signaling from the first base station to the second base station, wherein one or more candidate relay UEs indicated in the first network signalling are associated with a same cell Identity (ID) and/or a same Public Land Mobile Network (PLMN) ID, and/or wherein the first network signalling is a Handover Request message.

8. The first base station of claim 5, wherein the processor is further configured to execute a program code stored in the memory to:

receive a second network signalling from the second base station, wherein the second network signalling indicates the target relay UE and includes a set of configurations for indirect communication between the remote UE and the second base station via the target relay UE, and/or wherein the second network signalling is a Handover Request Acknowledgement (ACK) message.

9. A method for a second base station, comprising:
receiving a second information of multiple candidate relay User Equipments (UEs) from a first base station;
transmitting a second network signalling to the first base station, wherein the second network signalling indicates a target relay UE selected by the second base station from the second information of multiple candidate relay UEs for a remote UE performing direct-to-indirect communication path switching; and
receiving a Radio Resource Control (RRC) message from the remote UE via the target relay UE for completing the direct-to-indirect communication path switching.

10. The method of claim 9, wherein the second information of candidate relay UEs indicates one or more candidate relay UEs associated with or belonging to the second base station, and each candidate relay UE indicated in the second information of candidate relay UEs is associated with one layer-2 Identity (ID), one cell ID, and/or one Public Land Mobile Network (PLMN) ID.

11. The method of claim 9, wherein the second information of candidate relay UEs is sent via a first network signaling from the first base station to the second base station, wherein one or more candidate relay UEs indicated in the first network signalling are associated with a same cell Identity (ID) and/or a same Public Land Mobile Network (PLMN) ID, and/or wherein the first network signalling is a Handover Request message.

12. The method of claim 9, wherein the second network signalling includes a set of configurations for indirect communication between the remote UE and the second base station via the target relay UE, and/or wherein the second network signalling is a Handover Request Acknowledgement (ACK) message.

13. A second base station, comprising:
a processor; and
a memory operatively coupled to the processor, wherein the processor is configured to execute a program code stored in the memory to:
receive a second information of multiple candidate relay User Equipments (UEs) from a first base station;
transmit a second network signalling to the first base station, wherein the second network signalling indicates a target relay UE selected by the second base station from the second information of multiple candidate relay UEs for a remote UE performing direct-to-indirect communication path switching; and
receive a Radio Resource Control (RRC) message from the remote UE via the target relay UE for completing the direct-to-indirect communication path switching.

14. The second base station of claim 13, wherein the second information of candidate relay UEs indicates one or more candidate relay UEs associated with or belonging to the second base station, and each candidate relay UE indicated in the second information of candidate relay UEs is associated with one layer-2 Identity (ID), one cell ID, and/or one Public Land Mobile Network (PLMN) ID.

15. The second base station of claim 13, wherein the second information of candidate relay UEs is sent via a first network signaling from the first base station to the second base station, wherein one or more candidate relay UEs indicated in the first network signalling are associated with a same cell Identity (ID) and/or a same Public Land Mobile Network (PLMN) ID, and/or wherein the first network signalling is a Handover Request message.

16. The second base station of claim 13, wherein the second network signalling includes a set of configurations for indirect communication between the remote UE and the second base station via the target relay UE, and/or wherein the second network signalling is a Handover Request Acknowledgement (ACK) message.

* * * * *